US008401243B2

(12) United States Patent
Komoto et al.

(10) Patent No.: US 8,401,243 B2
(45) Date of Patent: Mar. 19, 2013

(54) ARTICULATED OBJECT REGION DETECTION APPARATUS AND METHOD OF THE SAME

(75) Inventors: Ayako Komoto, Osaka (JP); Masahiro Iwasaki, Kyoto (JP); Kunio Nobori, Osaka (JP)

(73) Assignee: Panasonic Corporation, Osaka (JP)

( * ) Notice: Subject to any disclaimer, the term of this patent is extended or adjusted under 35 U.S.C. 154(b) by 107 days.

(21) Appl. No.: 13/170,392

(22) Filed: Jun. 28, 2011

(65) Prior Publication Data

US 2011/0255748 A1    Oct. 20, 2011

Related U.S. Application Data

(63) Continuation of application No. PCT/JP2010/007588, filed on Dec. 28, 2010.

(30) Foreign Application Priority Data

Dec. 28, 2009    (JP) .................................. 2009-298935

(51) Int. Cl.
*G06K 9/00*    (2006.01)
(52) U.S. Cl. ....................................................... 382/107
(58) Field of Classification Search .................. 382/103, 382/107, 173, 286
See application file for complete search history.

(56) References Cited

U.S. PATENT DOCUMENTS

| 2011/0002509 | A1 | 1/2011 | Nobori et al. ................. 382/103 |
| 2011/0091073 | A1 * | 4/2011 | Iwasaki et al. ................ 382/103 |

FOREIGN PATENT DOCUMENTS

| JP | 3-073075 | A | 3/1991 |
| JP | 8-214289 | A | 8/1996 |
| JP | 11-066319 | A | 3/1999 |
| JP | 2003-256850 | A | 9/2003 |
| JP | 2006-031114 | A | 2/2006 |
| JP | 2007-004732 | A | 1/2007 |
| JP | 2008-282110 | A | 11/2008 |
| WO | 2010/050110 | A1 | 5/2010 |
| WO | 2010/079556 | A1 | 7/2010 |

OTHER PUBLICATIONS

P. Anandan, "A Computational Framework and an Algorithm for the Measurement of Visual Motion", International Journal of Computer Vision, vol. 2, pp. 283-310, 1989.
V. Kolmogorov et al., "Computing Visual Correspondence with Occlusions via Graph Cuts", International Conference on Computer Vision, 2001.
J. Shi et al., "Good Features to Track", IEEE Conference on Computer Vision and Pattern Recognition, pp. 593-600, 1994.
E. W. Dijkstra, "A note on two problems in connexion with graphs", Numerische Mathematik, pp. 269-271, 1959.
P. F. Felzenszwalb et al., "Efficient Graph—Based Image Segmentation", International Journal of Computer Vision, vol. 59, No. 2, pp. 167-181, Sep. 2004.

* cited by examiner

*Primary Examiner* — Andrew W Johns
(74) *Attorney, Agent, or Firm* — Wenderoth, Lind & Ponack, LLP.

(57) ABSTRACT

An articulated object region detection apparatus includes: a subclass classification unit which classifies trajectories into subclasses; a distance calculating unit which calculates, for each of the subclasses, a point-to-point distance and a geodetic distance between the subclass and another subclass; and a region detection unit which detects, as a region having an articulated motion, two subclasses to which trajectories corresponding to two regions connected via the same articulation and indicating the articulated motion belong, based on a temporal change in the point-to-point distance and a temporal change in the geodetic distance between two given subclasses.

31 Claims, 41 Drawing Sheets

Picture-taking situation (a) Picture of frame 1  (b)
(c)  (d)
(e)  (f) Picture of frame T Example of plural pictures included in video FIG. 6
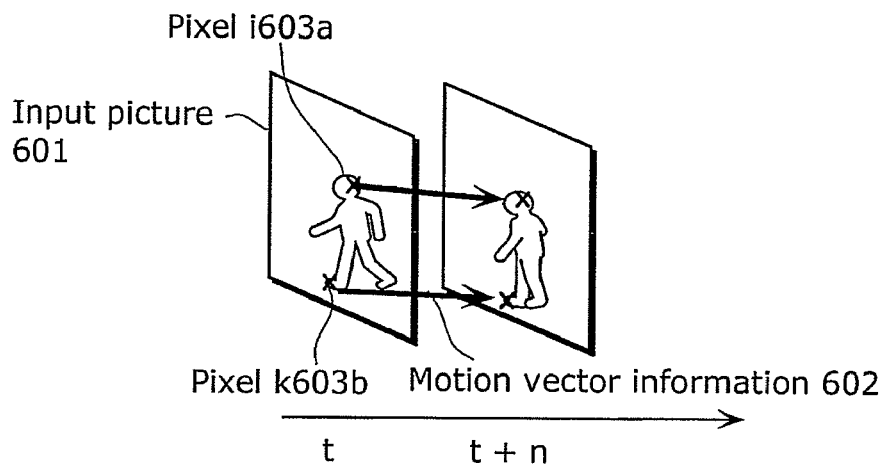
(a) Example of motion vector
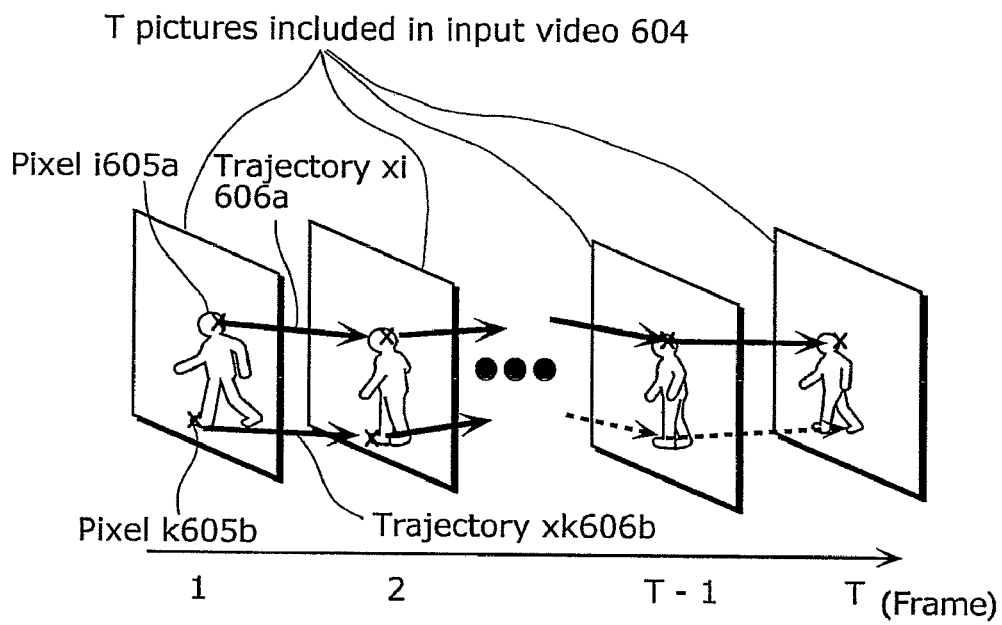
(b) Example of trajectory FIG. 8
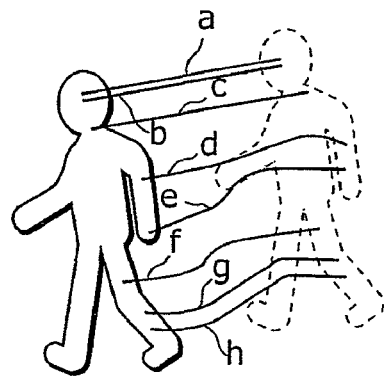
(a) Trajectories in picture
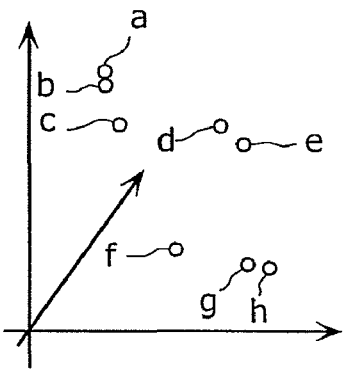
(b) Higher-dimensional space including trajectories
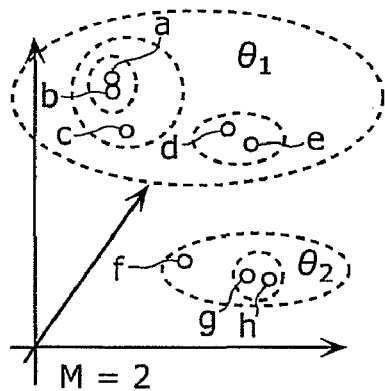 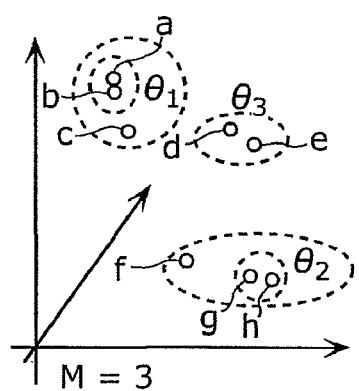
(c) Clustering on trajectories (M = 2)  (d) Clustering on trajectories (M = 3)
※Where, f(a,b) < f(g,h) < f(d,e) < f(b,c) < f(f,g) < f(c,d)

FIG. 9
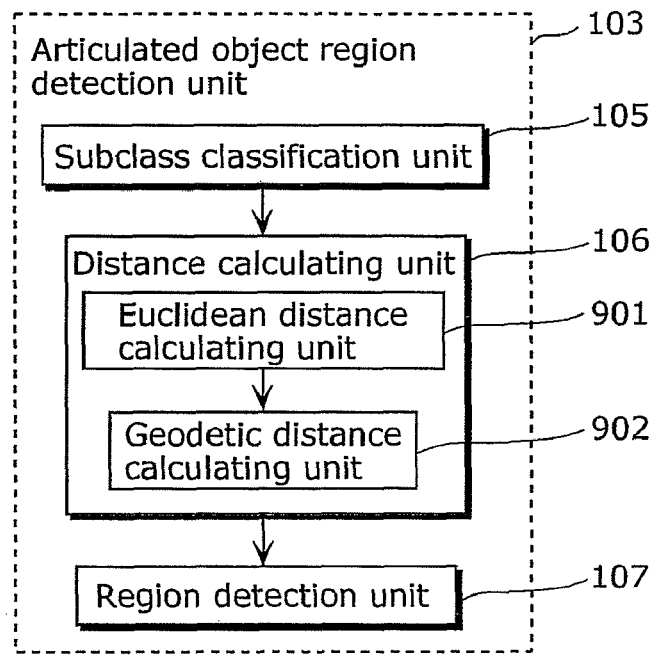
(a) Configuration of distance calculating unit
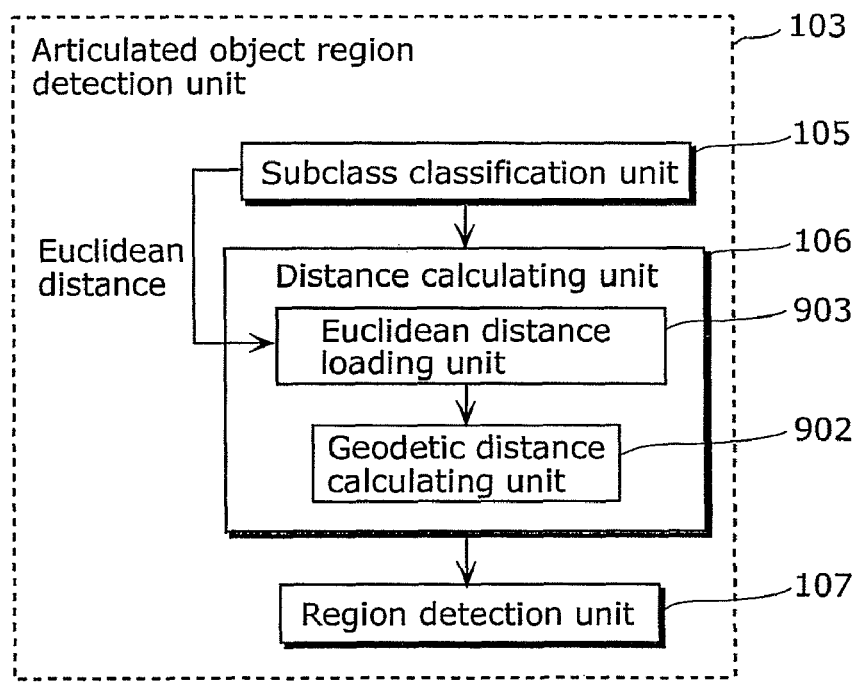
(b) Another configuration of distance calculating unit FIG. 10
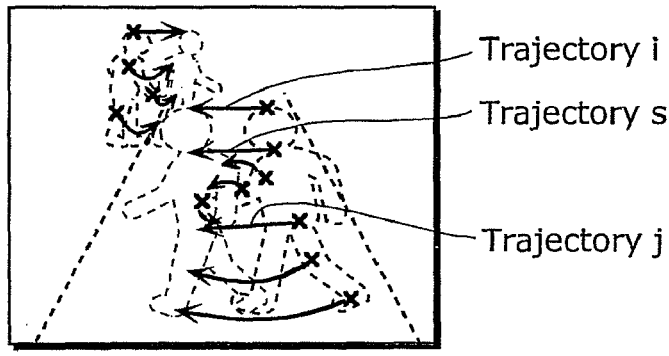
(a) Trajectories in picture
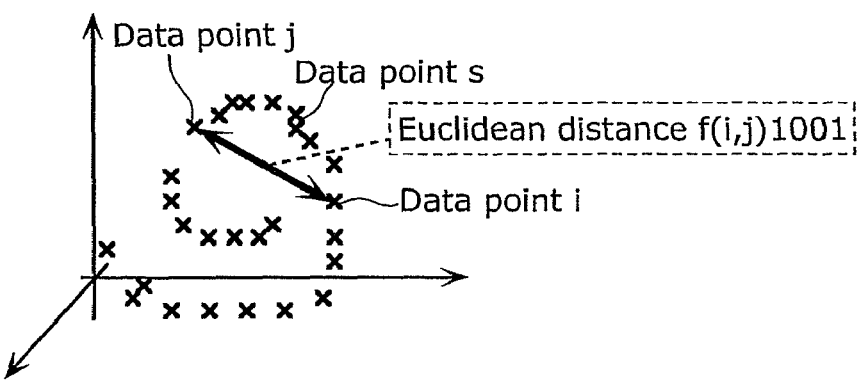
(b) Data distribution of trajectories and linear distance
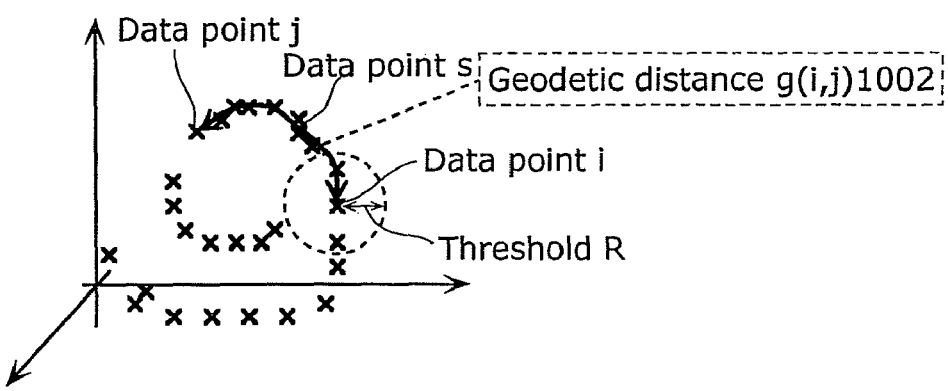
(c) Data distribution of trajectories and geodetic distance

FIG. 14
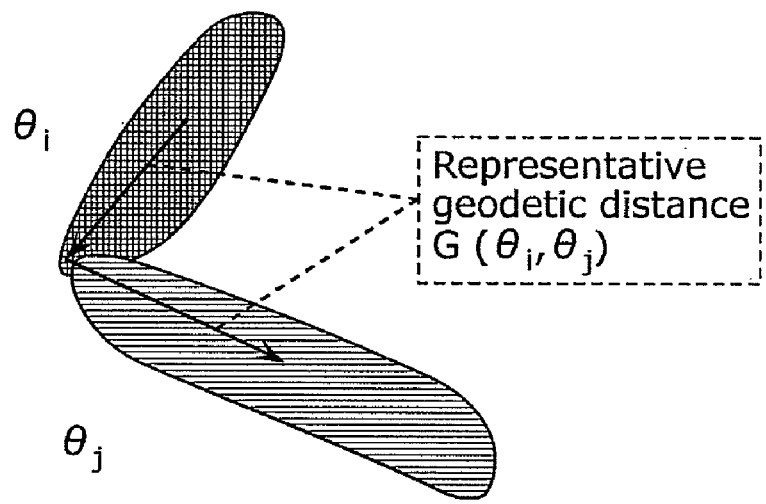
(a)
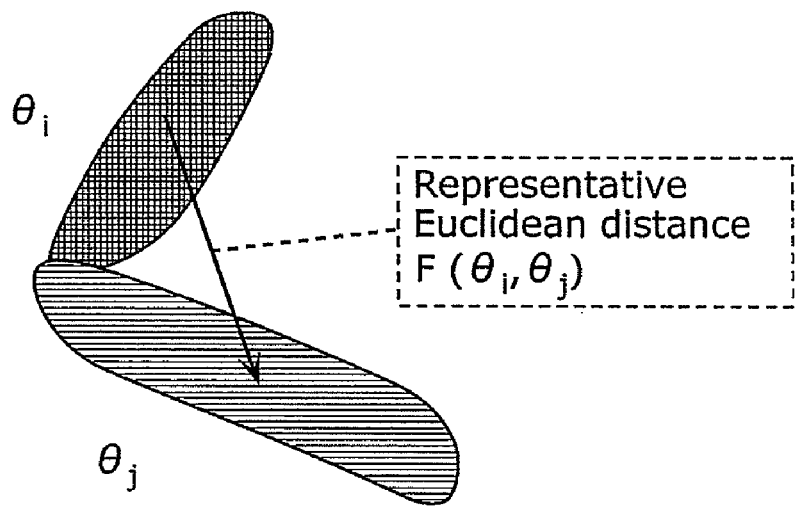
(b)

FIG. 15
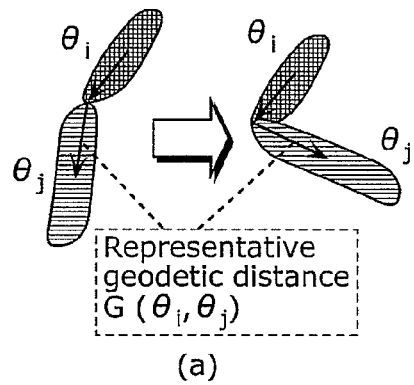
(a)
Articulated motion
Temporal change in geodetic distance
(Time: t = T → t = T + δ )
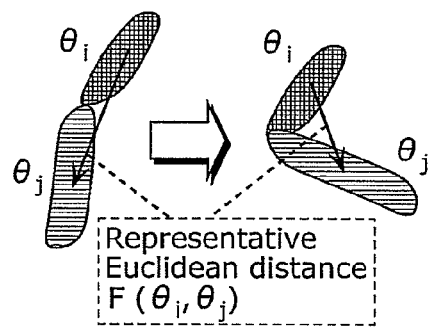
(b)
Articulated motion
Temporal change in Euclidean distance
(Time: t = T → t = T + δ )
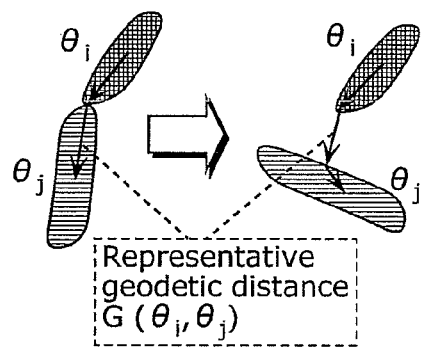
(c)
Non-articulated motion
Temporal change in geodetic distance
(Time: t = T → t = T + δ )
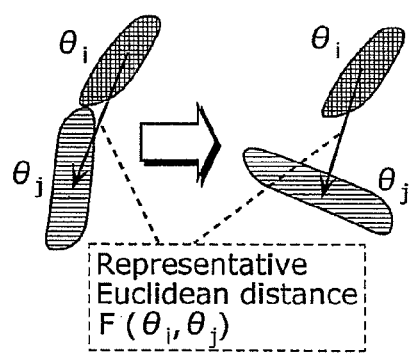
(d)
Non-articulated motion
Temporal change in Euclidean distance
(Time: t = T → t = T + δ )

Flow 2 of distance comparing unit

Flow 3 of distance comparing unit

Flow 1 of distance comparing unit

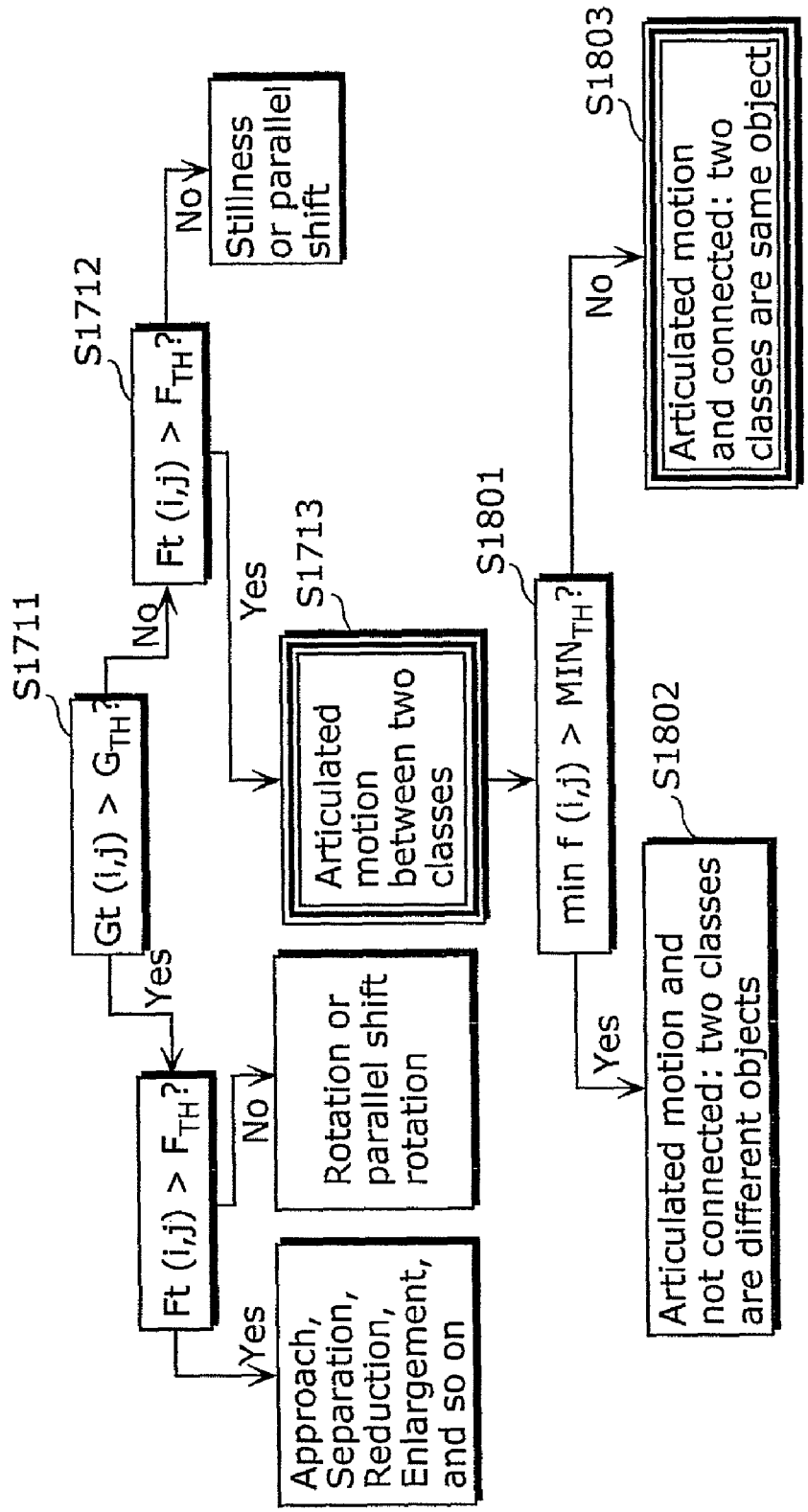

Flow 3 of distance comparing unit

FIG. 20
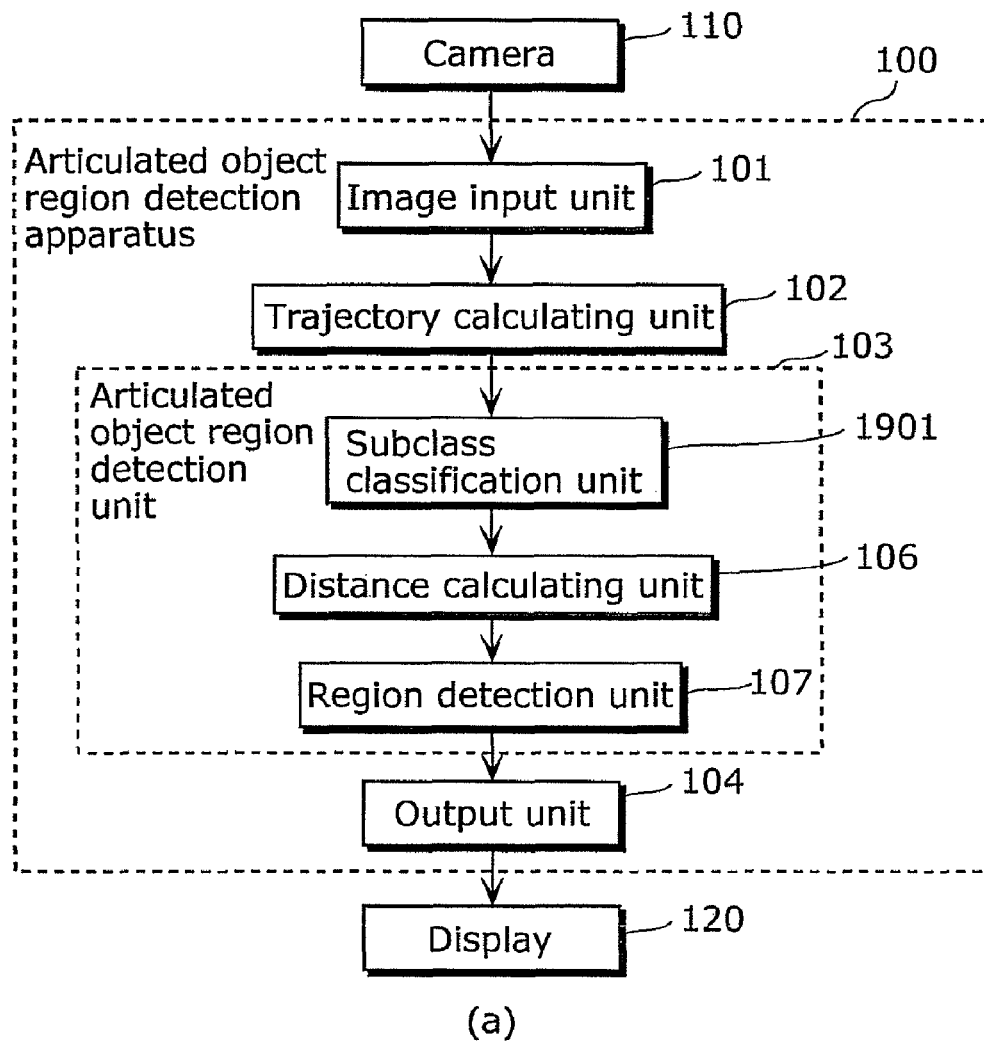
(a)
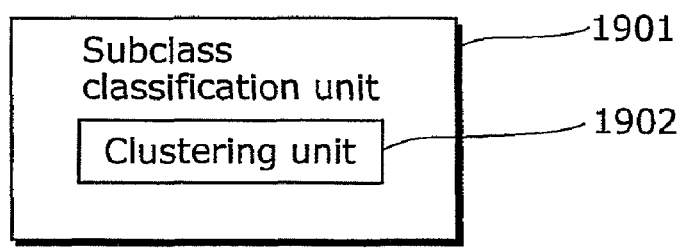
(b)

FIG. 21
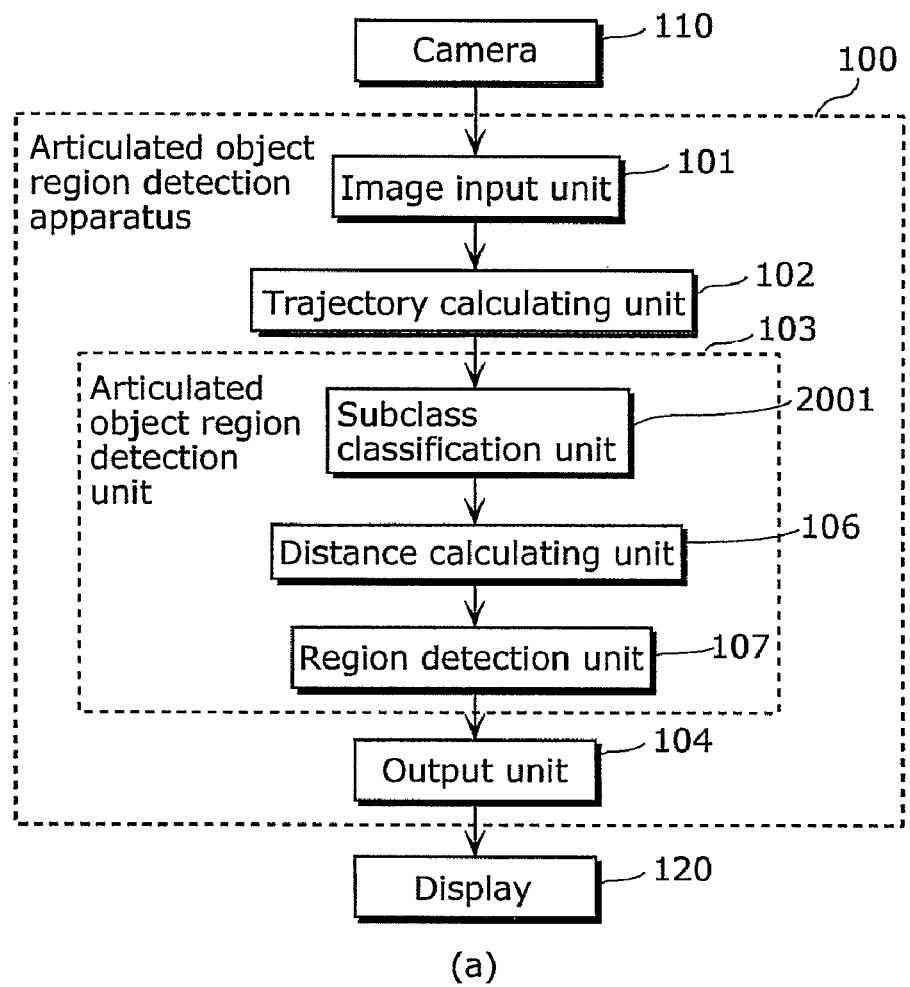
(a)
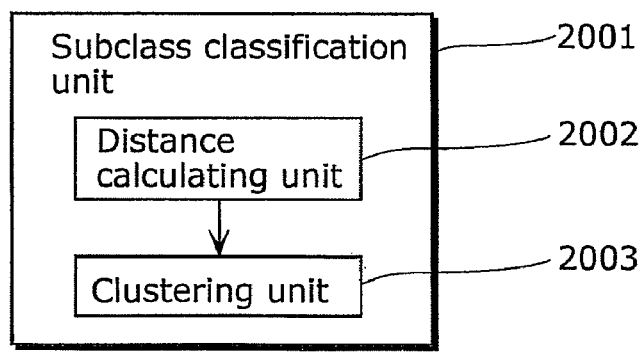
(b)

FIG. 22
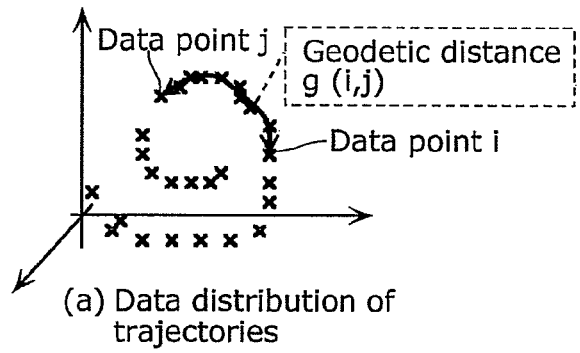
(a) Data distribution of trajectories
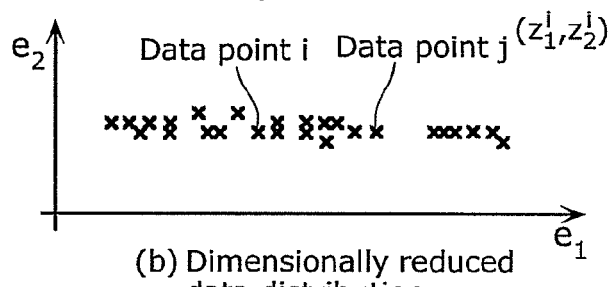
(b) Dimensionally reduced data distribution
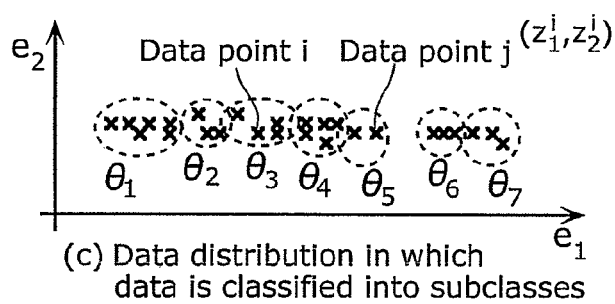
(c) Data distribution in which data is classified into subclasses
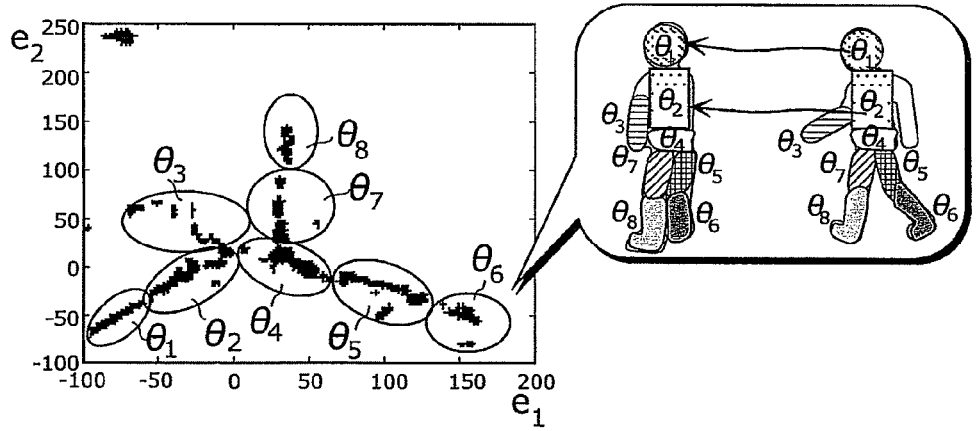
(d) Data distribution in which data on person is classified into subclasses FIG. 23
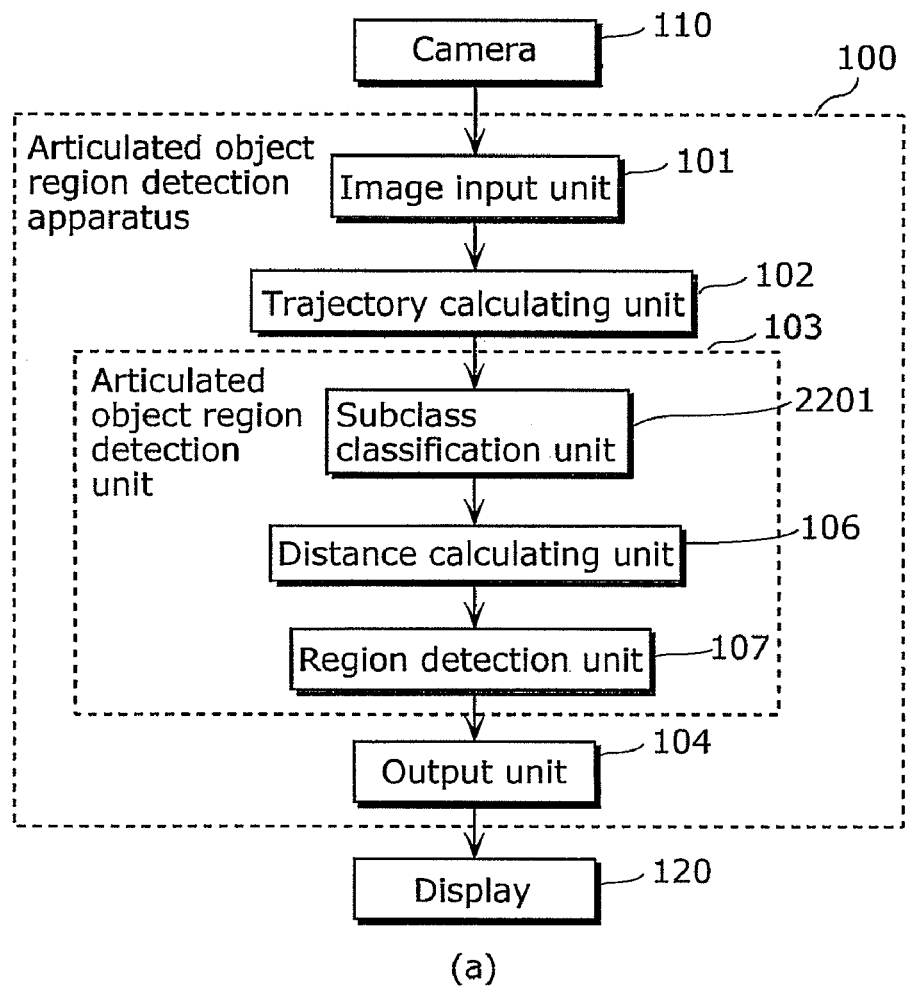
(a)
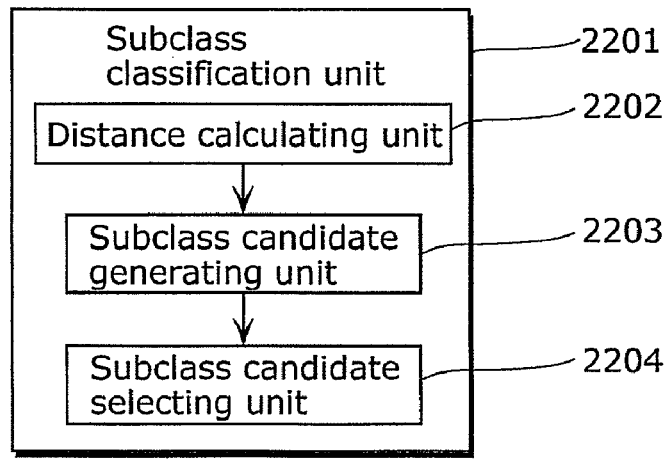
(b)

FIG. 24
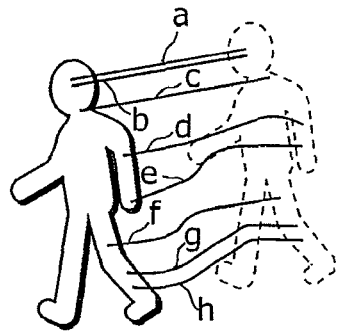
(a) Trajectories
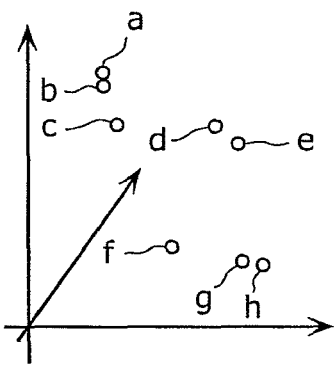
(b) Multidimensional space including trajectories
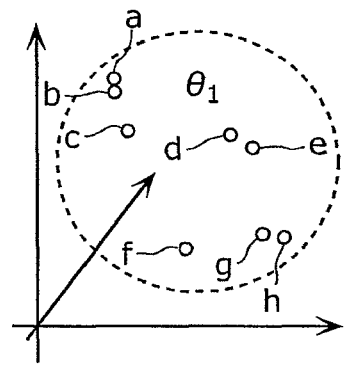
(c) Clustering when thresholds $R_k$ are sufficiently large
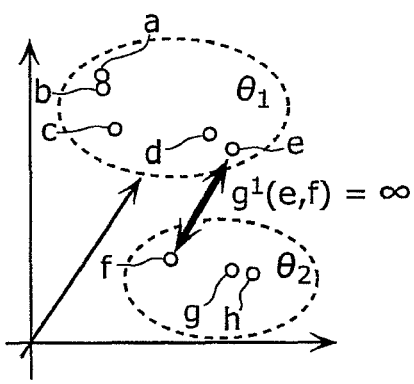
(d) Clustering in the case of $R_1$
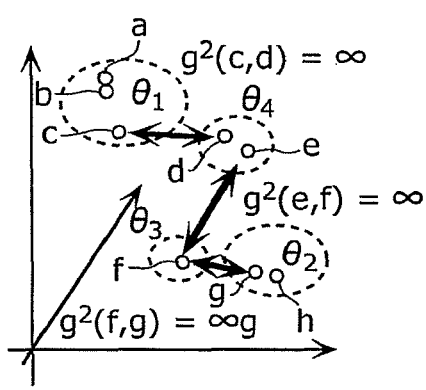
(e) Clustering in the case of $R_2$ Application example of action recognition Application example of action recognition Application example of action detection

FIG. 31B

| Length of trajectory | | 4 |
|---|---|---|
| Number of trajectories | | 5 |
| Number of subclasses | | 5 |
| Trajectory – Subclass | 1 | ax1 ay1 aC1 ax2 ay2 aC2 ax3 ay3 aC3 ax4 ay4 aC4 |
| | 2 | bx1 by1 bC1 bx2 by2 bC2 bx3 by3 bC3 bx4 by4 bC4 |
| | 3 | cx1 cy1 cC1 cx2 cy2 cC2 cx3 cy3 cC3 cx4 cy4 cC4 |
| | 4 | dx1 dy1 dC1 dx2 dy2 dC2 dx3 dy3 dC3 dx4 dy4 dC4 |
| | 5 | ex1 ey1 eC1 ex2 ey2 eC2 ex3 ey3 eC3 ex4 ey4 eC4 |

FIG. 31C

| Length of trajectory | | 4 | |
|---|---|---|---|
| Number of trajectories | | 5 | (※Number of classes = Number of trajectories) |
| Trajectory | 1 | ax1 ay1 aC1 ax2 ay2 aC2 ax3 ay3 aC3 ax4 ay4 aC4 | |
| | 2 | bx1 by1 bC1 bx2 by2 bC2 bx3 by3 bC3 bx4 by4 bC4 | |
| | 3 | cx1 cy1 cC1 cx2 cy2 cC2 cx3 cy3 cC3 cx4 cy4 cC4 | |
| | 4 | dx1 dy1 dC1 dx2 dy2 dC2 dx3 dy3 dC3 dx4 dy4 dC4 | |
| | 5 | ex1 ey1 eC1 ex2 ey2 eC2 ex3 ey3 eC3 ex4 ey4 eC4 | |

FIG. 32B

| Length of trajectory | | 4 |
|---|---|---|
| Number of trajectories | | 5 |
| Number of subclasses | | 3 |
| Trajectory - Subclass | 1 | ax1 ay1 aC1 ax2 ay2 aC2 ax3 ay3 aC3 ax4 ay4 aC4 |
| | | bx1 by1 bC1 bx2 by2 bC2 bx3 by3 bC3 bx4 by4 bC4 |
| | 2 | cx1 cy1 cC1 cx2 cy2 cC2 cx3 cy3 cC3 cx4 cy4 cC4 |
| | | dx1 dy1 dC1 dx2 dy2 dC2 dx3 dy3 dC3 dx4 dy4 dC4 |
| | 3 | ex1 ey1 eC1 ex2 ey2 eC2 ex3 ey3 eC3 ex4 ey4 eC4 | great # ARTICULATED OBJECT REGION DETECTION APPARATUS AND METHOD OF THE SAME

CROSS REFERENCE TO RELATED APPLICATION

This is a continuation application of PCT application No. PCT/JP2010/007588 filed on Dec. 28, 2010, designating the United States of America.

BACKGROUND OF THE INVENTION (1) Field of the Invention

The present invention relates to a technique for detecting a moving object in images based on motion information in a video including the images. The present invention relates in particular to an articulated object region detection apparatus for detecting a region of a moving object which moves changing its outline shape, such as a person, by detecting an articulated object region which is held characteristically by such a moving object.

(2) Description of the Related Art

Research and development on a region extraction technique with which a moving object is detected by extracting a region of the moving object in an image from the image including an image of the moving object (hereinafter referred simply to as "moving object") has been widely carried out. The technique of extracting a region of a moving object is, particularly when the moving object is a person, a fundamental technique used in common for: focus control and image quality improvement processing for digital video cameras or digital still cameras; safe driving support system for vehicles; or a collision-avoidance control or a collision-avoidance alarm for a robot with people.

The technique of extracting a region of a moving object in an image includes the following two general methods: (1) a method of identifying a region of the moving object by evaluating the similarity between a moving object model prepared in advance and a candidate region in the image; and (2) a method of identifying a region of the moving object by segmenting the image into plural sub regions to calculate an amount of characteristics for each of the sub regions and integrating similar regions on the basis of the amount of characteristics.

The former method includes, as a representative method, a method of extracting a candidate of a moving object region from an image, and then evaluates the similarity between the candidate of the moving object region that has been extracted and a moving object model prepared in advance to extract a region with high similarity as the moving object region. There further is a method that utilizes a moving object model in consideration of change in shape when extracting a region of a moving object that moves changing its shape such as a walking person. According to a method described in Patent Literature 1 (Japanese Unexamined Patent Application Publication No. 8-214289), for example, a silhouette image of a moving object is extracted from plural images, as a candidate for a moving object region. Then, the similarity between a model related to a change in shape of the moving object that has been parameterized in advance and the silhouette image that has been extracted is evaluated, so that a parameter of a region with high similarity and the model are estimated. This makes it possible to apply the parameterized model also to the person that moves periodically changing shape, thereby allowing extraction of a region of the moving object.

The latter method includes, as a representative method, a method of segmenting once an image into plural sub regions, extracting an amount of characteristics based on a brightness value of a pixel in each of the sub regions, and then evaluating the similarity of the amounts of characteristics between the plural sub regions, to integrate the regions with high similarities as the same moving object region. According to the method described in Patent Literature 2 (Japanese Unexamined Patent Application Publication No. 2006-031114), for example, an image is segmented once into rectangular sub regions, the amount of characteristics is calculated based on the brightness or motion of the sub regions, and the sub regions are integrated based on an order of the similarities of the amount of characteristics, thereby allowing extraction of the region of a moving object.

SUMMARY OF THE INVENTION

However, in the conventional techniques of region extraction described above, there is a problem that a moving object cannot be accurately extracted in the case where the shape of the moving object significantly changes due to a change in a posture or a size, in a scene in which a person walk, for example.

With the method of extracting a region using a model prepared in advance as represented by the method described in Patent Literature 1, it is necessary to extract a candidate for a moving object region from an image. In this case, the model obtained by parameterizing the moving object cannot be accurately applied to the candidate for the moving object region unless the candidate of the moving object region is appropriately extracted. In the scene described above, in particular, since the shape of the moving object significantly changes due to a change in the posture, size, or the like of the moving object, it is difficult to appropriately extract the candidate for a moving object region. In addition, even when the candidate for a moving object region can be appropriately extracted, there still is a problem as below.

When the moving object is an object which involves an articulated motion, such as a person, the range of changes in an image due to a variety of postures, positions, or a size of the moving object becomes significantly large. For this reason, a huge number of parameters are required when performing parameterization on the moving object model. This induces an error in applying a model. Thus, there is a problem in that the moving object cannot be detected accurately. For example, plural moving objects are erroneously regarded as one moving object in extracting a region, or a region in which a moving object to be extracted does not exist is erroneously extracted as a moving object.

With the technique of region extraction disclosed by Patent Literature 2, instead of generating a model as disclosed by Patent Literature 1, an amount of characteristics between sub regions is used to determine that the sub regions having brightness values or motions which are used as the amount of characteristics and which are not similar to each other are regions different from each other, thereby extracting a region. However, in a moving object such as a person, the brightness value differs depending on a position, and the motion differs between, for example, sub regions positioned at ends of an articulation region even in the same moving object. For that reason, there is a problem that the moving object cannot be detected accurately because, the sub regions in the same moving object are separately extracted as regions that belong to moving objects different from each other.

In view of the above, attention is focused, in the present invention, on an "articulated motion" which induces the problems described above. In the present invention, a moving object in a video is targeted which involves an articulated motion represented by a person; that is, a moving object which involves temporally a significant change in the shape of the moving object due to a change in a posture and the like.

The present invention, in order to accurately detect a region in the moving object described above, without separately extracting sub regions in the same moving object and without being affected by a change in a shape of the moving object, aims to provide an articulated object region detection apparatus capable of detecting an articulated object region that is a region including an articulated motion in the moving object.

It is to be noted that, in the present application, an articulated motion refers to an articulated motion represented by a motion of an articulation of a person, for example.

An example other than the articulation of a person includes: a motion composed by a large number of articulations having little distance therebetween such as a motion of a snake or a centipede; a large number of bones (arms) extending from a single joint (articulation) such as frames of an umbrella; and a mobile or the like.

In the conventional techniques of region extraction, there are many cases in which an object is separated and extracted at a position having such an articulated motion. Conversely, it is therefore possible to prevent an object from being separately extracted if the "articulated object region" including the articulated motion can be extracted. It is to be noted that the "articulated object region" refers to a region that includes, in part or the entire region, at least one region having the articulated motion.

The present invention has been conceived to solve the above stated problems, and an articulated object region detection apparatus according to an aspect of the present invention is an articulated object region detection apparatus which detects a region having an articulated motion, using trajectories which correspond, in one-to-one relationship, to regions included in a moving object in a video, the articulated object region detection apparatus comprising: a subclass classification unit configured to classify trajectories into subclasses each of which is a group of similar trajectories, each of the trajectories being a trajectory of a motion of a block and being over pictures included in the video, the block including one or more pixels each of which constitutes the pictures; a distance calculating unit configured to calculate, for each of the subclasses, a point-to-point distance and a geodetic distance, the point-to-point distance being a distance directly connecting a first trajectory that belongs to the subclass and a second trajectory that belongs to another one, of the subclasses, the geodetic distance being a distance of a path that passes through, as a relay point, a trajectory other than the first trajectory and the second trajectory, to reach the second trajectory from the first trajectory; and a region detection unit configured to detect, as a region having the articulated motion, two subclasses that include trajectories corresponding to two regions connected via a same articulation and including the articulated motion, based on a temporal change in the point-to-point distance and a temporal change in the geodetic distance between two given subclasses among the subclasses.

With the configuration described above, the articulated object region is extracted based on the temporal change in a geodetic distance and the temporal change in a point-to-point distance between subclasses, thereby enabling accurate extraction of the articulated object region without being affected by a change in the shape of the moving object.

It should be noted that the present invention can be realized not only as an articulated object region detection apparatus that includes the abovementioned characteristic processing units, but may also be realized as an articulated object region detection method which implements the characteristic processing units included in the articulated object region detection apparatus as steps. In addition, the present invention can also be realized as a program which causes a computer to execute the characteristic steps included in the articulated object region detection method. Furthermore, it should be understood that such a program can be distributed via a computer-readable recording medium such as a CD-ROM (Compact Disc Read Only Memory) and a communications network such as the Internet.

With the method, apparatus, and the like described above, an articulated object region of a moving object, such as a person, which has an articulated motion that involves a temporal change in the posture, position, size, and so on, in a video is detected, thereby enabling an accurate detection of the moving object in an image.

FURTHER INFORMATION ABOUT TECHNICAL BACKGROUND TO THIS APPLICATION

The disclosure of Japanese Patent Application No. 2009-298935 filed on Dec. 28, 2009 including specification, drawings and claims is incorporated herein by reference in its entirety.

The disclosure of PCT application No. PCT/JP2010/007588 filed on Dec. 28, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 is a diagram which shows an example of a motion vector and trajectories;

FIG. 8 is a diagram which shows a distribution of trajectories in a picture;

FIG. 9 is a diagram which shows a configuration of a distance calculating unit in the articulated object region detection apparatus;

FIG. 10 is a diagram which shows distances and data distributions of trajectories;

FIG. 14 is a conceptual diagram which shows a representative Euclidean distance and a representative geodetic distance between the subclasses included in articulated object regions;

FIG. 15 is a conceptual diagram which shows representative Euclidean distances and representative geodetic distances between the subclasses included in the articulated object regions and between the subclasses not included in the articulated object regions;

FIG. 18B is a flowchart which shows desirable additional processing performed by the distance comparing unit;

FIG. 20 is a diagram which shows a configuration of an articulated object region detection apparatus of a modification example 1 in Embodiment 1 according to the present invention;

FIG. 21 is a diagram which shows a configuration of an articulated object region detection apparatus of a modification example 2 in Embodiment 1 according to the present invention;

FIG. 22 is a diagram which shows clustering of data using dimensionality reduction;

FIG. 23 is a diagram which shows a configuration of an articulated object region detection apparatus of a modification example 3 in Embodiment 1 according to the present invention;

FIG. 24 is a diagram which shows clustering of data using geodetic distances;

FIG. 31B is a diagram which shows an example of classification information stored in a storage unit;

FIG. 31C is a diagram which shows an example of classification information stored in a storage unit;

FIG. 32B is a diagram which shows an example of classification information stored in the storage unit.

DESCRIPTION OF THE PREFERRED EMBODIMENTS

Figure 1:
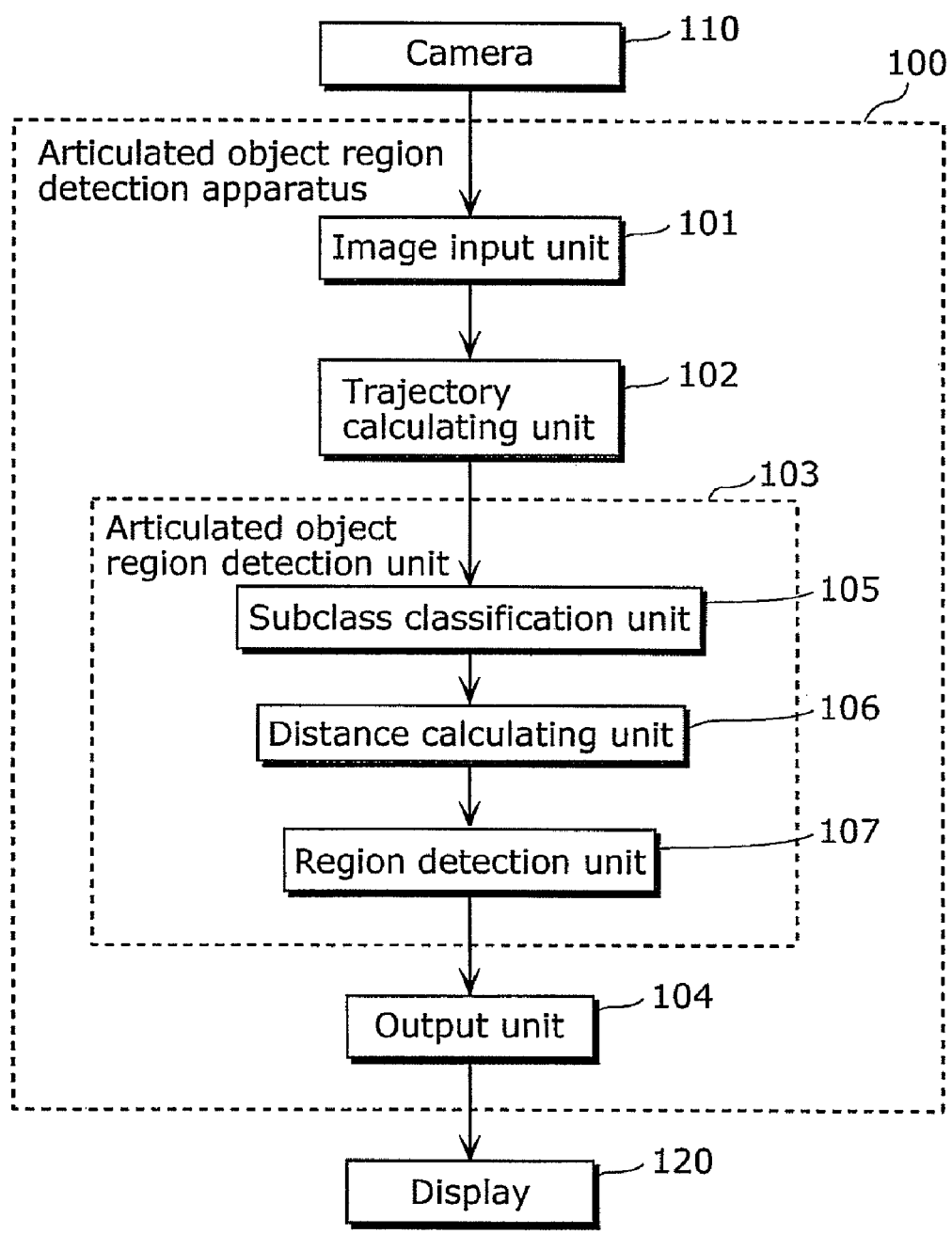
FIG. 1 is a diagram which shows a configuration of an articulated object region detection apparatus according to an embodiment of the present invention.

An embodiment of the present invention is an articulated object region detection apparatus according to an aspect of the present invention is an articulated object region detection apparatus which detects a region having an articulated motion, using trajectories which correspond, in one-to-one relationship, to regions included in a moving object in a video, the articulated object region detection apparatus comprising: a subclass classification unit configured to classify trajectories into subclasses each of which is a group of similar trajectories, each of the trajectories being a trajectory of a motion of a block and being over pictures included in the video, the block including one or more pixels each of which constitutes the pictures; a distance calculating unit configured to calculate, for each of the subclasses, a point-to-point distance and a geodetic distance, the point-to-point distance being a distance directly connecting a first trajectory that belongs to the subclass and a second trajectory that belongs to another one of the subclasses, the geodetic distance being a distance of a path that passes through, as a relay point, a trajectory other than the first trajectory and the second trajectory, to reach the second trajectory from the first trajectory; and a region detection unit configured to detect, as a region having the articulated motion, two subclasses that include trajectories corresponding to two regions connected via a same articulation and including the articulated motion, based on a temporal change in the point-to-point distance and a temporal change in the geodetic distance between two given subclasses among the subclasses.

With the configuration described above, it is possible to accurately extract a region of a moving object without being affected by a change in the shape of the moving object, by extracting an articulated object region based on the temporal change in a geodetic distance and the temporal change in a point-to-point distance between subclasses.

In addition, according to a more preferable embodiment, the region detection unit is configured to detect, as the region having an articulated motion, a subclass that is one of two subclasses between which the temporal change in the point-to-point distance is larger than a predetermined threshold of the point-to-point distance and the temporal change in the geodetic distance is equal to or smaller than a predetermined threshold of the geodetic distance.

With the configuration described above, it is possible to identify a subclass that belongs to the same moving object, and thus a region of a moving object can be identified with higher accuracy.

In particular, the region detection unit may detect, as regions having the articulated motion, two subclasses that include trajectories corresponding to two regions connected via a same articulation and indicating the articulated motion, based on a temporal change in a representative value of the point-to-point distances and a temporal change in a representative value of the geodetic distances between two given subclasses. With this, it is possible to perform articulated object region detection with higher precision.

Here, as a method of calculating a representative value of distances, the representative value of the point-to-point distances between the two subclasses may be an average of the point-to-point distances between the two subclasses, and the representative value of the geodetic distances between the two subclasses may be an average of the geodetic distances between the two subclasses. Furthermore, the representative value of the point-to-point distances between the two subclasses may be a median of the point-to-point distances between the two subclasses, and the representative value of the geodetic distances between the two subclasses may be a median of the geodetic distances between the two subclasses. In addition, the representative value of the point-to-point distances between the two subclasses may be a mode value of the point-to-point distances between the two subclasses, and the representative value of the geodetic distances between the two subclasses may be a mode value of the geodetic distances between the two subclasses.

With the above configuration, it is possible to detect an articulated object region based on such representative values, thereby enabling efficient extraction of an articulated motion region at high speed. In addition, such representative values maintain a macro relationship between the geodetic distance and the point-to-point distance between the trajectories among the subclasses.

In addition, according to a more preferable embodiment of the present invention, the articulated object region detection apparatus described above further comprises an output unit configured to perform image processing on at least one of the pictures so as to be displayed in a different mode per region detected by the region detection unit, and output the picture including the region on which the image processing is performed. With the above configuration, image processing is performed in a different display mode for each of the specified regions, and thus it is possible to easily identify the detected articulated object region or moving object.

Preferably, the video is captured to image human figures as objects, and the articulated object region detection apparatus further comprises an action recognition unit configured to calculate an angle between subclasses which are included in the region detected by the region detection unit and which indicate an articulated motion, and recognize an action of the object by comparing the calculated angle with an angle which is determined in advance for each action pattern of the person. With the above configuration, it is possible to easily estimate an action of the articulated object region or moving object.

Preferably, the articulated object region detection apparatus further comprises an action detecting unit configured to detect a change in the number of connections of a moving object included in the video, based on the number of articulations between the subclasses which are included in the region detected by the region detection unit and which indicate the articulated motion. More preferable, the action detecting unit is configured to determine that an item is abandoned by the moving object when detecting a decrease in the number of connections and determine that an item is taken away by the moving object when detecting an increase in the number of connections.

With the above configuration, it is possible to easily detect taking away or abandonment action of the articulated object region or moving object.

Preferably, the articulated object region detection apparatus further comprises an image input unit configured to capture pictures included in the video; and a trajectory calculating unit configured to detect, per block including one or more pixels and constituting the captured pictures, a motion of the block between two temporally neighboring pictures included in the video, and calculate the trajectories by concatenating the detected motion for the pictures.

It is to be noted that, as to the details of the articulated motion, the articulated motion may be a motion of an object connected with joints, a motion of a string-shape object, or any articulated motion similar to the motions described above.

According to other embodiments of the present invention, an articulated object region detection apparatus is an articulated object region detection apparatus which detects a region having an articulated motion, using trajectories which correspond, in one-to-one relationship, to regions included in a moving object in a video, the articulated object region detection apparatus comprising: a subclass obtaining unit configured to obtain classification information that indicates a result of classifying trajectories into subclasses each of which is a group of similar trajectories, each of the trajectories being a trajectory of a motion of a block and obtained throughout pictures included in the video, the block including one or more pixels each of which constitutes the pictures; a distance calculating unit configured to calculate, for each of the subclasses, a point-to-point distance and a geodetic distance, based on the obtained classification information, the point-to-point distance being a distance directly connecting a first trajectory that belongs to the subclass and a second trajectory that belongs to another one of the subclasses, the geodetic distance being a distance of a path that passes through, as a relay point, a trajectory other than the first trajectory and the second trajectory, to reach the second trajectory from the first trajectory; and a region detection unit configured to detect, as a region having the articulated motion, two subclasses that include trajectories corresponding to two regions connected via a same articulation and including the articulated motion, based on a temporal change in the point-to-point distance and a temporal change in the geodetic distance between two given subclasses among the subclasses.

With the configuration described above, it is possible to accurately extract a region of a moving object without being affected by a change in the shape of the moving object, by extracting an articulated object region based on the temporal change in a geodetic distance and the temporal change in a point-to-point distance between subclasses.

It is to be noted that the articulated object region detection apparatus according to the present invention can be implemented not only by configuring each processing unit as hardware but also as an articulated object region detection method including each of the processing unit as steps, as a program on a computer to execute the articulated object region detection method, as a computer readable recoding medium which stores the program, such as a CD-ROM and an image processing apparatus which extracts or segments an object region having a motion in a video.

Embodiment 1

The following describes, with reference to the drawings, Embodiment 1 according to the present invention.

FIG. 1 is a diagram which shows a configuration of an articulated object region detection apparatus according to Embodiment 1. As shown in FIG. 1, an articulated object region detection apparatus 100 includes: an image input unit 101; a trajectory calculating unit 102; an articulated object region detection unit 103; and an output unit 104. The articulated object region detection apparatus 100 is an apparatus that detects an articulated object region in a video by performing segmentation which identifies all or part of region of the articulated object region in the video. More specifically, the articulated object region detection apparatus 100 is an apparatus that detects a region including an articulated motion, using trajectories which correspond to the respective regions included in the moving object in the video. In the present embodiment, the articulated object region detection apparatus 100 is provided with a video captured by a camera 110, detects an articulated object region in the video, generates a picture based on a result of the detection, and outputs the generated picture. A display 120 displays the picture outputted from the articulated object region detection apparatus 100. A picture is also referred to as an image in the present application.

The image input unit 101 is a processing unit that captures plural pictures included in the video, and is, for example, a camera, a communication interface connected to a camera, or the like.

The trajectory calculating unit 102 is a processing unit which calculates corresponding points between pictures based on the pictures captured by the image input unit 101, and outputs the corresponding points as the trajectories. More specifically, the trajectory calculating unit 102 detects, in units of a block including one or more pixels and constituting the pictures captured by the image input unit 101, motions of the block between two temporally neighboring pictures included in a video, and concatenates the detected motions for the pictures, thereby calculating the trajectories. The corresponding points between pictures may be calculated for each of the pixels in the picture, or may be calculated in units of neighboring pixels (block) in the picture. In the present application, it is not discriminated whether a corresponding point is calculated for each of the pixels or in units of pixels. In addition, a corresponding point for a pixel i in a picture, which is present in another picture, and a corresponding point for a block i in a picture, which is present in another picture, are both called a trajectory for the pixel i.

The articulated object region detection unit 103 is a processing unit which detects, using the trajectories calculated by the trajectory calculating unit 102, an articulated object region including an articulated motion based on a temporal change in the trajectories between the sub regions. The articulated object region detection unit 103 includes: a subclass classification unit 105; a distance calculating unit 106; and a region detection unit 107.

The subclass classification unit 105 performs clustering on the trajectories calculated by the trajectory calculating unit 102 into subclasses each of which includes at least one trajectory, based on distances between trajectories or a similarity of a speed or the like. More specifically, the subclass classification unit 105 classifies the trajectories over plural pictures included in a video, which are trajectories of motions of blocks each of which includes one or more pixels and constituting the pictures, into subclasses each of which is a group of similar trajectories.

The distance calculating unit 106 is a processing unit that calculates a distance indicating a similarity between the trajectories described above. More specifically, the distance calculating unit 106 calculates, for each of the subclasses, (i) a point-to-point distance that is a distance directly connecting a first trajectory that belongs to the subclass and a second trajectory that belongs to another subclass and (ii) a geodetic distance that is a distance of a path that passes through, as a relay point, a trajectory other than the first trajectory and the second trajectory, to reach the second trajectory from the first trajectory.

In the present embodiment, the distance calculating unit 106 extracts N trajectories which are corresponding points over T pictures (T≧2) from the trajectories calculated by the trajectory calculating unit 102, and calculates, based on the extracted trajectories, the point-to-point distance and geodetic distance indicating the similarity between the trajectories.

In the present application, the term "distance" includes not only the distance between two points in a corresponding two-dimensional image space but also an arithmetic distance between multidimensional data items, as described below. It is to be noted that a distance and a similarity generally have a contradictory relationship. To be more specific, the similarity is high when the distance between two data items is small, and the similarity is low when the distance between two data items is large.

In addition, as to the two types of distances of the "point-to-point distance" and the "geodetic distance" defined in the present application, the "point-to-point distance" refers to a distance obtained only from a distance between two data items, and the "geodetic distance" refers to a distance obtained from points passing other than two data items as described below. It is to be noted that the "point-to-point distance" according to the present application is a distance that is used as an index indicating a geometric similarity such as a position, a speed, an acceleration, and so on, in a picture coordinate between trajectories, and need not be a linear distance. In the present application, a "Euclidean distance" is used in the description below, as a representative of the "point-to-point distance". A detailed example of the above-stated distance will be described below in the explanation for the distance calculating unit 106.

The region detection unit 107 is a processing unit that calculates a representative value of geodetic distances (hereinafter referred to as a "representative geodetic distance") and a representative value of Euclidean distances (hereinafter referred to as a "representative Euclidean distance") between subclasses generated by the subclass classification unit 105, for the geodetic distances and Euclidean distances calculated by the distance calculating unit 106, and detects an articulated object region based on the calculated representative geodetic distance and representative Euclidean distance. More specifically, the region detection unit 107 detects, as regions including an articulated motion, two subclasses to which trajectories corresponding to two regions connected via the same articulation and including the articulated motion belong, based on a temporal change in the Euclidean distance and a temporal change in the geodetic distance between two given subclasses.

The output unit 104 outputs the result of detecting, performed by the articulated object region detection unit 103, the articulated object region in the video. More specifically, the output unit 104 performs image processing on the video captured by the image input unit 101 so as to be displayed, for example, in a different mode per the articulated object region identified by the articulated object region detection unit 103, and outputs, to the display 120 and the like, the video on which the image processing is performed.

In the present application, the term "region extraction" includes both of a detection technique for extracting an image region in which a particular object exists and a segmentation technique for segmenting a region in a picture regardless of what the object is. It is to be noted that, since the detection technique and the segmentation technique have a lot in common, they are not discriminated in the present application.

Furthermore in the present application, the term "moving object detection" includes both of a detection technique for identifying only an image region in which an object that moves with respect to a base coordinate system exists and a segmentation technique for segmenting a region in a picture for each object that has a relatively different movement.

Figure 2:
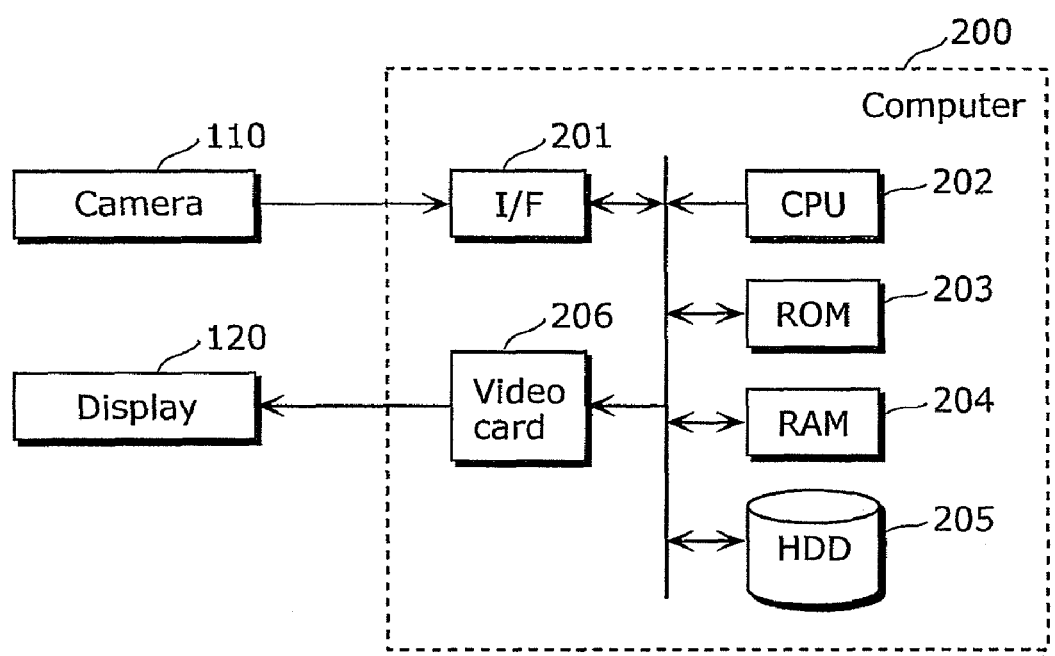
FIG. 2 is a diagram which shows a hardware configuration of the articulated object region detection apparatus configured by a computer.

It is to be noted that each of the components included in the articulated object region detection apparatus 100 (the image input unit 101, the trajectory calculating unit 102, the articulated object region detection unit 103, and the output unit 104) may be implemented as software such as a program executed on a computer, or may be implemented as hardware such as an electronic circuit or an integrated circuit. FIG. 2 is a diagram which shows a hardware configuration of the articulated object region detection apparatus implemented as software according to the present embodiment. In FIG. 2, the camera 110 captures and outputs a picture, and a computer 200 obtains, and performs articulated object region extracting processing on, the picture to generate a picture for displaying a result of the region extraction. A display 120 obtains and displays the picture generated by the computer 200. The computer 200 includes: an I/F 201; a CPU 202; a ROM 203; a RAM 204; an HDD 205, and a video card 206. The program that causes the computer 200 to operate is held by the ROM 203 or the HDD 205 in advance. The program is read by the CPU 202 that is a processor, from the ROM 203 or the HDD 205 to the RAM 204, to be developed. The CPU 202 executes each instruction that is coded in the program developed by the RAM 204. The I/F 201, in response to the execution of the program, downloads the picture captured by the camera 110, onto the RAM 204. The video card 206 outputs the picture generated in response to the execution of the program and the display 120 displays the picture.

It is to be noted that the computer program is not limited to being stored in the ROM 203 that is a semiconductor, or the HDD 205, but may be stored in a CD-ROM, for example. In addition, the computer program may be transmitted via a wired or wireless network, broadcasting, and so on, and downloaded onto the RAM 204 of the computer.

Figure 3:
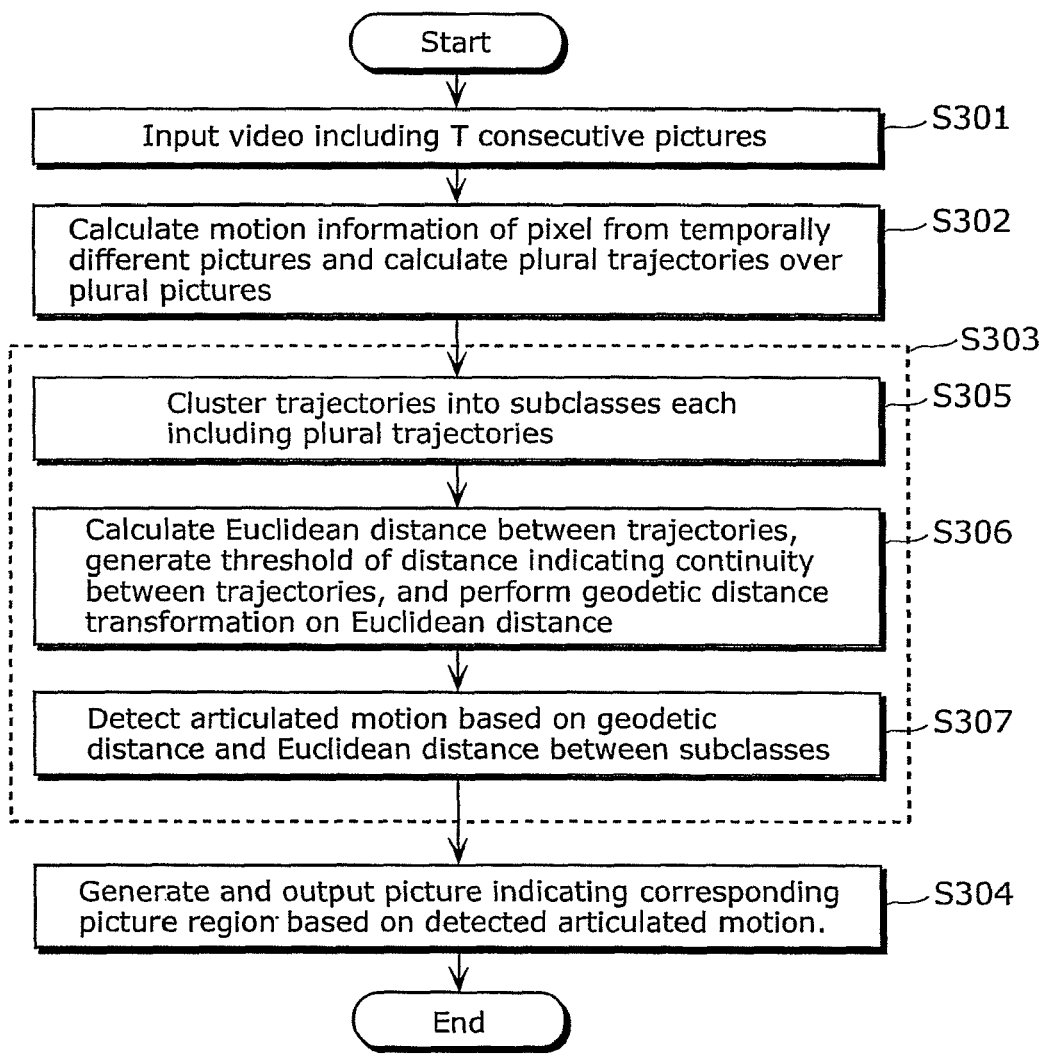
FIG. 3 is a flowchart which shows an operation procedure of the articulated object region detection apparatus.

The following describes, with reference to FIG. 3, an operation of the articulated object region detection apparatus 100 according to the present embodiment.

FIG. 3 is a flowchart that shows an operation of the articulated object region detection apparatus 100 according to the present embodiment.

In FIG. 3, seven steps S301 to S307 respectively correspond to the processing units 101 to 107 in FIG. 1 To be more specific, the image input unit 101, the trajectory calculating unit 102, the articulated object region detection unit 103, the output unit 104, execute operations of an image inputting step S301, a trajectory calculating step S302, an articulated object region detecting step S303, and an image outputting step S304, respectively. Furthermore, the articulated object region detecting step S303 includes three steps of: a subclass classifying step S305; a distance calculating step S306; and a region detecting step S307. The subclass classification unit 105, the distance calculating unit 106, the region detection unit 107 execute operations of the subclass classifying step S305, the distance calculating step S306, and the region detecting step S307, respectively.

First, the image inputting step S301 is executed by the image input unit 101. More specifically, the image input unit 101 obtains, from the camera 110, plural pictures included in a video. In the present embodiment, the video obtained by the camera 110 is a video of 30 frames per second.

Figure 4:
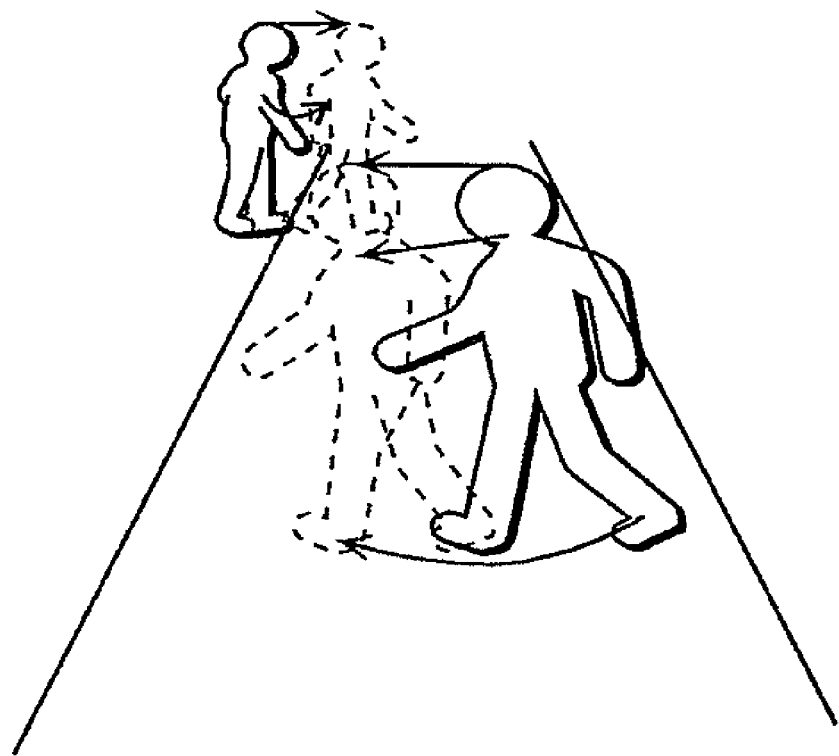
FIG. 4 is a diagram which shows an example of a picture-taking situation.
Figure 5:
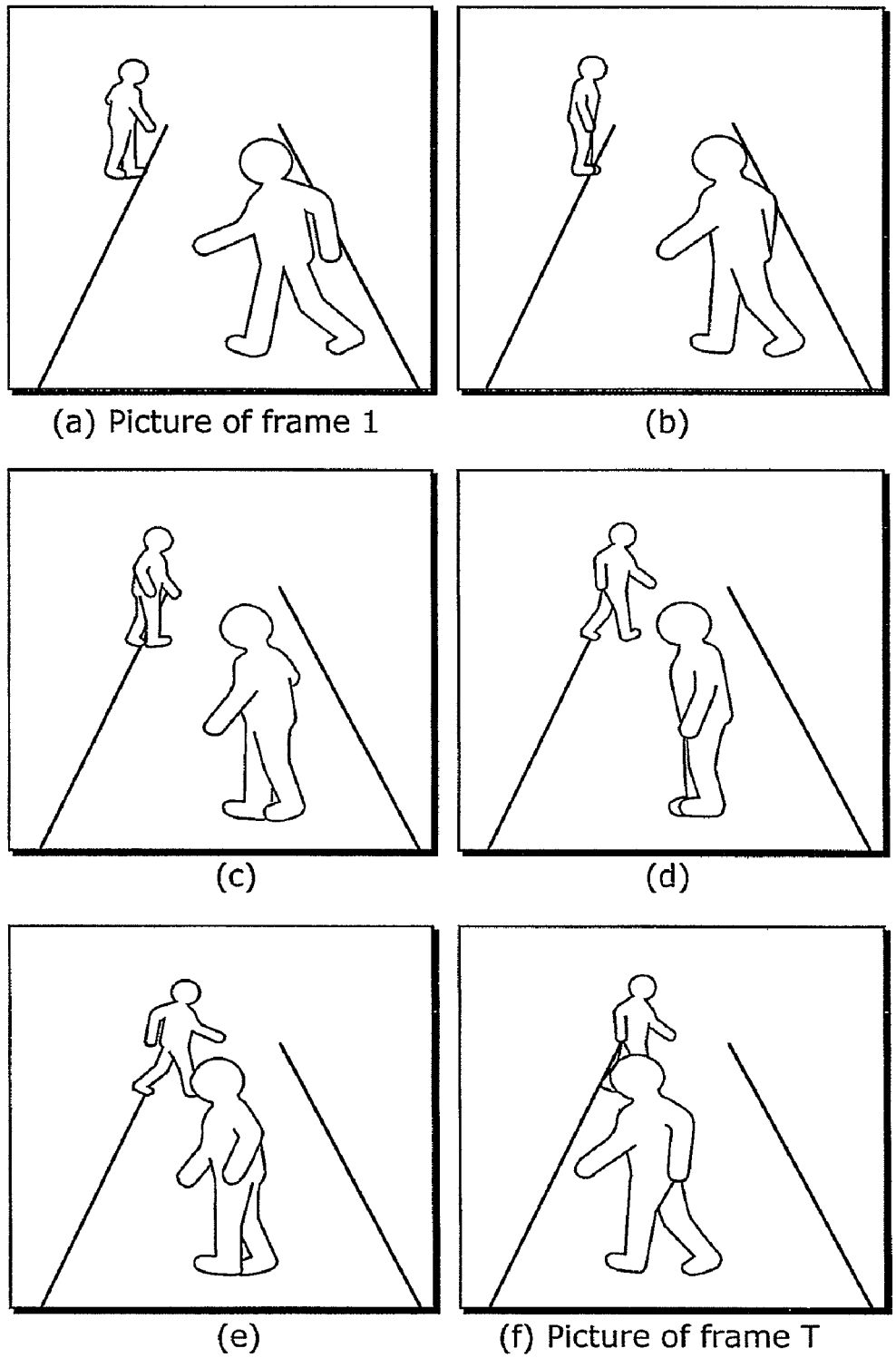
FIG. 5 is a diagram which shows an example of plural pictures.

FIG. 4 is a diagram which shows an example of a picture-taking situation. Furthermore, (a) to (f) in FIG. 5 is a diagram which shows an example of pictures captured in the picture-taking situation of FIG. 4 by the camera 110. It is assumed here that T pictures (T≧2) from frame 1 to frame T are captured by the image input unit 101. According to the present embodiment, the number of pictures T is specified in advance and assumed to be 30 frames (T=30).

Next, the trajectory calculating step S302 is executed by the trajectory calculating unit 102. To be more specific, the trajectory calculating unit 102 receives an input of pictures from the image input unit 101, detects a corresponding point between the pictures, generates trajectories, and outputs the generated trajectories. Here, as a technique for calculating a corresponding point between pictures, on the basis of all of the pixels (I pixels) on a picture of frame 1, corresponding pixels on (T−1) pictures from frame 2 to frame T are calculated.

In the following description for the present embodiment, processing per pixel is explained. When processing is carried out per block that includes pixels, data (representative value) corresponding to a block is calculated by (i) summing pixel values in the block, (ii) calculating an average of pixel values in the block, or (iii) calculating a median of pixel values in the block, and the obtained representative value is used for the processing in the same manner as in the processing per pixel.

When it is assumed that T pictures are input in step S301, for example, the trajectory calculating unit 102 uses two pictures inputted at time t and time t+1 to estimate a motion vector $(u_t^i, v_t^i)$ of a pixel i. Here, the frames need not be consecutive. The motion of a pixel may be calculated using two pictures inputted at time t and time t+n, for example. However, n need to be an integer equal to or larger than one.

As a specific method of calculating the corresponding point between the pictures described above, methods disclose by Non Patent Literature 1 (P. Anandan, "A Computational Framework and an Algorithm for the Measurement of Visual Motion", International Journal of Computer Vision, Vol. 2, pp. 283-310, 1989), Non Patent Literature 2 (Vladimir Kolmogorov and Ramin Zabih, "Computing Visual Correspondence with Occlusions via Graph Cuts", International Conference on Computer Vision, 2001), or the like may be used. Both are techniques of calculating a motion vector by calculating an optical flow. According to Non Patent Literature 1, the optical flow is calculated based on hierarchical block matching. Since smoothness between pixels is the constraint, an optical flow is obtained such that a motion vector changes smoothly between neighboring optical flows. An efficient and accurate corresponding point is obtained especially when an abrupt motion or occlusion is not included. In addition, since the reliability of estimation can be calculated, a corresponding point whose reliability is lower than a given threshold is eliminated from subsequent processing, as described below, so that a ratio of incorrect motion vector to all of the motion vectors can be lowered, thereby producing an advantageous effect of allowing more accurate estimation of an articulated object region.

On the other hand, Non Patent Literature 2 discloses an optical flow calculating technique based on graph cuts with which an accurate corresponding point is obtained densely on a picture, although high calculating costs are involved. In addition, since the region of occlusion can also be estimated with this technique, it is possible to reduce the ratio of incorrect motion vectors to all of the motion vectors by eliminating a corresponding point positioned at an occlusion region from subsequent processing, as described below, thereby producing an advantageous effect of allowing more accurate estimation of an articulated object region. Since further details are described in each of the documents, detailed explanations for them are omitted.

In addition, the trajectory calculating unit 102 may estimate an affine parameter instead of the motion vector, as motion of a pixel. At this time, motion information may be calculated for all of the pixels. In addition, when it is desired to perform processing at higher speed, a picture may be segmented into grids and motion information may be calculated only for the pixels on the grids at predetermined intervals, or a picture may be segmented into blocks and motion information may be calculated for each of the blocks, as described above.

In addition, when calculating a motion vector using the technique disclosed by Non Patent Literature 1, since the reliability can be calculated as described above, only the pixels including motion information with higher reliability may be used. Furthermore, when calculating a motion vector using the technique disclosed by Non Patent Literature 2, it is possible to estimate an occlusion, as described above. Thus, only the motion information of pixels which are not occluded may be used.

In addition, as a technique of calculating a motion of pixels, a method of calculating a motion vector by assuming affine deformation of a block may be used instead of the method of calculating a motion vector by assuming translation of a block as described above. The method of calculating a motion vector by assuming affine deformation can be implemented using the technique disclosed by Non Patent Literature 3 (Jianbo Shi and Carlo Tomasi, "Good Features to Track", IEEE Conference on Computer Vision and Pattern Recognition, pp 593-600, 1994).

With the above-described technique, an affine parameter $A_t^i$ is estimated which corresponds to motion in the vicinity of the pixel i in the picture inputted at the time t and the time t+1. As to the pixel i, the pixel position $x_t^i$ and $x_{t+1}^i$ on the picture at the time t and the time t+1 are in the relationship indicated by Expression 1.

[Math. 1]

$$x_{t+1}^i = A_t^i x_t^i \quad \text{(Expression 1)}$$

With the technique described above, it is possible to estimate the motion of the pixel i with higher accuracy especially for an object having a rotational movement, compared to the case where the technique of calculating a motion vector by assuming translation is used.

Then, the trajectory calculating unit 102 calculates a trajectory i using the corresponding point of the pixels calculated between T temporally different pictures. In the following description, a trajectory of the pixel i is referred to as a trajectory i. As shown in (a) in FIG. 6, the trajectory calculating unit 102 tracks motion of a pixel i603a and a pixel k603b, using the motion vector information 602 calculated in step S302 based on the pixel i603a and the pixel k603b of the inputted picture 601 at the time t, thereby obtaining corresponding points of the pixel i603a and the pixel k603b. At this time, the trajectory calculating unit 102 calculates a trajectory $x^i$, as shown in Expression 2, using a coordinate value $(x_1^i, y_1^i)$ of the pixel i on the picture of the frame 1 and a pixel coordinate value $(x_t^i, y_t^i)$ of the corresponding point of the pixel i at the time t.

[Math. 2]

$$x^i = (x_1^i, y_1^i, \ldots, y_t^i, \ldots, x_T^i, y_T^i) \quad \text{(Expression 2)}$$

In the present embodiment, the trajectory $x^i$ is a corresponding point over T pictures from the frame 1 to the frame T.

(b) in FIG. 6 shows an example of trajectories. The video inputted into the trajectory calculating unit 102 includes T pictures 604. In this case, the trajectories $x^i$606a and $x^k$606b are groups of corresponding points corresponding to the respective pixel i605a and pixel k605b on the frame 1, on the pictures from the frame 2 to the frame T. The trajectories $x^i$606a and $x^k$606b are represented as vectors having picture coordinate values of the respective pictures as elements.

It is to be noted that, when calculating the corresponding points between pictures by the trajectory calculating unit 102, the corresponding points may be calculated in units of neighboring pixels (block) in the picture instead of calculating a corresponding point for each of the pixels in the picture. In the present application, it is not discriminated whether a corresponding point is calculated for each of the pixels or in units of pixels. In addition, each of a corresponding point that corresponds to a pixel i of a picture, which is located in another picture, and a corresponding point that corresponds to a block i of a picture, which is located in another picture, is assumed to be called a trajectory of the pixel i.

Next, the subclass classifying step S305 is executed by the subclass classification unit 105. To be more specific, the subclass classification unit 105 generates a subclass by clustering the groups of the trajectories calculated by the trajectory calculating unit 102, using an index such as brightness, similarity of trajectories, or the like.

Figure 7:
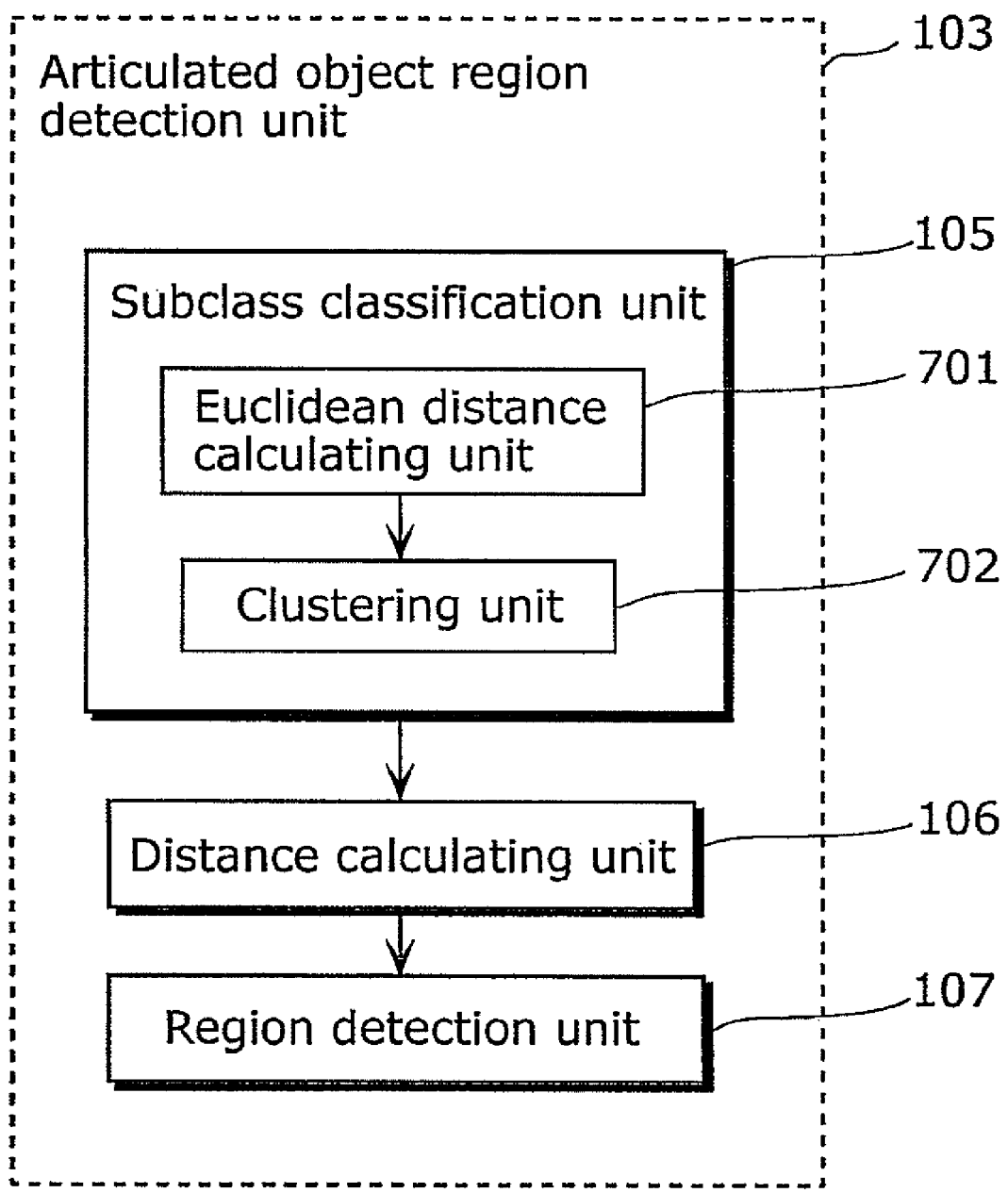
FIG. 7 is a diagram which shows a configuration of a subclass classification unit in the articulated object region detection apparatus.

In the present embodiment, the subclass classification unit 105 includes a Euclidean distance calculating unit 701 for calculating a Euclidean distance between trajectories and a clustering unit 702 for performing clustering based on the Euclidean distance, as shown in FIG. 7.

The Euclidean distance calculating unit 701 calculates, using Expression 3, a Euclidean distance f(i, j) between the trajectories of the pixel i and the trajectories of the pixel j.

[Math. 3]

$$f(i, j) = \frac{1}{T} \sum_{t=1}^{T} d_{ij}^t \quad \text{(Expression 3)}$$

$$\left(, \text{where } d_{ij}^t = \sqrt{(x_t^i - x_t^j)^2 + (y_t^i - y_t^j)^2} \right)$$

Here, the Euclidean distance f(i, j) calculated by Expression 3 is defined for between all of the trajectories for convenience of notation; however, a finite value as a Euclidean distance is obtained only between the N trajectories $x^i$.

It is to be noted that the Euclidean distance according to the present embodiment is calculated by Expression 3; however, it is not limited to this expression. An index which represents a geometric similarity, such as a position in the image coordinate between trajectories, a motion, an acceleration, and a rate of rotation, suffices as the Euclidean distance in the same manner as in Expression 3, and the Euclidean distance may be calculated using, for example, Expression 4 below.

[Math. 4]

$$f(i, j) = \frac{1}{T}\sum_{t=1}^{T} d_{ij}^t + w\sqrt{\frac{1}{T}\sum_{t=1}^{T}(d_{ij}^t - \bar{d})^2} \quad \text{(Expression 4)}$$

$$\left(\text{, where } d_{ij}^t = \sqrt{(x_t^i - x_t^j)^2 + (y_t^i - y_t^j)^2},\right.$$

$$\left.\bar{d} = \frac{1}{T}\sum_{t=1}^{T} d_{ij}^t\right)$$

In Expression 4, w denotes a weight coefficient and is a parameter that is specified by a designer. The Euclidean distance f(i, j) between trajectories in the above-described Expression 4 is obtained by adding, to a time average of the distance of the picture coordinates in the trajectories, a time variation component of the distance of the picture coordinates. The time variation component of the distance between the trajectories, in particular, indicates a similarity of motion of the trajectories. With this, it is possible to detect the similarity between the trajectories with higher accuracy even when a change in shape is involved.

The clustering unit 702 uses the Euclidean distance f(i, j) between the trajectory i and the trajectory j calculated by the Euclidean distance calculating unit 701 to repeat the processing of combining the trajectory i and the trajectory j in ascending order of f(i, j) so as to belong to the same class, thereby performing clustering.

As shown in the trajectories a to h of (a) in FIG. 8, the trajectories, even when being on the same object, significantly differ between parts due to a change in the posture. It can be assumed; however, that the trajectories particularly positioned in the neighborhood have high similarity as long as the object is articulated with joints. Here, the high similarity means that the Euclidean distance f(i, j) is small between the trajectory i and the trajectory j. In addition, when the Euclidean distance f(i, j) is small, it can be construed that the trajectory i and the trajectory j are distributed within a short distance on a higher-dimensional space including the trajectories.

(b) in FIG. 8 is a conceptual diagram of the higher-dimensional space including the trajectories. The conceptual diagram illustrates a three-dimensional space for easier description, however, each of the elements of the vector shown in Expression 2 actually has a corresponding one of the dimensions. To be more specific, the higher-dimensional space is a space in which the number of dimensions is 2×T. In addition, eight trajectories a to h are illustrated for easier description; however in practice, trajectories obtained for each of the pixels may be used or trajectories obtained for each of the blocks may be used. Here, each data point in the higher-dimensional space including the trajectories shown in (b) in FIG. 8 is associated with a corresponding one of the trajectories shown in Expression 2. To be more specific, the data points correspond to the result of tracking pixels not only in the region of a single picture but also over temporally different pictures.

The trajectories are clustered according to the continuity of the distribution on the higher-dimensional space including the trajectories, thereby clustering is performed according to the discontinuity of the distance between the trajectories. As a result, it is expected that each of the classes corresponds to an individual object or part of the object, and thus the object can be detected and segmented.

First, each region to be segmented is expressed as below.

[Math. 5]

$$\theta = \{\theta_1, \ldots \theta_m \ldots \theta_M\} \quad \text{(Expression 5)}$$

Here, M denotes the number of regions and is empirically determined according to a scene that is used.

First, the subclass classification unit 105 labels, as the same region label $\theta_m$, the trajectory i and the trajectory j which are different from each other, in ascending order of the Euclidean distance f(i, j). In performing the above processing, when one of the trajectory i and the trajectory j already belongs to the region $\theta_k$, a pixel to which the region label is not yet provided is also labeled as the region $\theta_k$. In addition, when the trajectory i and the trajectory j already belong to different regions, the region labels are integrated. Next, whether or not all of the trajectories are labeled and the number of regions is equal to the predetermined number M are determined. When the condition is not satisfied, the processing of labeling, as the same region label $\theta_m$, the trajectory i and the trajectory j in ascending order of the Euclidean distance f(i, j) is repeated. It is to be noted that, a region in which the number of trajectories that belong thereto is equal to or less than a threshold $T_{cluster}$ is treated as an outlier and may be discarded so as not to be used in the subsequent processing.

A specific example of subclass classification processing is explained with reference to (c) and (d) in FIG. 8. The cases of M=2 ((c) in FIG. 8) and M=3 ((d) in FIG. 8) are described for simplification. In actually performing subclass classification, a larger M is used so that the region of the moving object is segmented into sufficiently small units. Here, in the example shown in FIG. 8, when the distance between the trajectory a and the trajectory b is f(a, b), the following is satisfied: f(a, b)<f(g, h)<f(d, e)<f(b, c)<f(f, g)<f(c, d). First, the case of M=2 is described with reference to (c) in FIG. 8. Since the distance f(a, b) between the trajectory a and the trajectory b is the shortest, the subclass classification unit 105 provides the trajectory a and the trajectory b with the same region label $\theta_1$. Next, since the distance f(g, h) between the trajectory g and the trajectory h is the second shortest, the subclass classification unit 105 provides the trajectory g and the trajectory h with the same region label $\theta_2$. In addition, the subclass classification unit 105 provides the trajectory d and the trajectory e between which the distance is the third shortest with the same region label $\theta_3$. The next shortest distance is the distance f(b, c) between the trajectory b and the trajectory c. Here, since the trajectory b is already labeled, the subclass classification unit 105 provides the trajectory c with the region label $\theta_1$ that is the same as the region label of the trajectory b. The next shortest distance is the distance f(f, g) between the trajectory f and the trajectory g. The subclass classification unit 105 provides the trajectory f with the region label $\theta_3$ that is the same as the region label of the trajectory g in the same manner as in the case of f(b, c). Here, in the case of M=3, it is determined that all of the trajectories are labeled and M=3 is satisfied, and thus the processing is ended.

When the condition M=2 is set, the condition is not satisfied with the current classification. Thus, the subclass classification unit 105 turns again to the trajectory c and the trajectory d between which the distance is next shortest, and integrates the region label $\theta_1$ to which the trajectory c belongs and the region label $\theta_3$ to which the trajectory d belongs. Furthermore, the subclass classification unit 105 provides the trajectories a to e with the region label $\theta_1$. Here, it is determined that all of the trajectories are labeled and M=2 is satisfied, and thus the processing is ended.

According to the present embodiment, distance calculation as shown in Expression 3 or Expression 4 is performed for the trajectories, thereby enabling segmentation in consideration of the position of a pixel and the similarity of motion. Therefore, in the example as in (c) in FIG. 8, the trajectories are separated into an upper body and a lower body, reflecting that the motion of the lower body is significantly different from the motion of the upper body when M=2. Furthermore, in the example as in (d) in FIG. 8, the difference between the motion of a head-region and the motion of an arm is reflected in addition to the case of M=2, and thus it is possible to separate the trajectories into the upper body, the arm, and the lower body. Similarly, it is possible to cluster the trajectories into small regions such that an articulated motion is not included in a subclass, by employing a larger M.

As described above, a region label is provided in sequence to similar trajectories, so that the trajectories which are continuous on the higher-dimensional space can be determined as the same class and each of the classes can be separated using a discontinuity point at which the distance between the trajectories is large. This makes it possible to use the trajectories that belong to the respective classes for detection of an articulated object region.

Next, the distance calculating step S306 is performed by the distance calculating unit 106. More specifically, the distance calculating unit 106 calculates a distance indicating the similarity between each of the trajectories, using the trajectories $x^i$ calculated by the trajectory calculating unit 102. To be more specific, a Euclidean distance f(i, j) and a geodetic distance g(i, j) between the trajectories of the pixel i and the trajectories of the pixel j are calculated in a step-by-step manner.

The following describes, with reference to FIG. 9, a method of calculating a distance indicating the similarity between trajectories performed by the distance calculating unit 106.

(a) in FIG. 9 is a diagram which shows an example of a configuration of the distance calculating unit 106. The distance calculating unit 106 includes a Euclidean distance calculating unit 901 and a geodetic distance calculating unit 902.

According to the configuration shown in (a) in FIG. 9, the Euclidean distance calculating unit 901 first calculates a Euclidean distance f(i, j). It is to be noted that the operation performed by the Euclidean distance calculating unit 901 is exactly the same as the operation performed by the Euclidean distance calculating unit 701 included in the subclass classification unit 105 described above, and thus the description for that is omitted here.

It is to be noted that the distance calculating unit 106 according to the present embodiment can also be implemented with another configuration shown in (b) in FIG. 9. More specifically, the distance calculating unit 106 shown in (b) in FIG. 9 includes a Euclidean distance loading unit 903 and a geodetic distance calculating unit 902.

With this configuration, the Euclidean distance f(i, j) calculated by the Euclidean distance calculating unit 701 included in the subclass classification unit 105 is stored in a memory (not illustrated) in advance, and the Euclidean distance loading unit 903 included in the distance calculating unit 106 loads, from the memory, the Euclidean distance f(i, j) stored in the memory. With this, it is possible to omit the step of newly calculating a Euclidean distance, and thus processing at higher speed can be realized.

A set of the Euclidean distances f(i, j) between the trajectories calculated according to the procedure described above is represented as a Euclidean distance matrix F.

[Math. 6]

$$F=\{f(i,j)\} \quad \text{(Expression 6)}$$

Next, the geodetic distance calculating unit 902 of the distance calculating unit 106 calculates, using the Euclidean distance f(i, j) between the trajectories, a geodetic distance g(i, j) between the trajectories. It is to be noted that the subsequent processing procedure of the geodetic distance calculating unit 902 is commonly used for the both configurations shown in (a) and (b) in FIG. 9.

The following describes in detail the operation of calculating the geodetic distance g(i, j) using the Euclidean distance f(i, j) performed by the geodetic distance calculating unit 902.

First, the geodetic distance calculating unit 902 calculates a non-linearized distance f'(i, j) of Expression 7 using a threshold R predetermined for the calculated Euclidean distance f(i, j).

[Math. 7]

$$f'(i, j) = \begin{cases} f(i, j) & \text{if } f(i, j) < R \\ \infty & \text{otherwise} \end{cases} \quad \text{(Expression 7)}$$

Next, the geodetic distance calculating unit 902 calculates the geodetic distance from the non-linearized distance f'(i, j). The term "geodetic distance" is, when, as to plural data points defined in a given space, the data points are connected and a distance between the connected data points is obtained, a distance that is the shortest distance among the distances of all of the paths which can connect given two data points. Accordingly, the geodetic distance calculating unit 902, in calculating a geodetic distance from the i-th trajectory $x^i$ to the j-th trajectory $x^j$, calculates, as the geodetic distance, a path that is the shortest among all of the paths that pass through, as a relay point, a trajectory among other trajectories to reach the j-th trajectory $x^j$ from the i-th trajectory $x^i$.

It is assumed for example that a node distance f'(i, j) directly connecting two points of the trajectory $x^i$ and the trajectory $x^j$ is obtained. At this time, the path connecting between the two points of the trajectory $x^i$ and the trajectory $x^j$ includes a path that passes through a different trajectory $x^s$ other than the node directly connecting the two points. The distance of this path is assumed to be f'(i, s)+f'(s, j). There are more than one path connecting two points of the trajectory $x^i$ and the trajectory $x^j$ as above, and the distance shortest among those distances is calculated as the geodetic distance g(i, j) (Expression 8).

[Math. 8]

$$g(i,j)=\min(f'(i,j),f'(i,s)+f'(s,j),\ldots) \quad \text{(Expression 8)}$$

In Expression 8, min (x, y, . . . ) is a function that returns the smallest value among values such as a value x and a value y. Furthermore, s is a trajectory $x^s$ and a relay point to pass through in order to reach the trajectory $x^j$ from the trajectory $x^i$. Here, the relay point s in f'(i, s)+f'(s, j) is not limited to one point.

As to the details of the technique for searching the shortest path between two points in calculating the geodetic distance as described above, a detailed explanation for the processing procedure is omitted here because Dijkstra method disclosed in Non Patent Literature 4 (E. W. Dijkstra, "A note on two problems in connection with graphs", Numerische Mathematik, pp. 269-271, 1959) is widely known, for example.

According to the procedure described above, the geodetic distance calculating unit 902 calculates the geodetic distance g(i, j), using the Euclidean distance f(i, j) between the trajectories. It is to be noted that the method of calculating the geodetic distance is not limited to Expression 7 and Expression 8 described above.

It is further to be noted that the greatest difference between the Euclidean distance and the geodetic distance is the relationship between the two data points whose distance is to be calculated and other data points. The Euclidean distance is defined by only the two data points irrespective of the state of other data points. On the other hand, the geodetic distance is defined as a distance including the two data points and another data point on the path that can connects the two data point. In other words, the geodetic distance can be affected by the state of other data points.

A set of the calculated geodetic distance g(i, j) between the trajectories is indicated as a geodetic distance matrix G (Expression 9).

[Math. 9]

$$G=\{g(i,j)\} \quad \text{(Expression 9)}$$

The geodetic distance calculating unit 902, through the procedure described above, calculates the geodetic distance g(i, j) that represents the similarity between N trajectories and outputs the geodetic distance g(i, j) as the geodetic distance matrix G.

The following describes, with reference to the conceptual diagrams of (a) to (c) in FIG. 10, the processing of calculating a geodetic distance from the Euclidean distance between the trajectories described above.

(a) in FIG. 10 is a diagram which shows an example of the trajectories in a picture. It is to be noted that the trajectories are also calculated in a background region, however, the trajectories of the background region are not illustrated in the following description for the purpose of simple denotation.

(b) in FIG. 10 is a diagram which shows a data distribution of the trajectories each of which is represented by Expression 2. Each of the data points indicated by a symbol "X" in (b) in FIG. 10 corresponds to the trajectory $x^i$ of the pixel i shown in Expression 2. The trajectory $x^i$ is a vector including T×2 independent variables. Thus, the trajectory is, originally, data of (T×2) dimensional space at the maximum, however, is shown as a point in a three-dimensional space for convenience of notation in (b) in FIG. 10.

An arrow 1001 shown in (b) in FIG. 10 represents the Euclidean distance f(i, j) between the trajectory $x^i$ and the trajectory $x^j$, which is obtained by Expression 3. More specifically, the Euclidean distance 1001 between the data point i and the data point j is a distance obtained by directly connecting the data points.

On the other hand, an arrow 1002 shown in (c) in FIG. 10 represents the geodetic distance g(i, j) between the trajectory $x^i$ and the trajectory $x^j$, which is obtained by Expression 8. As shown in (c) in FIG. 10, the geodetic distance 1002 between the data point i and the data point j is a distance that passes through the data point s that is a relay point.

Figure 11:
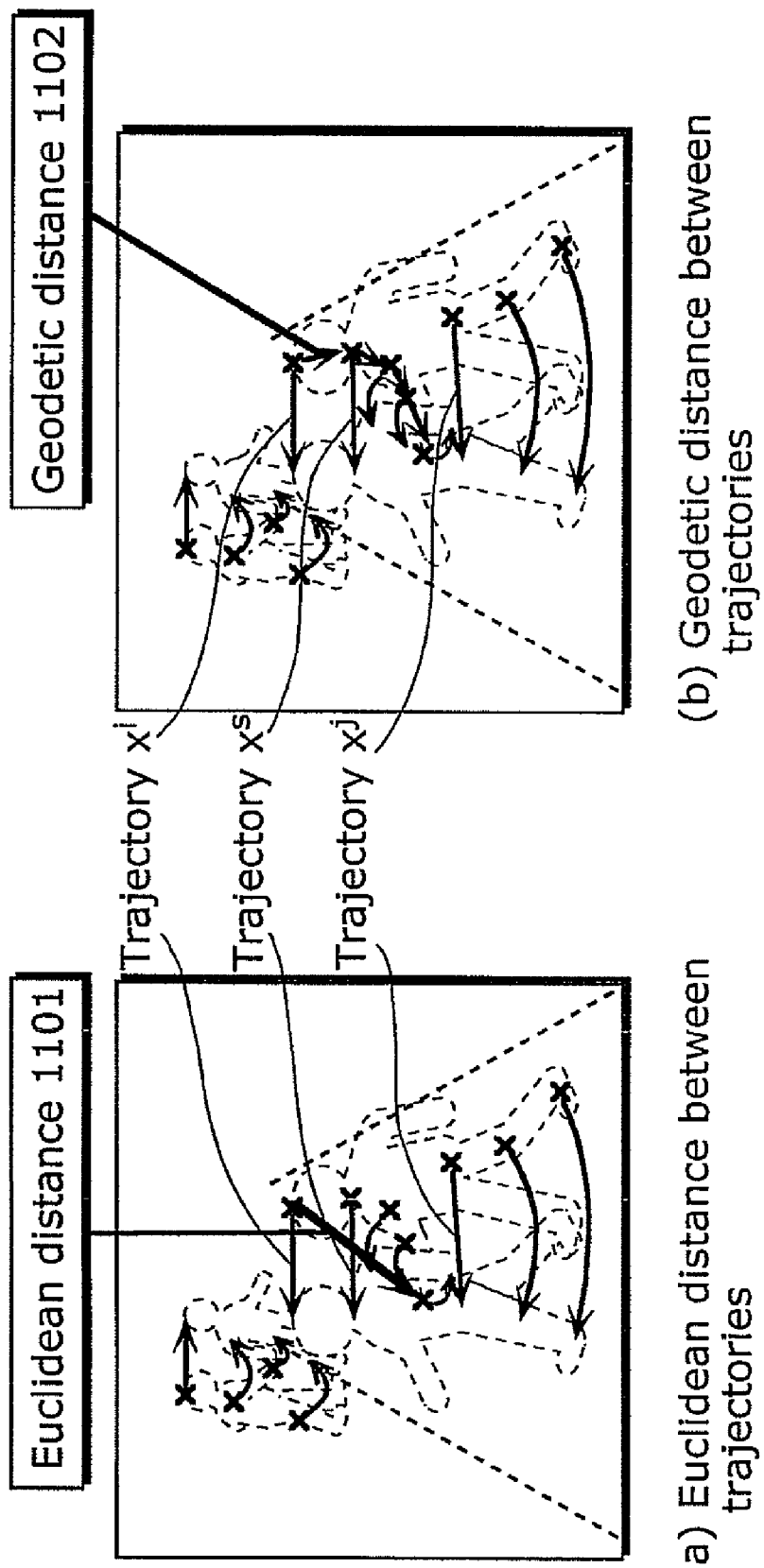
FIG. 11 is a diagram which shows a Euclidean distance and a geodetic distance between trajectories.

The following describes in more detail, with reference to the conceptual diagrams of (a) and (b) in FIG. 11, the characteristics of the Euclidean distance f(i, j) and the geodetic distance g(i, j) calculated by Expression 8.

An arrow 1101 in (a) in FIG. 11 represents the Euclidean distance between the trajectory $x^i$ of a head-region and the trajectory $x^j$ of a finger-region on a moving object in a picture. As apparent from the diagram, the Euclidean distance 1101 between the trajectories depends only on the two trajectories $x^i$ and $x^j$ which are the targets to obtain the distance and is unrelated to other trajectories.

On the other hand, a geodetic distance 1102 between the trajectory $x^i$ of the head-region and the trajectory $x^j$ of the finger-region is shown in (b) in FIG. 11. In this case, the trajectory $x^j$ is reached by passing through not only the trajectories $x^i$ and $x^j$ which are the targets to obtain the distance but also trajectories in the neighborhood such as $X^s$ as shown by a thick arrow 1102. Accordingly, the geodetic distance 1102 is a summation of the distances between the trajectories which have been passed, and thus the geodetic distance 1102 is affected by the trajectories other than the trajectories $x^i$ and $x^j$.

In other words, distribution of other trajectories is not reflected at all in the Euclidean distance 1101 shown in (a) in FIG. 11. For this reason, in moving objects with articulated movement around joints such as a person, a distance between trajectories results in a value which is independent of the shape. Contrary to the above, the geodetic distance 1102 shown in (b) in FIG. 11 is a distance reflecting other trajectories. Thus, in moving objects with articulated movement around joints, a distance between the trajectories results in a value which is dependent on the shape of the moving object. To be more specific, articulation at joints is included in a distance as information, and thus it is possible to use the information for detecting an articulation region.

As described above, the trajectory $x^i$ represented by Expression 2 is mathematically data of (T×2) dimensional space at the maximum. However, it is confirmed with experimentation by the inventors that the trajectories detected actually from a picture have the characteristic of being localized in only a small region in (T×2) dimensional space as shown in (c) and (d) in FIG. 8. For the trajectories having the characteristic described above, the geodetic distance (the geodetic distance 1102 shown in (b) in FIG. 11) that reflects density of data in the neighborhood is more suitable as a measure for a distance indicating a similarity between trajectories than the Euclidean distance (the distance 1101 shown in (a) in FIG. 11) that is a result of calculating a distance between two data items irrespective of distribution of the data.

For example, K thresholds Nk specified in advance are used instead of K thresholds $R_k$ specified in advance. Then, as processing for calculating a non-linearized distance f'k(i, j) from the Euclidean distance f(i, j), the following processing may be carried out. More specifically, the non-linearized distance f' k(i, j) may be calculated by replacing, with an infinite value, the Euclidean distance larger than the Nk-th Euclidean distance from the smallest among the Euclidean distances f(i, j) between a trajectory $x^i$ and other (I−1) trajectory, instead of the processing of Expression 7 that replaces, with an infinite value, the Euclidean distance f(i, j) equal to or larger than a threshold $R_k$.

In addition, instead of replacing the Euclidean distance with an infinite value, the non-linearized distance f'k(i, j) may be calculated by replacing, with an infinite value, the Euclidean distance between trajectories larger than the k-th smallest Euclidean distance between a trajectory.

Figure 12:
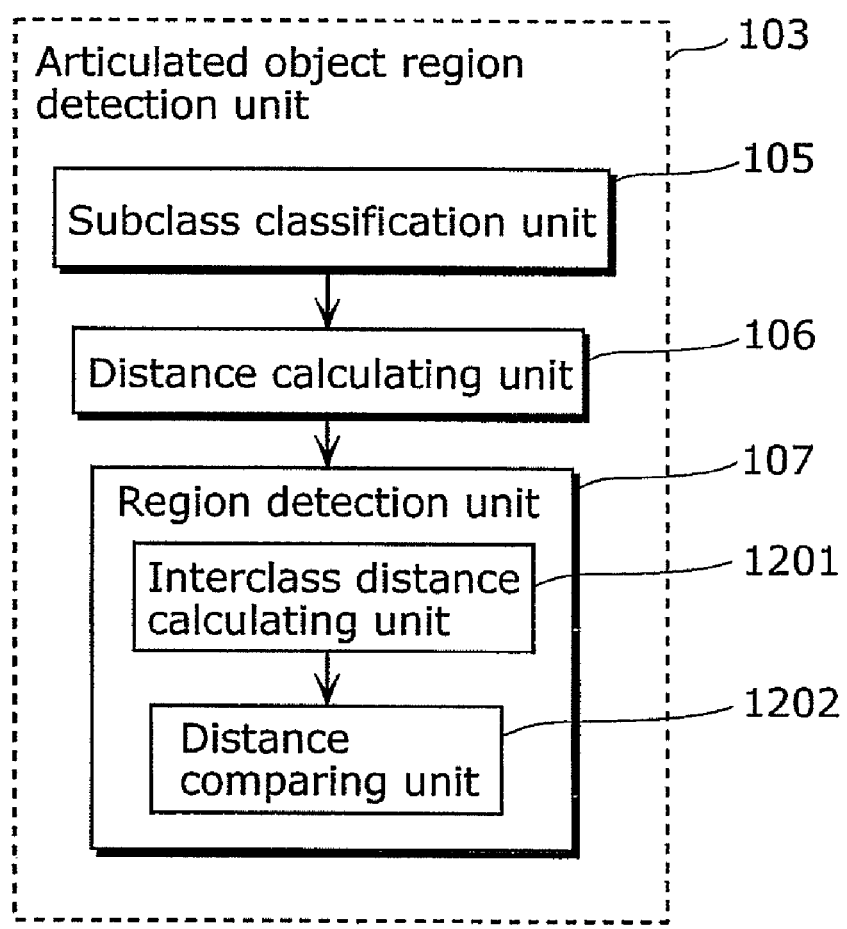
FIG. 12 is a diagram which shows a configuration of a region detection unit in an articulated object region detection unit.

Next, the region detecting step S307 is performed by the region detection unit 107. The region detection unit 107 includes an interclass distance calculating unit 1201 and a distance comparing unit 1202, as shown in FIG. 12.

The interclass distance calculating unit 1201, based on the geodetic distance and the Euclidean distance calculated by the distance calculating unit 106, calculates a representative value of the geodetic distances (representative geodetic distance) between the subclasses generated by the subclass classification unit 105 and a representative value of the Euclidean distances (representative Euclidean distance). The subsequent distance comparing unit 1202 detects an articulated object region based on the representative geodetic distance and the representative Euclidean distance calculated by the interclass distance calculating unit 1201.

The operation performed by the interclass distance calculating unit 1201 will be described in detail below.

Figure 13:
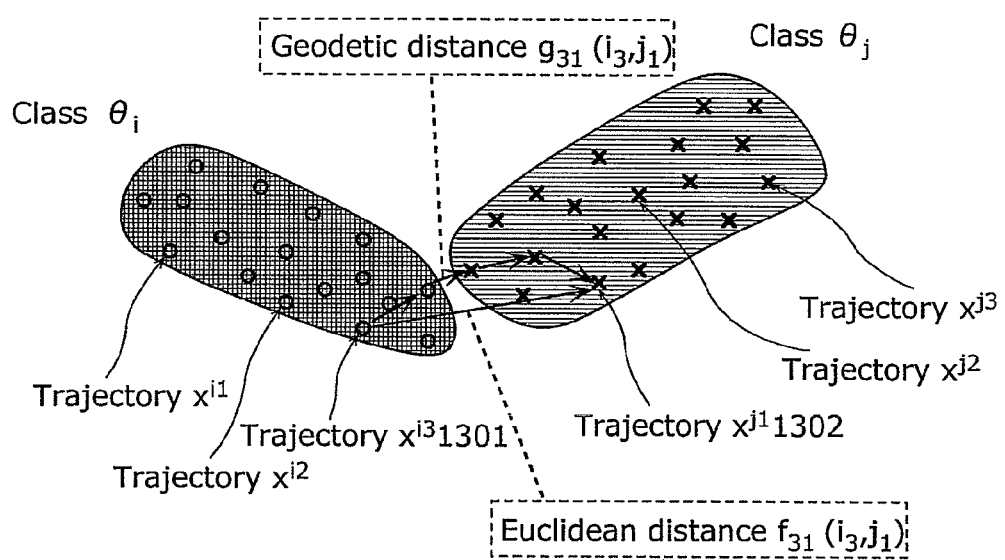
FIG. 13 is a diagram which shows the Euclidean distance and the geodetic distance between trajectories which belong to different subclasses.

FIG. 13 shows two adjacent subclasses $\theta_i$ and $\theta_j$ among the classes generated by the subclass classification unit 105. It is to be noted that, the term "subclass" is referred to simply as "class" in the description below for simplification.

When it is assumed that groups of the trajectories included in the classes $\theta_i$ and $\theta_j$ are I and J, respectively, and the number of the trajectories included by the classes $\theta_i$ and $\theta_j$ are Ni and Nj, respectively, I and J can be represented by Expression 10 and Expression 11, respectively, below.

[Math. 10]

$$I=(x^{i1}, x^{i2}, \ldots, x^{ini}, \ldots, x^{iNi}) \quad \text{(Expression 10)}$$

[Math. 11]

$$J=(x^{j1}, x^{j2}, \ldots, x^{jnj}, \ldots, x^{jNj}) \quad \text{(Expression 11)}$$

It is to be noted that $X^i$ included in Expression 10 and Expression 11 is the trajectory indicated in a form of multi-dimensional vector as in Expression 2.

Here, a distance calculated between the trajectory included in I and the trajectory included in J is defined as a interclass distance. Here, the term "distance" is assumed to be a concept that includes both of the Euclidean distance and the geodetic distance.

FIG. 13 shows a conceptual diagram of an interclass distance. When a trajectory $x^{i3}$ 1301 and a trajectory $x^{j1}$ 1302 are selected from the class $\theta_i$ and the class $\theta_j$, respectively, the Euclidean distance between the two trajectories is obtained as $f_{31}(=f(i_3, j_1))$, and the geodetic distance between the two trajectories is obtained as $g_{31}(=g(i_3, j_1))$. When all of the combinations of the trajectories between I and J are calculated as stated above, geodetic distances g and Euclidean distances f are obtained as indicated in Expression 12 and Expression 13 as below.

[Math. 12]

$$g(i,j)=(g_{11}, g_{12}, \ldots, g_{NiNj}) \quad \text{(Expression 12)}$$

[Math. 13]

$$f(i,j)=(f_{11}, f_{12}, \ldots, f_{NiNj}) \quad \text{(Expression 13)}$$

In detecting an articulated motion region according to the present application, the focus is on a group of trajectories corresponding to each of the classes as shown in I and J, and the operation is based on a temporal change in a macro distance between the classes. Therefore, it is desirable to calculate a representative value of an interclass distance.

(a) in FIG. 14 shows a conceptual diagram of a representative value (representative geodetic distance) of interclass geodetic distances and (b) in FIG. 14 shows a conceptual diagram of a representative value (representative Euclidean distance) of interclass Euclidean distances. As shown in FIG. 14, it is desirable that the representative value is a value that can approximate, for plural classes, a motion or a positional relationship between the classes.

As to the representative distance that satisfies the desirable condition described above, an average of the geodetic distances between the trajectories of each of the classes can be used as the representative value. The average is obtained by calculating geodetic distances of all of the combinations of trajectories included in each of the classes and averaging the calculated geodetic distances. The representative value of the Euclidean distances can be calculated and used in the same manner. In this case, a representative geodetic distance G ($\theta_i$, $\theta_j$) and a representative Euclidean distance F ($\theta_i$, $\theta_j$) can be calculated using Expression 14 and Expression 15 as below.

[Math. 14]

$$G(\theta_i, \theta_j) = \frac{1}{N_i N_j} \sum_{\substack{i \subset N_i, \\ j \subset N_j}}^{N_i N_j} g(i, j) \quad \text{(Expression 14)}$$

[Math. 15]

$$F(\theta_i, \theta_j) = \frac{1}{N_i N_j} \sum_{\substack{i \subset N_i, \\ j \subset N_j}}^{N_i N_j} f(i, j) \quad \text{(Expression 15)}$$

It is to be noted that, when a geodetic distance that indicates an infinite value is included in Expression 14 and Expression 15; that is, a distance indicating $g(i, j)=\infty$, such a point is eliminated from the calculation of an average.

Alternatively, the average may be calculated by calculating the maximum value gmax from all of the geodetic distances $g(i, j)$ other than the infinite value and replacing the distance indicating $g(i, j)=\infty$ with gmax. Or, only the calculation of the geodetic distances may be performed again so that $g(i, j) \neq \infty$ is obtained.

It is to be noted that the representative distance is not limited to an average value.

A median of the geodetic distances between the trajectories of each of the classes can be used as the representative value, as describe below. The median is obtained by calculating geodetic distances of all of the combinations of trajectories included in each of the classes and obtaining a median of the calculated geodetic distances. The representative value of the Euclidean distances can be calculated and used in the same manner. In this case, a representative geodetic distance G ($\theta_i$, $\theta_j$) and a representative Euclidean distance F ($\theta_i$, $\theta_j$) can be calculated using Expression 16 and Expression 17 as below.

[Math. 16]

$$G(\theta_i,\theta_j)=\text{median}[g(i,j)]_{j \subset N_j}^{i \subset N_i}, \quad \text{(Expression 16)}$$

[Math. 17]

$$F(\theta_i,\theta_j)=\text{median}[f(i,j)]_{j \subset N_j}^{i \subset N_i}, \quad \text{(Expression 17)}$$

It is to be noted that, Expression 16 and Expression 17 include Math. 18 as below $$\text{median}[f(i,j)]_{j \subset N_j}^{i \subset N_i} \quad \text{[Math. 18]}$$

Math. 18 is a function that returns a median of f(i, j) having plural values corresponding to an integer label i(i=1 to Ni) and an integer label j(j=1 to Nj).

It is to be noted that, when a geodetic distance that indicates an infinite value is included; that is, a distance indicating $g(i, j)=\infty$, the same processing as in the calculation of the average value described above may be performed on a point that indicates $g(i, j)=\infty$.

In addition, a mode value of the geodetic distances between the trajectories of each of the classes can be used as the representative value, as shown in Expression 18 below. These representative values, when calculating geodetic distances of all of the combinations of trajectories included in each of the classes, are values that appear most frequently among the classes. The representative value of the Euclidean distances can be calculated and used in the same manner according to Expression 19 below.

[Math. 19]

$$G(\theta_i,\theta_j)=\text{mode}[g(i,j)]_{j\subset N_j}^{i\subset N_i}, \quad \text{(Expression 18)}$$

[Math. 20]

$$F(\theta_i,\theta_j)=\text{mode}[f(i,j)]_{j\subset N_j}^{i\subset N_i}, \quad \text{(Expression 19)}$$

It is to be noted that, Expression 18 and Expression 19 include Math. 21 as below.

$$\text{mode}[f(i,j)]_{j\subset N_j}^{i\subset N_i} \quad \text{[Math. 21]}$$

Math. 21 is a function that returns a mode value of f(i, j) having plural values corresponding to an integer label i(i=1 to Ni) and an integer label j(j=1 to Nj).

It is to be noted that, when a geodetic distance that indicates an infinite value is included; that is, a distance indicating g(i, j)=∞, the same processing as in the calculation of the average value described above may be performed on a point that indicates g(i, j)=∞.

The following described in detail the operation performed by the distance comparing unit 1202. The distance comparing unit 1202 calculates a temporal change in the representative geodetic distance G between each of the classes and a temporal change in the representative Euclidean distance F between each of the classes, and detects, based on the result of the calculation, the class that is the articulated object region; that is, the class involving an articulated motion.

FIG. 15 is a diagram which shows temporal changes in the representative geodetic distance G($\theta_i$, $\theta_j$) and the representative Euclidean distance F ($\theta_i$, $\theta_j$) between the classes $\theta_i$ and $\theta_j$. Each of (a) and (b) in FIG. 15 shows an example of the case where two classes $\theta_i$ and $\theta_j$ involve an articulated motion. To be more specific, the classes $\theta_i$ and $\theta_j$ in these cases are considered to be articulated object regions that belong to the same moving object. On the other hand, each of (c) and (d) in FIG. 15 shows an example of the case where two classes $\theta_i$ and $\theta_j$ involve no articulated motion. In other words, the classes $\theta_i$ and $\theta_j$ are considered to be the classes that belong to different moving objects. Therefore, classes $\theta_i$ and $\theta_j$ in this case do not include an articulated object region.

Here, the focus is on the representative Euclidean distances shown in (b) and (d) in FIG. 15.

If the classes $\theta_i$ and $\theta_j$ together make an articulated motion as shown in (b) in FIG. 15, the representative Euclidean distance between the classes significantly changes over time.

Here, (d) in FIG. 15 shows an example of the case where the representative Euclidean distance is substantially constant; that is, the temporal change is approximately zero. As clearly shown in (d) in FIG. 15, it is equivalent, in this case, to that the relative positional relationship of a center of each of the classes is substantially invariable.

In an articulated object region that belongs to the same moving object, the representative Euclidean distance changes over time. Accordingly, a class in which the temporal change in the representative Euclidean distance is larger than a given threshold $F_{TH}$ is likely to be an articulated object region.

The focuses is on the representative geodetic distances shown in (a) and (c) in FIG. 15. When the classes $\theta_i$ and $\theta_j$ are not the articulated object region as shown in (c) in FIG. 15, the representative geodetic distance significantly changes over time. On the other hand, when the classes $\theta_i$ and $\theta_j$ include the articulated motion as shown in (a) in FIG. 15, the representative geodetic distance shows very little change over time. Accordingly, a class in which the temporal change in the representative geodetic distance is smaller than a certain threshold $G_{TH}$ is highly likely to be an articulated object region.

As described above, when the temporal change in the representative geodetic distance G is $G_t$ and the temporal change in the representative Euclidean distance F is $F_t$, the distance comparing unit 1202 is capable of detecting, as an articulated object region, a class of which (i) the temporal change $F_t$ in the representative Euclidean distance F between classes is larger than a certain threshold $F_{TH}$ and (ii) the temporal change $G_t$ in the representative geodetic distance G between classes is smaller than a certain threshold $G_{TH}$.

Figure 16:
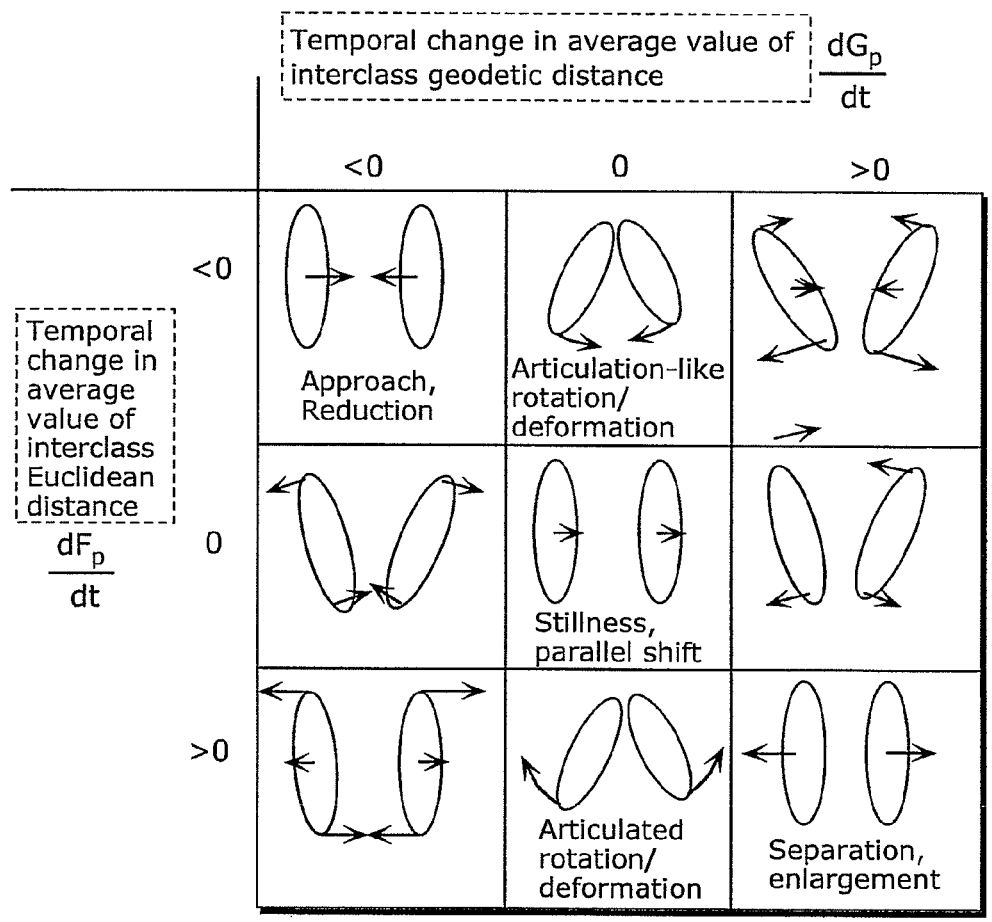
FIG. 16 is a diagram which shows an example of determination criteria of an articulation motion.

Here, the temporal change $G_t$ in the representative geodetic distance G and the temporal change $F_t$ in the representative Euclidean distance F are calculated as absolute values obtained by differentiating the representative geodetic distance G and the representative Euclidean distance F, respectively, as indicated by Expression 20 and Expression 21. The reason for calculating as an absolute value is that the result of determining whether or not an articulation motion is included is not affected by whether the distances G and F increase or decrease; that is, the direction of a differential value (FIG. 16).

[Math. 22]

$$G_t = \left|\frac{dG}{dt}\right| \quad \text{(Expression 20)}$$

[Math. 23]

$$F_t = \left|\frac{dF}{dt}\right| \quad \text{(Expression 21)}$$

It is to be noted that how to calculate the temporal change $G_t$ in the representative geodetic distance G and the temporal change $F_t$ in the representative Euclidean distance F is not limited to Expression 20 and Expression 21. As to the method similar to differential, a difference of the representative geodetic distance G and a difference of the representative Euclidean distance F may be calculated at a predetermined time interval, as the simplest method.

Figure 17A:
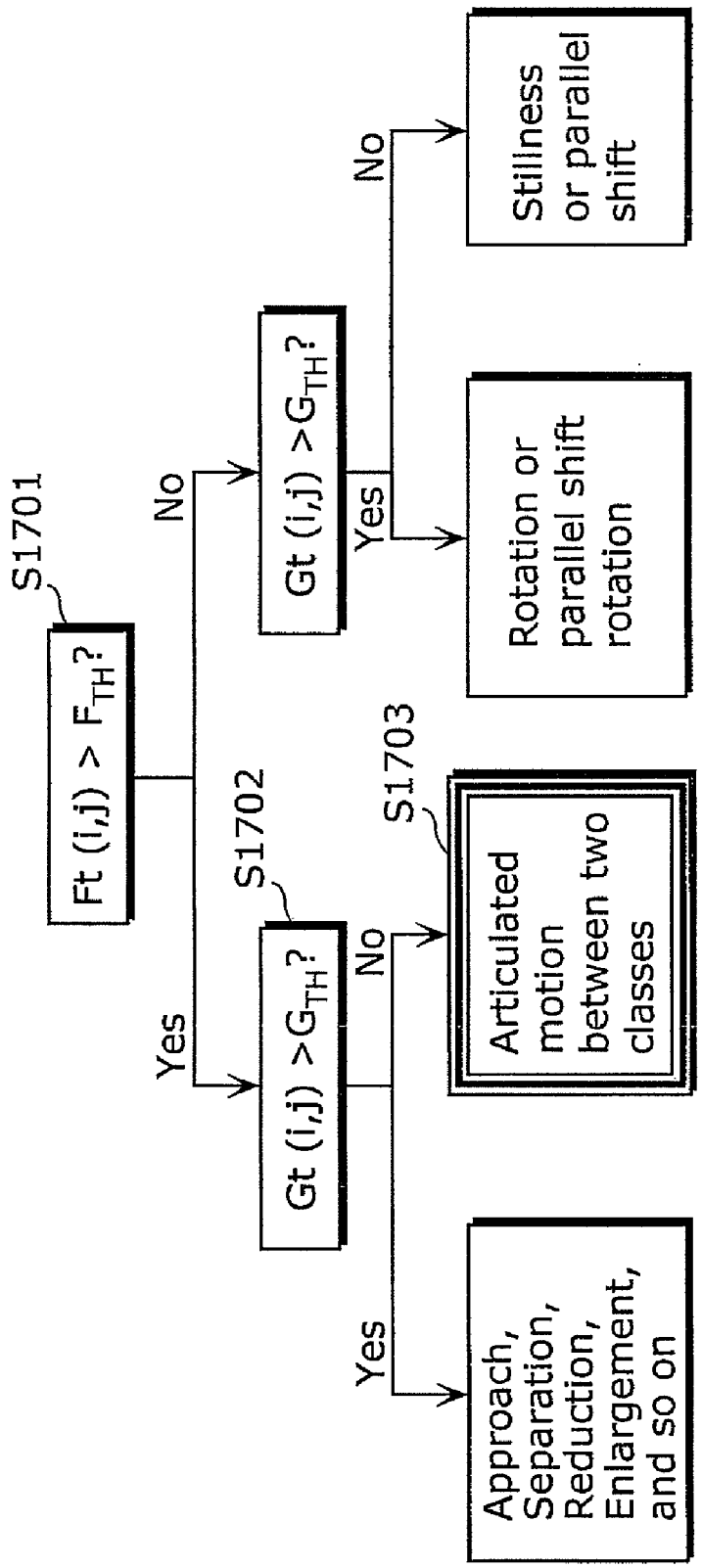
FIG. 17A is a flowchart which shows processing performed by a distance comparing unit.
Figure 17B:
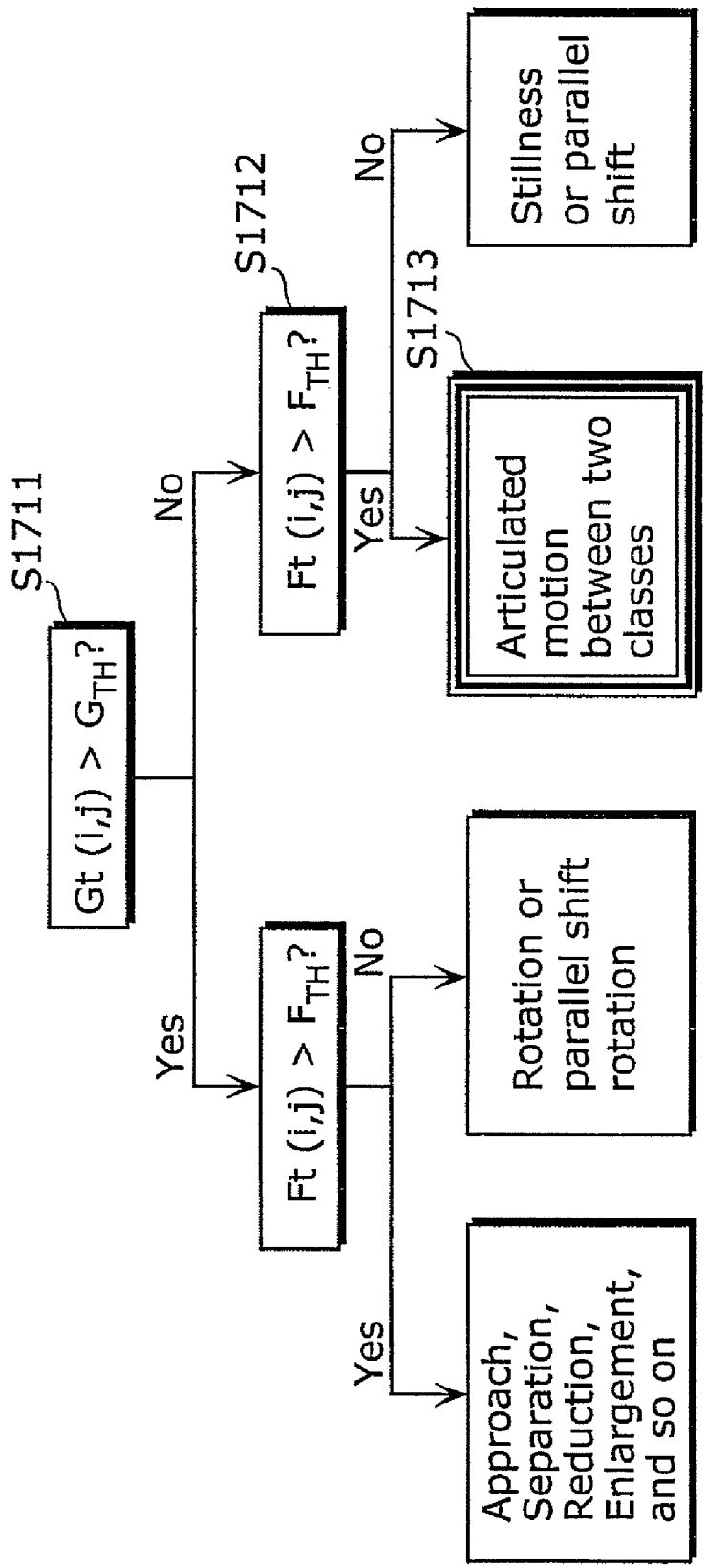
FIG. 17B is a flowchart which shows processing performed by the distance comparing unit.
Figure 17C:
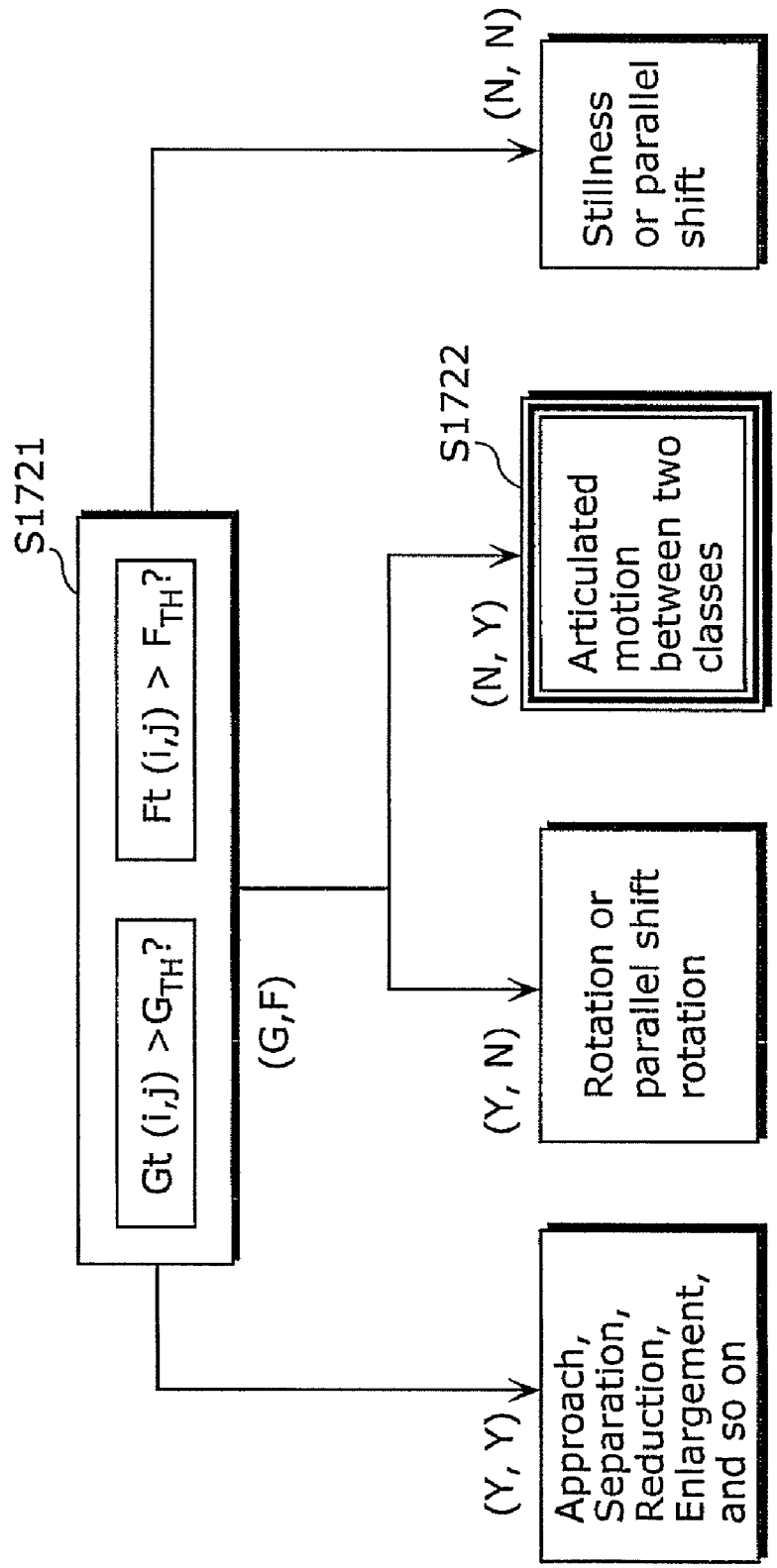
FIG. 17C is a flowchart which shows processing performed by the distance comparing unit.

FIG. 17A to FIG. 17C show flowcharts of the articulated object region determination processing described above.

As shown in FIG. 17A, the distance comparing unit 1202 first compares the threshold $F_{TH}$ with the temporal change $F_t$ in the representative Euclidean distance F for each of the interclass distances (S1701) to determine a group of classes in which the temporal change $F_t$ in the representative Euclidean distance F is larger than the threshold $F_{TH}$ (Yes in S1701). Next, the distance comparing unit 1202 compares the threshold $G_{TH}$ with the temporal change $G_t$ in the representative geodetic distance G (S1702) and determines the group of classes in which the temporal change $G_t$ in the representative geodetic distance G is equal to or smaller than the threshold $G_{TH}$ as an articulated object region that includes an articulated motion (No in S1702, S1703). It is to be noted that, when the representative geodetic distance G is infinite, the group of classes used for calculating the representative geodetic distance is eliminated from the processing.

The distance comparing unit 1202 may perform the processing shown in FIG. 17B instead of the processing shown in FIG. 17A. More specifically, the distance comparing unit 1202 first compares the threshold $G_{TH}$ with the temporal change $G_t$ in the representative geodetic distance G, for each of the interclass distances (S1711). The distance comparing unit 1202 determines a group of classes in which the temporal change $G_t$ in the representative geodetic distance G is equal to or smaller than the threshold $G_{TH}$ (NO in S1711). Next, the distance comparing unit 1202 compares the threshold $F_{TH}$ with the temporal change $F_t$ in the representative Euclidean distance F (S1712) and determines the groups of classes in which the temporal change $F_t$ in the representative Euclidean distance F is larger than the threshold $F_{TH}$ as the articulated object region that includes an articulated motion (Yes in S1712, S1713).

The distance comparing unit 1202 may perform the processing shown in FIG. 17C instead of the processing shown in FIG. 17A and the processing shown in FIG. 17B. More specifically, the distance comparing unit 1202 simultaneously performs in parallel the comparison between the threshold $G_{TH}$ and the temporal change $G_t$ in the representative geodetic distance G described above and the comparison between the threshold $F_{TH}$ and the temporal change $F_t$ in the representative Euclidean distance F (S1721). The distance comparing unit 1202 determines the groups of classes in which the temporal change $G_t$ in the representative geodetic distance G is equal to or smaller than the threshold $G_{TH}$ and the temporal change $F_t$ in the representative Euclidean distance F is larger than the threshold $F_{TH}$ as the articulated object region that includes an articulated motion ((N,Y) in S1721 (G, F), S1722). The above processing may be carried out using any one of the processes shown in FIG. 17A to FIG. 17C; however, when the characteristic of data is known or can be estimated to a certain degree, it is possible to selectively use the processes so as to efficiently perform the calculation.

When it can be estimated that the number of classes in which the temporal change $F_t$ in the representative Euclidean distance F is relatively small, for example, the Euclidean distances are compared first to substantially reduce the number of the classes, and then the flow shown in FIG. 17A in which the geodetic distances are compared is employed, so that the advantageous effect of efficient calculation can be expected. Conversely, when it can be estimated that the number of classes in which the temporal change $G_t$ in the representative geodetic distance G is relatively small, the geodetic distances are compared first to substantially reduce the number of the classes, and then the flow shown in FIG. 17B in which the Euclidean distances are compared is employed, so that the advantageous effect of efficient calculation can be expected. In other cases than those described above, especially when it can be estimated that the number of classes in which the temporal change $F_t$ in the representative Euclidean distance F is relatively large and the number of classes in which the temporal change $G_t$ in the representative geodetic distance G is relatively small are in the same range, the processes may be simultaneously carried out in parallel as shown in FIG. 17C. There is a possibility of increasing the efficiency in calculation by selecting the processes according to the situation, as described above.

Figure 18A:
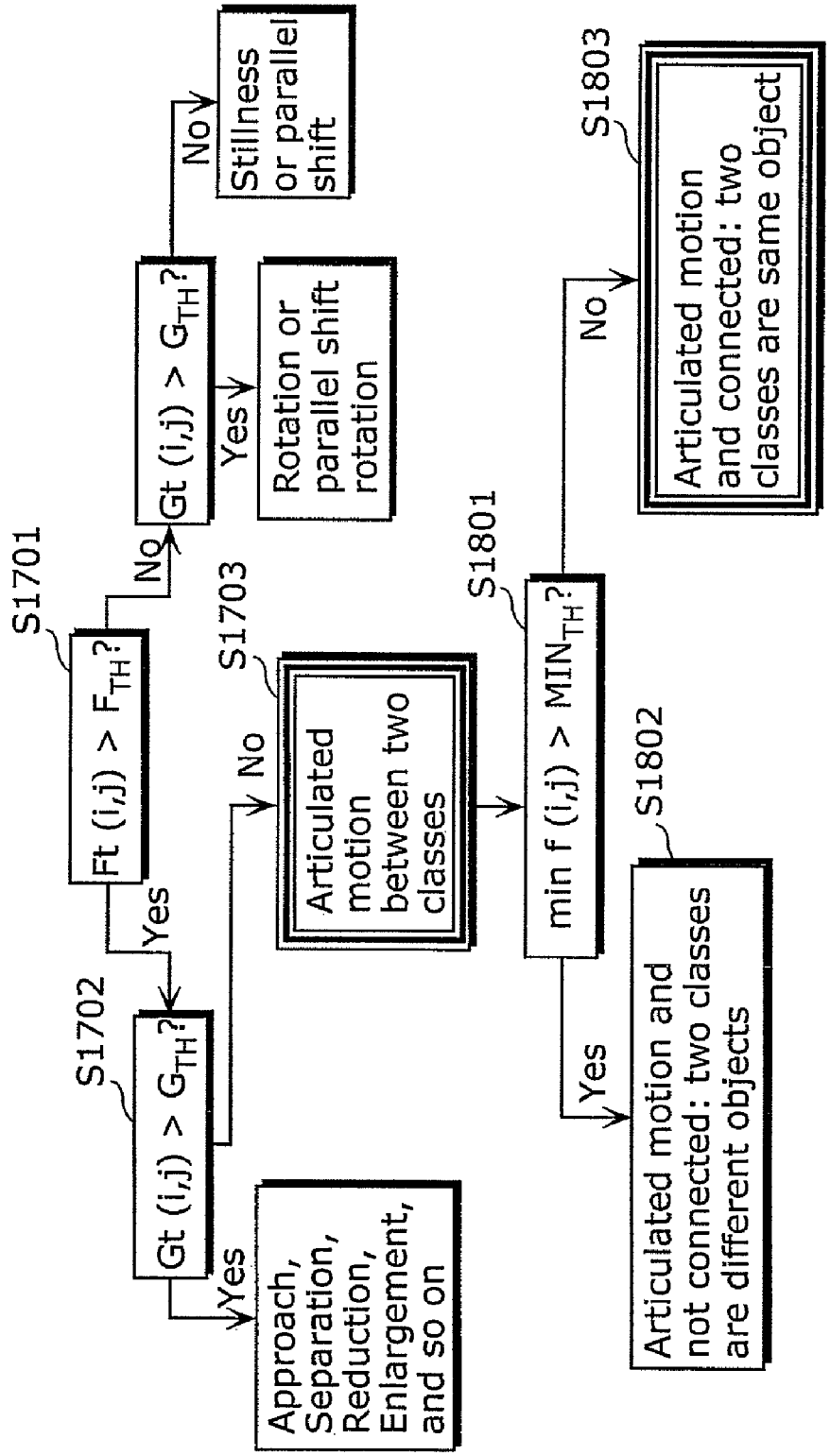
FIG. 18A is a flowchart which shows desirable additional processing performed by the distance comparing unit.
Figure 18C:
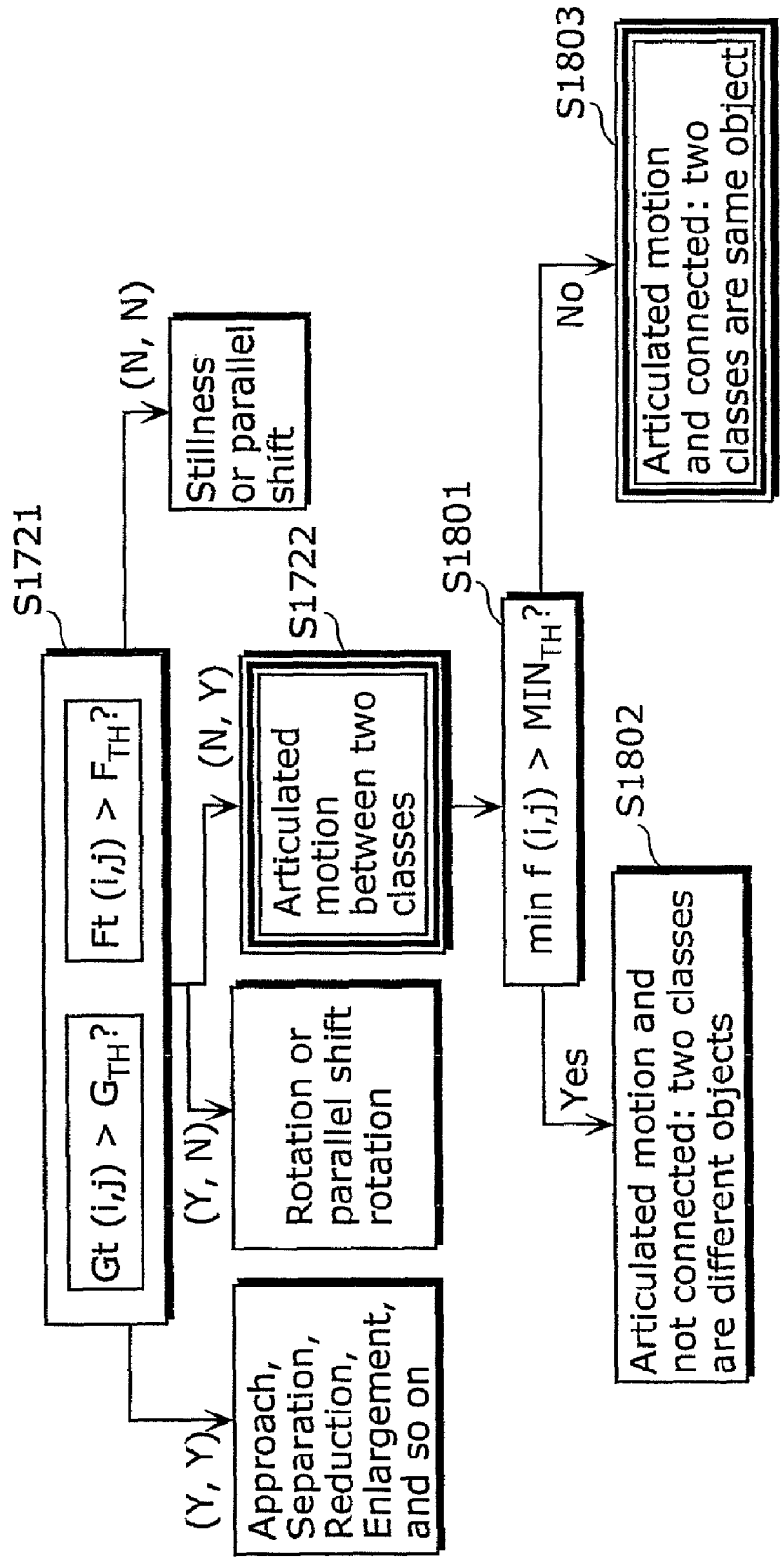
FIG. 18C is a flowchart which shows desirable additional processing performed by the distance comparing unit.

It is to be noted that the minimum value minf(i, j) of the interclass Euclidean distance or the minimum value ming(i, j) of the interclass geodetic distance may be added at the end of the processing shown in the flows of FIG. 17A to FIG. 17C, as a condition for determination. FIG. 18A to FIG. 18C show flows in which the above-described minimum distance determination flow is added to the distance determination flows of FIG. 17A to FIG. 17C, respectively.

As shown in FIG. 18A, for example, the distance comparing unit 1202 compares the minimum value minf(i, j) of the interclass Euclidean distance with the predetermined threshold $MIN_{TH}$, for the group of classes that has been determined as the articulated object region including an articulated motion (S1801). When the minimum value minf(i, j) of the interclass Euclidean distance is larger than the threshold $MIN_{TH}$ (Yes in S1801), the distance comparing unit 1202 determines that the classes in the group correspond to the articulated object region but are not connected, and thus determines that the classes in the group correspond to two different objects (S1802). On the other hand, when the minimum value minf(i, j) of the interclass Euclidean distance is equal to or smaller than the threshold $MIN_{TH}$ (No in S1801), the distance comparing unit 1202 determines that the classes in the group correspond to the articulated object region and to the same object (S1803). The processes of S1801 to S1803 shown in the flowcharts of FIG. 18B and FIG. 18C are the same as those shown in FIG. 18A, and thus detailed description is not repeated. It is to be noted that, the minimum value of the interclass Euclidean distance is compared with the threshold in the process of S1801; however, the minimum value of the interclass geodetic distance, instead of the interclass Euclidean distance, may be compared with the threshold.

The minimum value minf(i, j) of the interclass Euclidean distance indicates approximately zero in many cases in the articulated object region on the same object shown in (a) in FIG. 15 and the like. Accordingly, when the minimum value minf(i, j) of the interclass Euclidean distance or the minimum value ming(i, j) of the interclass geodetic distance is smaller than the predetermined threshold $MIN_{TH}$, there is a significantly high possibility of being the articulated object region on the same object. Thus, there is an advantageous effect of detecting an articulated object region on the same moving object with higher accuracy.

It is to be noted that the processing performed by the distance comparing unit 1202 according to an embodiment of the present invention can be used not only for detection of an articulated object region but also for detection of a state between classes, such as approach or parallel shift, as shown in the table of FIG. 16 or the flowcharts of FIG. 17A to FIG. 18C. When the temporal change $F_t$ of the representative Euclidean distance F is smaller than the threshold $F_{TH}$, for example, it is considered that the center of two classes makes parallel shift or remains still. In addition, the state of two classes can be estimated in more detail using information of the temporal change $G_t$ of the representative geodetic distance G. It can be estimated that the two classes are making parallel shift when the temporal change $G_t$ of the representative geodetic distance G is small and that the two classes are moving as different objects with the positional relationship of each of the centers being relatively remained when the temporal change $G_t$ of the representative geodetic distance G is large. As described above, it is possible to obtain useful information as to the relationship between classes by utilizing output of the distance comparing unit 1202. There is an advantageous effect of implementing detection of a moving object with higher accuracy by integrating such information and enhancing motion information between the classes.

Lastly, the image outputting step S304 is executed by the output unit 104. To be more specific, the output unit 104 generates and displays on the display 120 a picture based on the information of an articulated object region.

In the present embodiment, the output unit 104 performs image processing on, and outputs to the display 120, a video captured by the image input unit 101 so as to be displayed in a display mode in which the articulated object region identified by the articulated object region detection unit 103 can be visually recognized.

Figure 19:
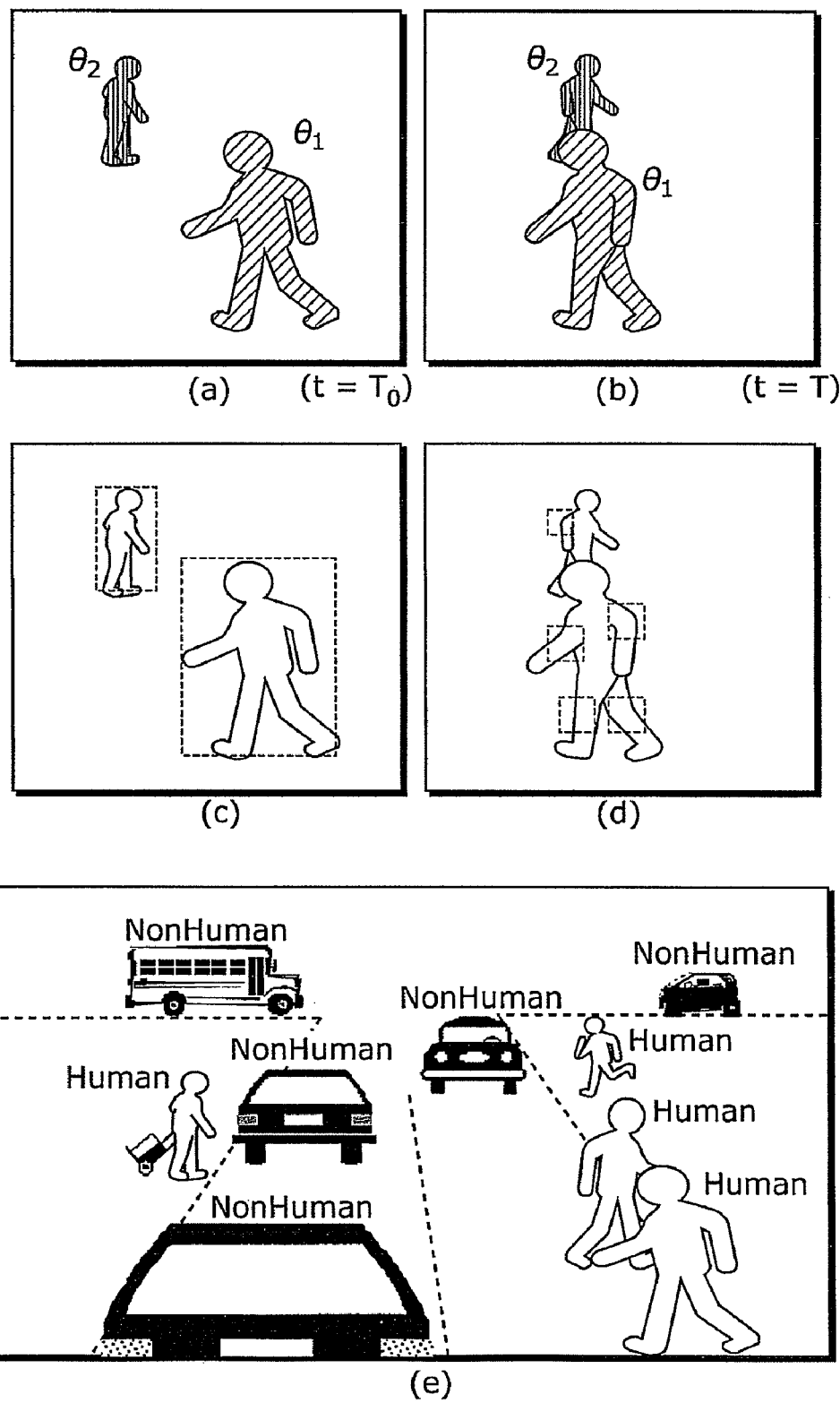
FIG. 19 is a diagram which shows an example of an image generated in an image outputting step.

FIG. 19 shows an example of a picture generated by the output unit 104.

When color coded for each of the subclasses extracted as the same moving object that involves an articulated motion, the subclasses calculated by the subclass classification unit 105 are displayed as shown in (a) and (b) in FIG. 19. In these examples, two moving objects are displayed in two different colors. With such an display mode, an advantageous effect is produced which makes it possible to accurately detect a moving object in a picture and display the result so as to be easily recognized.

In order to visually recognize a position of a moving object, it is necessary to at least roughly present the position. Thus, the color-coding need not be performed on the entire region and only an outer frame may be displayed as shown in (c) in FIG. 19. As an advantage, it is possible to present the moving object region with virtually no change in the way the moving object is viewed.

In addition, as shown in (d) in FIG. 19, when two classes include an articulated object region between detected subclasses, it is possible to easily recognize a region that involves an articulated motion, by displaying a sign (a square box in the case of (d) in FIG. 19) showing "being a connection region" between the classes.

It is also possible, in a picture in which a human and a car are present at the same time, for example, to add a term "Human" to a moving object involving an articulated motion and a term "Non Human" to an object not involving an articulated motion, by integrating the variety of information described above, as shown in (e) in FIG. 19. It is considered to be useful when informing a driver of a situation in front of him while he is driving, for example. In addition, since a moving object to which a label "Human" is added is considered to be close to a camera (own vehicle) when the size of the moving object in a picture is large, a useful function can be expected to be applied to the support for safe driving and the like, through the processes such as displaying or sounding an alarm in such a case.

It is to be noted that the output unit 104 generates a picture by drawing, with a color corresponding to a segmentation region, a pixel at a picture coordinate position of a trajectory; however, the method of generating a picture is not limited to this. To be more specific, it is possible to draw all of the pixels in the picture with a color corresponding to the class with the above-described method as long as the number of trajectories and the number of pixels in the entire picture are the same. On the other hand, in the case where the number of trajectories is smaller than the number of pixels in the entire picture, a pixel that does not match any picture coordinate position of trajectories exists.

Such a pixel that does not match a picture coordinate position of any trajectories may be drawn with a different method. For example, in the trajectory calculating unit 102, a pixel that belongs to a block used for motion estimation for generating a trajectory may be drawn by the same color as a subclass to which the trajectory belongs.

In addition, as another method of drawing a pixel that does not match a picture coordinate position of any trajectories, the color same as the subclass to which the trajectory in the neighborhood belongs may be used for the drawing.

Furthermore, as yet another method of drawing a pixel that does not match a picture coordinate position of any trajectories, picture coordinate positions (points) of plural trajectories may be connected by Delaunay triangulated mesh generating method, and a pixel included in a triangle surrounded by three points that belong to the same class may be drawn with the color same as the class.

It is to be noted that, when processing a video consecutively inputted, the aforementioned Steps S301 to S307 may be repeated every time a T number of pictures are inputted.

With the articulated object region detection apparatus and the method according to the present embodiment as described above, it is possible to detect an articulated object region in a picture irrespective of a posture of an articulated object, as a result of temporally tracking a region of the object that moves in the picture, by determining the articulated object region based on a temporal change in representative values of a Euclidean distance and a geodetic distance of trajectories between subclasses in the picture.

Furthermore, since it is not necessary to set a human candidate region as preprocessing, no failure occurs in region extraction due to an error in detecting the human candidate region.

As described above, by performing clustering based on the interregional geodetic distance without requiring fitting of a vast quantity of parameters, it is possible to stably extract an articulated object region from a picture including a human or the like which moves changing its shape, thereby allowing accurate detection of the moving object in the picture.

It is to be noted that, the number of pictures T of the trajectories extracted by the distance calculating unit 106 from the trajectories generated by the trajectory calculating unit 102 is T=30 in the articulated object region detection apparatus according to the present embodiment; however, the number of pictures T of the trajectories is not limited to this numerical value. For example, another numerical value may be used according to a type or state of a moving object to be detected. For example, when a target of detection can be assumed to be a walking person, since an average walking cycle is approximately 1 second (30 frames), the trajectory over pictures of T=30 frames corresponds to one walking cycle of a person. As described above, when a target of detection is a moving object having a periodical change in shape, the influence of change in shape of the moving object is reduced by setting the number of pictures T of a trajectory to be extracted by the distance calculating unit 106 as the number of pictures corresponding to a cycle of change in shape of the moving object, thereby producing an advantageous effect of enabling more accurate extraction of the moving object. In addition, when a moving object region of which trajectories over T pictures cannot be calculated due to the influence of occlusion or the like exists in a picture, an advantageous effect is produced that a region of the moving object can be more specifically detected, by setting, as S (S<T), the maximum number of pictures of which the trajectories can be calculated.

It is to be noted that, in the articulated object region detection apparatus according to the present embodiment, it has been described that the number of pictures T for obtaining trajectories extracted by the distance calculating unit 106 is specified in advance and constant; however, the number of pictures T used for calculating each of the trajectories may be dynamically changed.

As a technique for dynamically changing the number of pictures T of the trajectory, for example, an upper limit for the number of trajectories may be specified in advance and the number of pictures T may be dynamically changed so as not to significantly exceed the upper limit. More specifically, an upper limit Nmax for the number of trajectories may be specified in advance and the number of pictures T may be increased when the number of trajectories extracted by the distance calculating unit 106 from trajectories over the predetermined number of pictures T exceeds Nmax. Here, when a large number of trajectories are given, it is possible to calculate a large number of corresponding points over all of the pictures, for such reasons as change in video being small, motion of an object being small, and occluded region due to motion being small. In such a case, it can be expected to produce an advantageous effect that a moving object can be accurately detected by increasing the number of pictures T so as to include more items of motion information in a moving region.

In addition, as another technique for dynamically changing the number of pictures T of the trajectory, for example, a lower limit for number of trajectories may be specified in advance and the number of pictures T may be dynamically changed so as not to fall below the lower limit. More specifically, the lower limit Nmin for the number of trajectories may be specified in advance and the distance calculating unit 106 may use, when the number of trajectories over the predetermined number of pictures T falls below Nmin, use a smaller number of pictures T so that the number of the trajectories exceed Nmin. With the processing described above, it is possible to prevent trajectories from falling below the number of trajectories specified in advance. Thus, it is less likely to occur that the number of trajectories extremely decreases in video in which the number of trajectories is relatively small due to occlusion caused by a motion of an object in the video, for example. This results in an advantageous effect that it is less likely to occur that segmentation cannot be performed.

It is to be noted that, in the present embodiment, a Euclidean distance is used as a point-to-point distance; however it is not limited to the Euclidean distance, as described above. The present invention also includes an embodiment in which an arbitrary distance index defined with the aforementioned point-to-point distance is used.

It is to be noted that the articulated object region detection apparatus and method according to an implementation of the present invention is not limited to the embodiment described above, but includes an embodiment obtained by modifying the above-described embodiment by those skilled in the art and an embodiment obtained by arbitrarily combining components in the embodiments including each of the modifications described below.

Modification 1 of Embodiment 1

The following describes an articulated object region detection apparatus according to Modification 1 of Embodiment 1 of the present invention.

In the description for the articulated object region detection apparatus in Embodiment 1, the subclass classification unit 105 obtains a subclass based on a Euclidean distance $f(i, j)$ calculated using Expression 3. However, the operation of the subclass classification unit 105 is not limited to the above. More specifically, the subclass classification unit 105 may classify trajectories into subclasses based on a color similarity between blocks that belong to the respective trajectories. The following describes an example of performing clustering based on the color similarity of pixels.

(a) in FIG. 20 is a diagram which shows a configuration of an articulated object region detection apparatus of Modification 1 according to Embodiment 1. As shown in (a) in FIG. 20, the articulated object region detection apparatus includes: the image input unit 101; the trajectory calculating unit 102; the articulated object region detection unit 103; and the output unit 104. The articulated object region detection unit 103 includes: a subclass classification unit 1901; the distance calculating unit 106; and the region detection unit 107.

First, description for the same part as Embodiment 1; that is, the part other than the subclass classification unit 1901, will be omitted.

As a technique of calculating a subclass by the subclass classification unit 1901, a method of dividing a picture into subclasses called "superpixel" based on a color similarity of pixels may be used instead of a method of calculating a subclass using the labeling of similar trajectories described in Embodiment 1. For the method of calculating superpixel, a graphically-based technique and the like can be used. Although a detailed explanation for processing procedures is omitted because it is described in Non Patent Literature 5 (Pedro F. Felzenszwalb and Daniel P. Huttenlocher, "Efficient Graph-Based Image Segmentation", International Journal of Computer Vision, Vol. 59, No. 2, pp. 167-181, September, 2004) and so on, a boundary between each of the regions is estimated based on a graph expression of a picture, thereby segmenting the picture into sub regions while maintaining the efficient and global characteristics. This technique is robust over occlusion, and thus produces an advantageous effect of enabling robust segmenting. (b) in FIG. 20 shows a configuration of the subclass classification unit 1901 according to Modification 1 of the present embodiment. The subclass classification unit 1901 includes a clustering unit 1902. The clustering unit 1902 classifies a picture into plural subclasses based on the color similarity described above. With the configuration of the subclass classification unit 1901 according to the present modification, the Euclidean distance calculating unit of the subclass classification unit 105 shown in FIG. 7 is not necessary, and thus there is an advantageous effect of allowing classification into subclasses with easier configuration at higher speed.

With the procedure described above, it is possible to separate a picture into subclasses and use the trajectories that belong to the respective subclasses for detection of an articulated object region.

Modification 2 of Embodiment 1

The following describes an articulated object region detection apparatus according to Modification 2 of Embodiment 1 of the present invention.

In the description for the articulated object region detection apparatus in Embodiment 1, the subclass classification unit 105 obtains a subclass based on a Euclidean distance $f(i, j)$ calculated using Expression 3. However, the operation of the subclass classification unit 105 is not limited to the above. The following describes an example of performing classification into subclasses by performing dimensionality reduction on a geodetic distance $g(i, j)$.

(a) in FIG. 21 is a diagram which shows a configuration of an articulated object region detection apparatus of Modification 2 according to Embodiment 1. As shown in (a) in FIG. 21, the articulated object region detection apparatus includes: the image input unit 101; the trajectory calculating unit 102; the articulated object region detection unit 103; and the output unit 104. The articulated object region detection unit 103 includes: a subclass classification unit 2001; the distance calculating unit 106; and the region detection unit 107.

First, description for the same part as Embodiment 1; that is, the part other than the subclass classification unit 2001, will be omitted. (b) in FIG. 21 shows a configuration of the subclass classification unit 2001 according to Modification 2 of the present embodiment. The subclass classification unit 2001 includes a distance calculating unit 2002 and a clustering unit 2003. The subclass classification unit 2001, unlike the configuration of the subclass classification unit 105 shown in FIG. 7, includes the distance calculating unit 2002 instead of the Euclidean distance calculating unit 701. The distance calculating unit 2002 calculates a Euclidean distance f(i, j) from the trajectory calculated by the trajectory calculating unit 102 according to Expression 3, and calculates a geodetic distance g(i, j) according to Expression 7 and Expression 8. It is to be noted that the calculation procedure for the geodetic distance g(i, j) is the same as the operation performed by the distance calculating unit 106 described in Embodiment 1, and thus the description for that is omitted.

Next, the clustering unit 2003 performs dimensionality reduction on the calculated geodetic distance g(i, j), and performs clustering on the trajectory such that the smallest within-class variance is obtained when the number of classes is given, using the geodetic distance on which dimensionality reduction is performed.

The dimensionality reduction can be achieved by performing Young-Householder transformation and then generating Eigensystem. The dimensionality reduction is a method for effectively projecting data distributed in a multidimensional space, on a low-dimensional space. The following describes a procedure with which the clustering unit 2003 performs dimensionality reduction on a geodetic distance g(i, j) and performs clustering on the trajectory.

A matrix configured by the geodetic distance g(i, j) is assumed to be a geodetic distance matrix G (Expression 22).

[Math. 24]

$$G = \{g(i,j)\} \quad \text{(Expression 22)}$$

The clustering unit 2003 performs, on the geodetic distance matrix G, Young-Householder transformation in which a centering matrix H is multiplied from the both sides. This is to transform a distance matrix composed of a distance between points, to a distance matrix having a median point as a position of the origin.

[Math. 25]

$$\tau(G) = \frac{HG^{(2)}H}{2} \quad \text{(Expression 23)}$$

Here, H denotes a centering matrix.

[Math. 26]

$$H_{ij} = (I - 1/NS) \quad \text{(Expression 24)}$$

I denotes a unit matrix and N denotes the number of trajectories.

In addition, the following Expression is satisfied.

[Math. 27]

$$G^{(2)} = \{g(i,j)^2\} \quad \text{(Expression 25)}$$

Next, the clustering unit 2003 calculates, in order to perform dimensionality reduction, a P number of eigen vectors $e_p$ with respect to T(G) and corresponding eigen values $\lambda_p$.

It is assumed that the following expression is satisfied as to the geodetic distance g(i, j).

[Math. 28]

$$g^i = (g(i,1), g(i,2), \ldots, g(i,N_S)) \quad \text{(Expression 26)}$$

Then, the result of projecting a geodetic distance $g^i$ in a space on which dimensionality reduction is performed can be represented as data $z_p^i$ by the following expression.

[Math. 29]

$$z_p^i = \sqrt{\lambda_p} e_p^i \quad \text{(Expression 27)}$$

It is to be noted that $e_p^i$ is the ith element of the pth eigen vector $e_p$. The number of the eigen vectors P may be experimentally determined according to a scene used, or based on a result of calculating a contributing rate $a_p$ from the eigen value $\lambda_p$ as below.

[Math. 30]

$$a_p = \frac{\sum_{p=1}^{P} \lambda_p}{\sum_{p=1}^{N} \lambda_p} \quad \text{(Expression 28)}$$

Here, P is the number of eigen vectors that are used; that is, the number of dimensions in a reduced space. N is the number of all of the eigen vectors. Thus, the number of eigen vectors is determined as P at the time when the contributing rate $a_p$ is equal to or higher than a predetermined value.

The clustering unit 2003 performs dimensionality reduction on the geodetic distance g(i, j) with the processing from Expression 22 to Expression 27, as described above. With this, it is possible to associate the geodetic distance $g^i$ calculated by the distance calculating unit 2002 and a corresponding virtual trajectory, with the data $z_p^i$ in the space on which dimensionality reduction is performed and which is spanned by the eigen vector $e_p$.

FIG. 22 shows a result of projecting, on a space on which dimensionality reduction is nonlinearly performed, a temporal trajectory of a pixel i, when an image of a walking person is inputted. (a) in FIG. 22 is a diagram which shows a data distribution of a trajectory before dimensionality reduction is performed in a multidimensional space. The diagram illustrates a multidimensional space as a three-dimensional space for easier description; however, each of the elements of the vector shown in Expression 2 actually has a corresponding one of the dimensions. (b) in FIG. 22 shows a space after dimensionality reduction is performed on the multidimensional space of the trajectory shown in (a) in FIG. 22. The vertical axis and the horizontal axis shown in (b) in FIG. 22 are eigen vectors $e_1$ and $e_2$, respectively. The points $(z_1^i, z_2^i)$ projected on the two-dimensional space are projection of the geodetic distance $g^i$. Here, the data $z_p^i$ on a nonlinear space and the trajectory $x^i$ of the pixel i in a picture are in a one-to-one correspondence relationship.

Thus, it can be said that the points $(z_1^i, z_2^i)$ correspond to the trajectory xi of the pixel i. It is to be noted that the number of dimensions of the nonlinear space is set at two dimension in order to visualize the result; however, it need not be two dimension as described above, and data can be projected with higher accuracy in a higher dimension.

Next, the clustering unit 2003 performs clustering on data $z_p^i$ obtained by dimensionally reducing the trajectories shown in (b) in FIG. 22, thereby performing clustering on the trajectories. Modification 3 of the present embodiment employs a technique of clustering trajectories such that the smallest within-class variance is obtained when the number of classes is given.

First, a subclass is expressed as below.

[Math. 31]

$$\theta = \{\theta_1, \ldots \theta_m \ldots \theta_M\} \quad \text{(Expression 29)}$$

Here, M denotes the number of subclasses and is empirically determined according to a scene used.

Each subclass $\theta_m$ is expressed as a parameter shown in Math. 32 and a parameter $Z_m$.

$$\overline{z_m} \qquad \text{[Math. 32]}$$

$$\overline{z_m} \qquad \text{[Math. 33]}$$

Here, the parameter shown in Math. 33 is an average value of data coordinate values that belong to the subclass $\theta_m$ in the space on which dimensionality reduction is performed, and the parameter $Z_m$ is a covariance matrix regarding the data coordinate values that belong to the subclass $\theta_m$.

$$\overline{z_m} \qquad \text{[Math. 34]}$$

An initial value of the parameter shown in Math. 34 may be determined in a random manner, or the reduced nonlinear space may be segmented by placing a grid at equal distances or the like to determine the coordinate value of intersection of the grids as the initial value.

$$\overline{z_m} \qquad \text{[Math. 35]}$$

It is to be noted that the parameter shown in Math. 35 and the parameter $Z_m$ may be represented as Expression 30 and Expression 31, respectively, below.

[Math. 36]

$$\overline{z_m} = \begin{bmatrix} \overline{z_1^m} \\ \vdots \\ \overline{z_P^m} \end{bmatrix} \qquad \text{(Expression 30)}$$

[Math. 37]

$$Z_m = \frac{1}{C_m} \sum_{c_m=1}^{C_m} \begin{bmatrix} z_1^{c_m} - \overline{z_1^m} \\ \vdots \\ z_P^{c_m} - \overline{z_P^m} \end{bmatrix} \begin{bmatrix} z_1^{c_m} - \overline{z_1^m} & \cdots & z_P^{c_m} - \overline{z_P^m} \end{bmatrix} \qquad \text{(Expression 31)}$$

Here, $C_m$ is the number of data items that belong to the subclass $\theta_m$ in the reduced nonlinear space.

The following describes a specific method of clustering. First, the subclass $\theta_m$ to which data $z_i$ belongs is calculated using a distance function of Expression 32.

[Math. 38]

$$\psi_m(z_i) = \phi_m(z_i) + \ln|Z_m| - \ln p(z_i) \qquad \text{(Expression 32)}$$

Here, $\psi_m(z_i)$ denotes a distance between data $z_i$ that corresponds to the trajectory of the pixel i and each of the subclasses $\theta_m$. It is assumed that each of the data items belongs to the subclasses $\theta_m$ in which the distance $\psi_m(z_i)$ indicates a minimum value. It is to be noted that $\phi_m(z_i)$ is a Mahalanobis' generalized distance and represented by Expression 33 below.

[Math. 39]

$$\phi_m(z_i) = (z_i - \overline{z_m})^t Z_m^{-1} (z_i - \overline{z_m}) \qquad \text{(Expression 33)}$$

In addition, $\phi_m(z_i)$ may be used instead of $\psi_m(z_i)$.

In addition, $p(z_i)$ is a prior probability of $z_i$ in a frame of a likelihood function. Therefore, $p(z_i)$ may be a constant value or may be set in advance based on a shape, area ratio, or the like of parts of a person when it is known that a target scene includes a certain object such as a person. It is effective when, in particular, there is non-uniformity in a density of data $z_i$. In the case where, for example, it is desired to classify data $z_i$ with high density into the same subclass when it is known that the density of the data $z_i$ is high, it is only necessary to set a corresponding prior probability $p(z_i)$ to be large. Conversely, in the case where it is desired to finely divide data $z_i$ into different subclasses, it is only necessary to set a corresponding prior probability $p(z_i)$ to be small. It is to be noted that the density of the data $z_i$ may be a density on an image space or a density on a reduced nonlinear space.

Next, the parameter of the subclass $\theta_m$ and the parameter $Z_m$ are updated using the calculation result of Expression 32, using the data $Z_i$ that belongs to the subclass $\theta_m$, as shown below.

[Math. 40]

$$\overline{z_m}$$

[Math. 41]

$$\overline{z_m} = \frac{\sum_{c_m=1}^{C_m} \omega_{c_m} z_{c_m}}{\sum_{c_m=1}^{C_m} \omega_{c_m}} \qquad \text{(Expression 34)}$$

[Math. 42]

$$Z_m = \frac{\sum_{c_{mk}=1}^{C_m} \omega_{c_m}^2 (z_{c_m} - \overline{z_m})(z_{c_m} - \overline{z_m})^t}{\sum_{c_m=1}^{C_m} \omega_{c_m}^2} \qquad \text{(Expression 35)}$$

Here, $z_{c_m}$ is data in the reduced nonlinear space that belongs to the subclass $\theta_m$. In addition, $\omega$ is a weight coefficient with respect to the subclass $\theta_m$, and a value of $\omega$ may be set as $\omega=1$ or may be adjusted according to the difference from the average value of input data. As described above, the subclass $\theta_m$ to which each data in the nonlinear space belongs can be calculated by repeating distance calculation from Expression 32 to Expression 35 and update of a parameter predetermined number of times. It is to be noted that other clustering methods such as k-means, competitive learning, and so on may be used in addition to the above described method.

(d) in FIG. 22 shows an example of clustering data on a nonlinear space. It is to be noted that a corresponding human region is shown next to a dimensionality reduced data distribution. As to the correspondence on the picture from the subclass $\theta_1$ to $\theta_2$ on the reduced nonlinear space, the parts of a person correspond to the respective subclasses, such as $\theta_1$ for a head-region and $\theta_2$ for a body of the person.

Here, the correspondence of the parts of a person to the respective subclasses on the reduced nonlinear space is due to tracking of a pixel over temporally consecutive pictures. An image region can be extracted for each object moving in a picture, as a result of temporally tracking a region of the object moving in the picture, by performing clustering in the reduced nonlinear space.

In the modification example 2 of the present embodiment, it is not necessary to specify a human candidate region as preprocessing. Accordingly, there is no failure due to an error in detecting the human candidate region. There is thus an advantageous effect that it is possible to stably perform clustering on a picture that includes a person who moves changing its shape, by performing clustering in a nonlinear space without requiring fitting of a vast quantity of parameters.

It is to be noted that, in the present embodiment, a Euclidean distance is used as a point-to-point distance; however it is not limited to the Euclidean distance, as described above. The present invention also includes an embodiment in which an arbitrary distance index defined with the aforementioned point-to-point distance is used.

Modification 3 of Embodiment 1

The following describes an articulated object region detection apparatus according to Modification 3 of Embodiment 1 of the present invention.

In the description for the articulated object region detection apparatus in Embodiment 1, the subclass classification unit 105 calculates a subclass based on a Euclidean distance f(i, j). However, the operation of the subclass classification unit 105 is not limited to the above. The following describes an example of generating a subclass, by generating geodetic distances to generate candidates for the subclass and selecting a subclass from among the candidates.

(a) in FIG. 23 is a diagram which shows a configuration of an articulated object region detection apparatus of Modification 3 according to Embodiment 1. As shown in (a) in FIG. 23, the articulated object region detection apparatus includes: the image input unit 101; the trajectory calculating unit 102; the articulated object region detection unit 103; and the output unit 104. The articulated object region detection unit 103 includes: a subclass classification unit 2201; the distance calculating unit 106; and the region detection unit 107.

Description for the same part as Embodiment 1; that is, the part other than the subclass classification unit 2201, will be omitted. (b) in FIG. 23 shows a configuration of the subclass classification unit 2201 according to Modification 3 of the present embodiment.

The subclass classification unit 2201 includes: a distance calculating unit 2202; a subclass candidate generating unit 2203; and a subclass candidate selecting unit 2204.

The subclass classification unit 2201 first calculates, in the distance calculating unit 2202, a Euclidean distance f(i, j) from the trajectories calculated by the trajectory calculating unit 102 and performs geodetic distance transformation on the calculated distance matrix with plural criteria for judgment, thereby obtaining a geodetic distance g(i, j). The subclass classification unit 2201 next detects, in the subclass candidate generating unit 2203, a discontinuity point in a distribution of distance between trajectories using a threshold and performs clustering on continuously distributed trajectories such that trajectories which are distant from each other by the geodetic distance smaller than a detected discontinuity point are grouped into the same class, thereby generating a candidate for a subclass with respect to the threshold. Lastly, the subclass classification unit 2201 obtains, in the subclass candidate selecting unit 2204, an instruction on the number of classes, selects a region extraction candidate divided into regions of similar number to the obtained number of classes from among the region extraction candidates generated by the subclass candidate generating unit 2203, and outputs the selected subclass candidate as a result of performing sub classification, from the trajectories calculated by the trajectory calculating unit 102. To be more specific, a result of clustering which is the closest to the predetermined number of classes is selected from among the candidates for region extraction for the respective thresholds generated by the subclass candidate generating unit 2203.

The following describes operations performed by the subclass classification unit 2201.

First, a Euclidean distance f(i, j) is calculated in the distance calculating unit 2202. This procedure is the same as that of the Euclidean distance calculating unit 701 explained in Embodiment 1, and thus the description is omitted. The distance calculating unit 2202 specifies K thresholds $R_k$ for the calculated Euclidean distance f(i, j). The distance calculating unit 2202 performs non-linearization on each of the determined thresholds $R_k$ and calculates geodetic distances $g^k(i, j)$ for the thresholds $R_k$. Here, the calculation procedure for the geodetic distances $g^k(i, j)$ for the thresholds $R_k$ is the same as the operation performed by the distance calculating unit 106 described in Embodiment 1 and thus the description for that is omitted.

Next, the subclass candidate generating unit 2203 detects a discontinuity point using the geodetic distances $g^k(i, j)$ corresponding to the respective thresholds $R_k$, thereby performing subclass candidate generation. More specifically, the subclass candidate generating unit 2203 detects a point between trajectory i and a trajectory j, as the discontinuity point, at which $g^k(i, j)$ is infinite. The following describes, with reference to FIG. 24, the procedure described above. (a) in FIG. 24 shows trajectories a to h and (b) in FIG. 24 shows a conceptual diagram of a multidimensional space including the trajectories a to h.

When the threshold $R_k$ is a sufficiently large value, more specifically, when the threshold $R_k$ is larger than the maximum value of the Euclidean distance f(i, j), for example, the geodetic distance $g^k(i, j)$ does not become infinite in any combination of i and j. To be more specific, since there is no discontinuity point, it is determined that the number of the subclasses is one as shown in (c) in FIG. 24. On the other hand, when the threshold $R_k$ is a sufficiently small value, more specifically, when the threshold $R_k$ is smaller than the minimum value of f(i, j), $g^k(i, j)$ becomes infinite in all of the combinations of i and j. That is, the number of subclasses is equal to the number of trajectories. Therefore, subclass classification is efficiently performed by specifying the threshold $R_k$ as a value between the maximum value and the minimum value of f(i, j). (d) and (e) in FIG. 24 show examples to which the threshold determined as described above is applied.

When the threshold is specified as $R_1$, a geodetic distance $g^1(e, f)$ becomes infinite as shown in (d) in FIG. 24. Accordingly, the subclass candidate generating unit 2203 determines that the point, as a discontinuity point, between a trajectory e and a trajectory f. As a result, the geodetic distance between the trajectory e and each of the trajectories from the trajectories a to d does not pass a discontinuity point and thus does not take an infinite value. On the other hand, the geodetic distance between each of the trajectories f to h and each of the trajectories a to e becomes infinite because the geodetic distance passes a discontinuity point $g^1(e, f)$. As described above, it is determined that the group of the trajectories i and j belongs to the same subclass when the geodetic does not become infinite and that the group of the trajectories i and j belongs to different subclasses when the geodetic becomes infinite. With this, data points are divided into two subclasses of $\theta_1$ and $\theta_2$, as shown in (d) in FIG. 24. In addition, (e) in FIG. 24 shows an example in which another threshold is specified as $R_2$ (where $R_1 > R_2$). It is determined that the discontinuity points are present between the movement trajectories c and d, between the movement trajectories e and f, and between the movement trajectories f and g, and the movement trajectories are classified into groups having an infinite geodetic distance and groups not having an infinite geodetic distance as in the case shown in (d) in FIG. 24, to separate the groups into a total of four subclasses of $\theta_1$, $\theta_2$, $\theta_3$, and $\theta_4$.

With the processing described above, the subclass candidate generating unit 2203 can determine, for plural thresholds $R_k$, that the groups of movement trajectories not having an infinite geodetic distance are continuous and thus belong to the same subclass. In addition, it is possible to generate subclass candidates based on discontinuity points by determining that the groups of movement trajectories having infinite distance are discontinuous.

Next, the subclass candidate selecting unit 2204 selects, as a final result, a subclass candidate with the number of classes closest to the predetermined number of classes, from the result of generating subclass candidates performed by the subclass candidate generating unit 2203. By referring to the example shown in FIG. 24, when the number of classes is specified as M=4, a subclass candidate ((e) in FIG. 24) for the threshold $R_2$ is selected. In addition, when the number of classes is specified as M=2, a subclass candidate ((d) in FIG. 24) for the threshold $R_1$ is selected and subclass classification is performed for each of the trajectories such that the number of subclasses becomes closest to the specified number of subclasses. It is to be noted that two and four are used for the number of classes M; however, it is desirable to use a larger number in practice, and the number can be arbitrary specified according to a situation of a scene or an experience.

It is to be noted that, in Modification 3 of the present embodiment, it is possible to perform subclass classification in view of the position of a pixel and the similarity of motion, by using the Euclidean distance and the geodetic distance. In the examples shown in FIG. 24, when the number of classes is specified as M=2, the upper body and the lower body are classified into different subclasses by reflecting that motion of the lower body significantly differs from motion of the upper body. Furthermore, when the number of classes is specified as M=4, the head-region, the arm, the thigh, and the lower leg are classified into different subclasses by reflecting the difference between the head-region and the arm and the difference between the thigh and the lower leg, in addition to the case of M=2.

It is to be noted that any number of types of thresholds $R_k$ may be prepared. In addition, when a subclass candidate with the same number of classes as specified cannot be found, a subclass candidate having the closest number of subclasses may be selected, or a subclass candidate having the closest number of subclasses among subclass candidates having the smaller number of classes than the specified number of classes may be selected. Likewise, a subclass candidate having the closest number of subclasses among subclass candidates having the larger number of classes than the specified number of classes may be selected.

As described above, subclass candidates are generated based on a discontinuity point calculated using a geodetic distance, for plural thresholds, and a subclass candidate with the number of classes closest to the specified number of classes is selected, thereby performing subclass classification.

With the articulated object region detection apparatus and the method according to the present embodiment and the modification examples, it is possible to perform classification into subclasses based on the distance between pixels or the similarity of trajectories, and further to detect an articulated object region in a picture including a moving object or parts having an articulated motion irrespective of the posture of an articulated object based on information of a Euclidean distance and a geodetic distance between subclasses and perform segmentation of a picture including a moving object having an articulated object region or an articulated motion.

Furthermore, since it is not necessary to set a human candidate region as preprocessing, no failure occurs in segmentation due to an error in detecting the human candidate region. Therefore, without requiring fitting of a vast quantity of parameters, it is possible to accurately detecting an articulated object region in a picture including a person or the like which moves changing its shape, by only simply comparing a Euclidean distance and a geodetic distance with a predetermined threshold, thereby enabling accurate detection of a moving object in the picture.

In addition, the articulated object region detection apparatus 100 according to the embodiment described above includes the image input unit 101 and the trajectory calculating unit 102; however, those components are not indispensable in the present invention. More specifically, in the case where trajectories of a picture in each of the blocks included in video are calculated in advance, the articulated object region detection apparatus 100 may obtain such trajectories from outside and may perform processing of steps S203 to 207 on the obtained trajectories.

Furthermore, although the present invention is implemented as an articulated object region detection apparatus, it should be understood that the present invention can be implemented as an image processing apparatus which extracts or segments the region of an object having an articulated motion in a video as long as the function of the articulated object region detection unit 103 is included.

It is to be noted that, in the present embodiment, a Euclidean distance is used as a point-to-point distance; however it is not limited to the Euclidean distance, as described above. The present invention also includes an embodiment in which an arbitrary distance index defined with the aforementioned point-to-point distance is used.

Embodiment 2

In Embodiment 1 and the modification examples of Embodiment 1 described above, a human region or an articulated object region is displayed on a display as a result of detecting an articulated object region; however, the method of using a result of detecting an articulated object region is not limited to the above application, and may be applied to recognition of action of a person or a moving object, for example.

Figure 25:
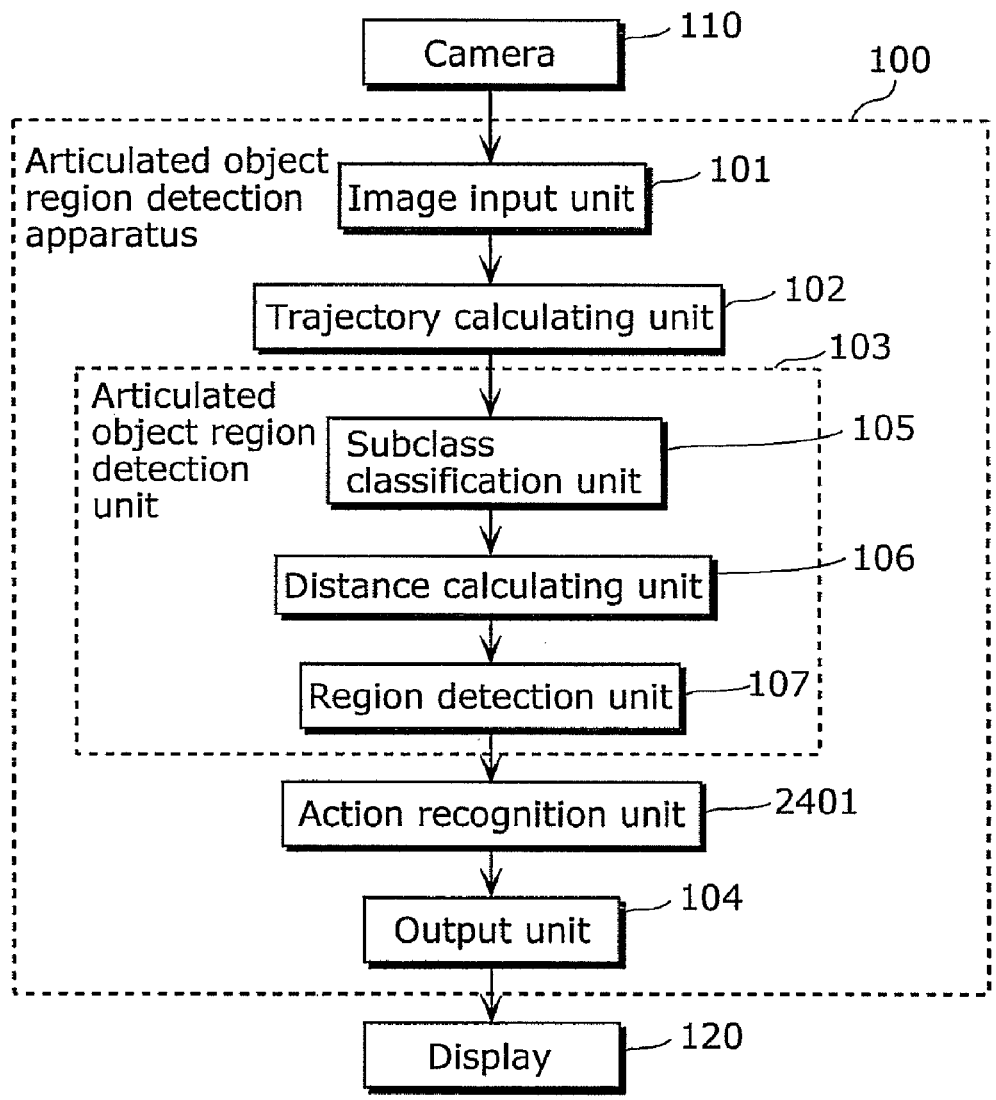
FIG. 25 is a diagram which shows a configuration of an articulated object region detection apparatus according to Embodiment 2 of the present invention.

More specifically, the articulated object region detection apparatus according to the present invention may include an action recognition unit in addition to the components according to the embodiment described above. FIG. 25 is a diagram which shows a configuration of an articulated object region detection unit according to the present embodiment. The articulated object region detection apparatus 100 includes, in addition to the configuration of the articulated object region detection apparatus 100 according to Embodiment 1, an action recognition unit 2401 between the region detection unit 107 and the output unit 104. The action recognition unit 2401 accumulates an angle between subclasses each having an articulated motion, based on the result of detecting an articulated object region obtained by the articulated object region detection unit 103, and recognizes an action of a moving object based on the information. More specifically, the action recognition unit 2401 calculates an angle between subclasses which are included in the region detected by the region detection unit 107 and have an articulated motion and compares the calculated angle with an angle which is determined in advance for each action pattern of a person, thereby recognizing an action of an object. The following describes, with reference to FIG. 26A and FIG. 26B, the operation performed by the action recognition unit 2401.

Figure 26A:
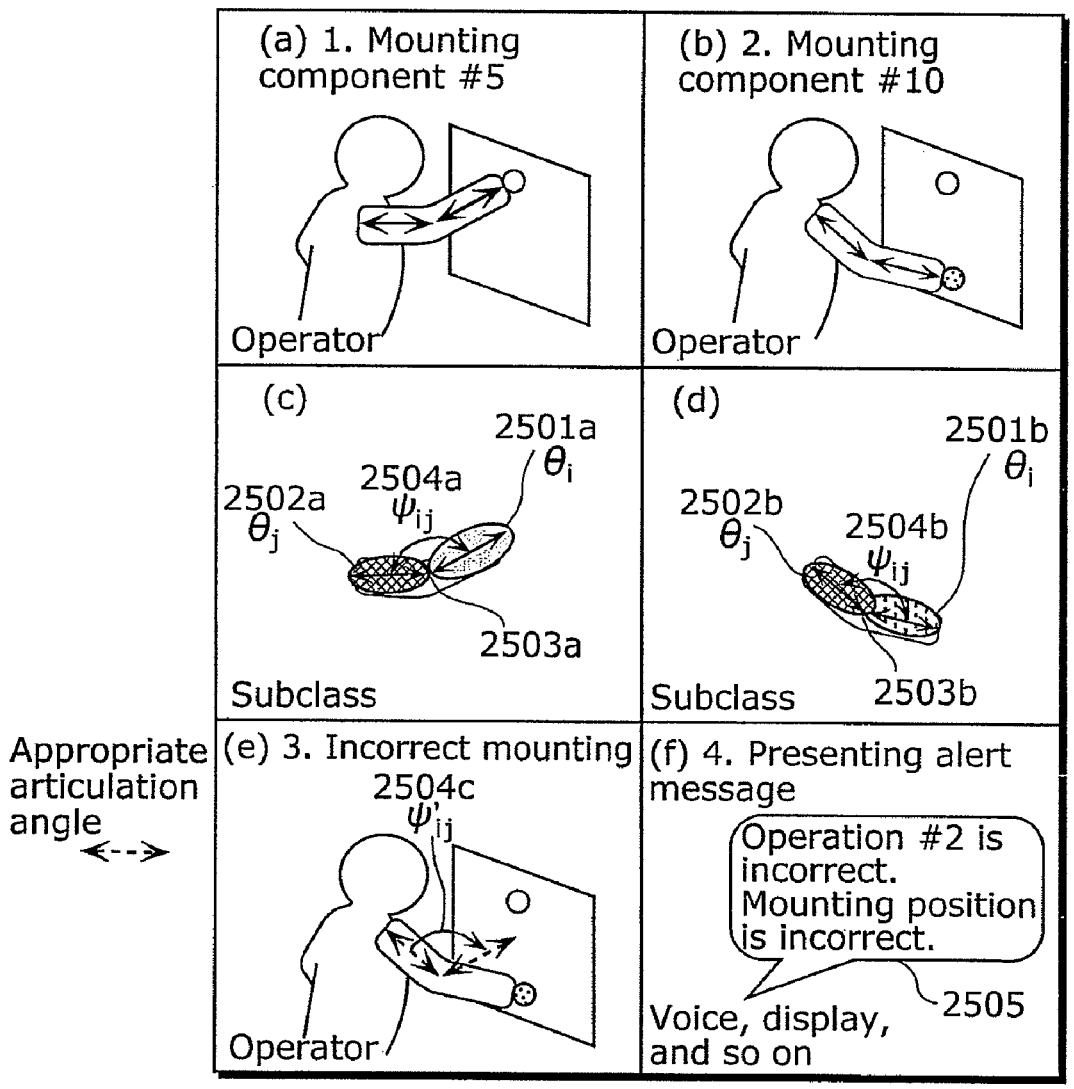
FIG. 26A is a diagram which explains operation recognition performed by the articulated object region detection apparatus according to Embodiment 2 of the present invention.

FIG. 26A shows an operator who performs a predetermined operation. It is assumed, for example, that the operator mounts a component #5 as a first operation as shown in (a) in FIG. 26A, and mounts a component #10 as a second operation as shown in (b) in FIG. 26A. It is assumed that subclasses $\theta_i$ and $\theta_j$ as articulated object regions each including an articulated motion are detected from a picture captured by a camera 110 placed at a position where an action of the operator can be viewed. (c) in FIG. 26A shows an articulated object region in the picture shown in (a) in FIG. 26A, and (d) in FIG. 26A shows an articulated object region in the picture shown in (b) in FIG. 26A.

When a subclass $\theta_i$ 2501a, a subclass $\theta_j$ 2502a, and an articulation portion 2503a connecting the subclasses at a certain time are obtained as shown in (c) in FIG. 26A, an angle between the subclass $\theta_i$ 2501a and the subclass $\theta_j$ 2502a can be calculated using a center of each of the subclasses and the articulation portion 2503a.

More specifically, when the center of the subclass $\theta_i$ 2501a is represented as $w_i(x_i, y_i)$ and the center of the subclass $\theta_j$ 2502a is represented as $w_j(x_j, y_j)$, an angle $\phi_{ij}$ 2504a on a picture with an articulation portion $Jnt(s_{jnt}, Y_{jnt})$ 2503a being positioned in between can be obtained as indicated by Expression 36 using an inner product of vectors

[Math. 43]

$$\varphi_{ij} = a\cos\left[\frac{(w_i - Jnt) \cdot (w_j - Jnt)}{|w_i - Jnt| \cdot |w_j - Jnt|}\right] \quad \text{(Expression 36)}$$

Here, as shown in (d) in FIG. 26A, an angle $\phi_{ij}$ 2504b on a picture ((b) in FIG. 26A) adjacent to the picture ((a) in FIG. 26A) including the above angle $\phi_{ij}$ 2504a can be calculated in the same manner using Expression 36. The angle $\phi_{ij}$ 2504b are made by the subclass $\theta_i$ 2501b, the subclass $\theta_j$ 2502b, and an articulation portion Jnt 2503b.

Here, in the case where the angle of the articulation portion represented by Expression 36 is used, when an articulation angle $\phi'_{ij}$ 2504c indicated by a dashed arrow of (e) in FIG. 26A is given as an appropriate angle, for example, the action recognition unit 2401 compares the given articulation angle $\phi'_{ij}$ 2504b with the actually observed articulation angle $\phi_{ij}$ 2504 shown in (d) in FIG. 26A, and outputs a result of the comparison to the output unit 104.

Lastly, the output unit 104, when the articulation angle differs from the appropriate angle, displays an alert message 2505 to indicate that an error occurred in the operation procedure, as shown in (f) in FIG. 26A. With this, it is possible to inform the operator of the operation error. The message is displayed on the display 120 according to the present embodiment; however, it should be understood that the message may be issued as voice.

Modification 1 of Embodiment 2

Figure 26B:
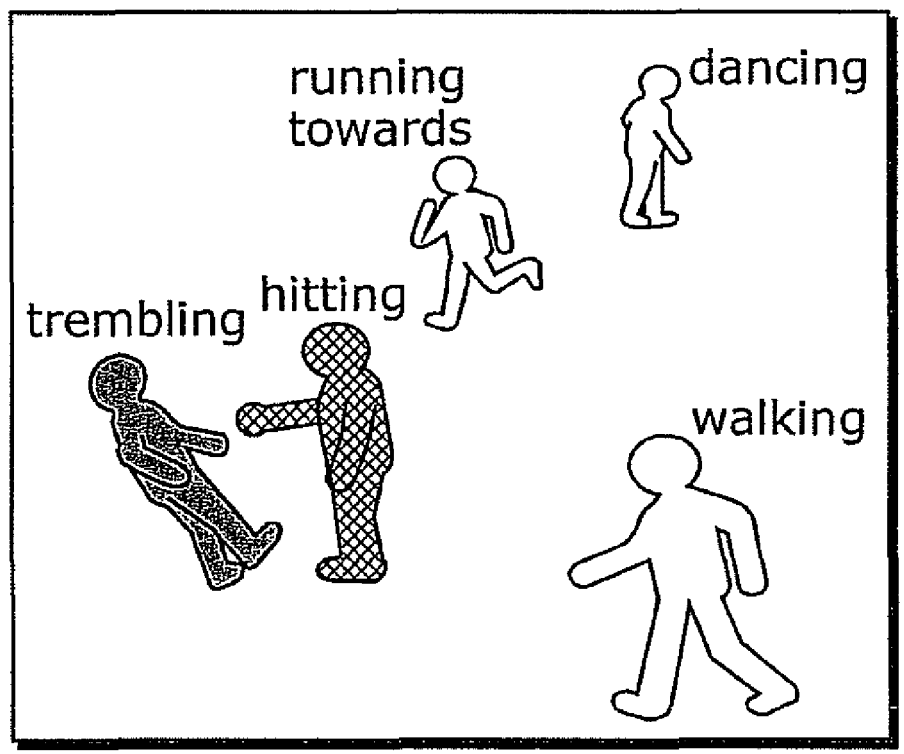
FIG. 26B is a diagram which explains operation recognition performed by the articulated object region detection apparatus according to Embodiment 2 of the present invention.

FIG. 26B shows an example of a result of action recognition for another video.

FIG. 26A shows an example of supporting an operation, using a video including a single person as an input; however, processing performed by the action recognition unit 2401 is not limited to this. The following describes, as a modification example of Embodiment 2, an example in which a picture including plural moving objects represented by a person is input, and an action of each of the moving objects is recognized and displayed.

A certain pattern is assumed for an action to be recognized. For example, six patterns of: walking; dancing; running towards; hitting; trembling; and others are assumed as shown in FIG. 26B. For each of the patterns, the number of articulation portions and the angles and a position in a human region are accumulated in advance in a memory (not illustrated) as data. As the simplest technique, an average of accumulated data is stored in the memory. In addition, since an action of a person involves a temporal change, it is desirable to accumulate and use such data as time-series data having a certain temporal length. Of course, a technique of learning is not limited to the above technique.

Next, the articulated object region detection unit 103 performs articulated object region detection on the picture which is captured by the camera 110 and includes a moving object. Then the action recognition unit 2401 obtains the number of articulation portions and the angles and a position in a human region, using a processing result of the articulated object region detection unit 103. The action recognition unit 2401 make comparison with the above-descried data accumulated in advance or average of data, determines a closest action as an action of the moving object, adds to the moving object region a label corresponding to the determined action, and outputs to the output unit 104, thereby performing action recognition.

Lastly, the output unit 104 displays on the display 120 the result of action recognition as a picture as shown in FIG. 26B, using the action recognition label and information of and moving object region. As described above, it is possible to urge an observer to notice an abnormal behavior such as "hitting", by displaying a picture on the display with additional statement such as "dancing" for a dancing moving object and "walking" for a walking moving object. In addition, an alert for an abnormal behavior may be issued by using not only the display but also voice and the like.

It is to be noted that, in the present embodiment, a Euclidean distance is used as a point-to-point distance; however it is not limited to the Euclidean distance, as described above. The present invention also includes an embodiment in which an arbitrary distance index defined with the aforementioned point-to-point distance is used.

Embodiment 3

The following describes Embodiment 3 according to the present invention.

A method of using the result of detecting an articulated object region is not limited to the application examples shown in Embodiment 1 and Embodiment 2, and may be applied to detection of abandonment, for example.

More specifically, an articulated object region detection apparatus according the present embodiment may include an action detecting unit in addition to the components of the articulated object region detection apparatus according to Embodiment 1.

Figure 27:
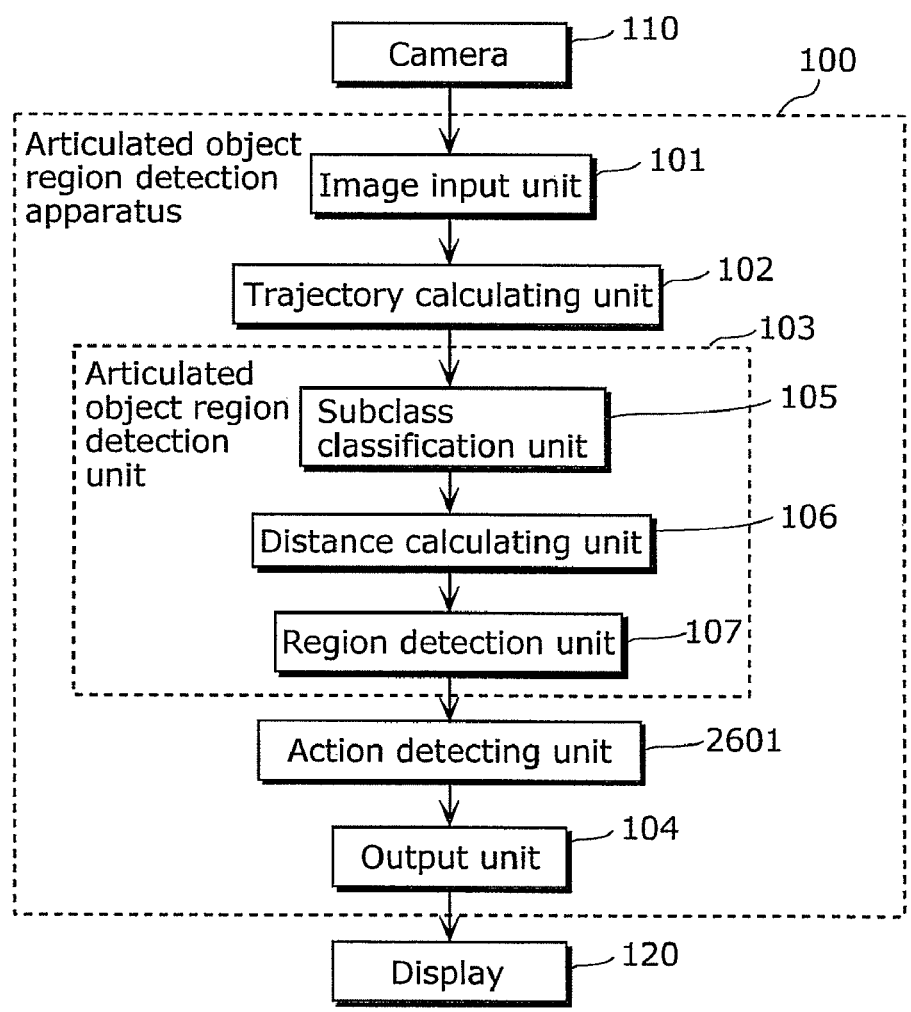
FIG. 27 is a diagram which shows a configuration of an articulated object region detection apparatus according to Embodiment 3 of the present invention.

FIG. 27 is a diagram which shows a configuration of an articulated object region detection apparatus according to the present embodiment. An articulated object region detection apparatus 100 according to the present embodiment includes, in addition to the configuration of the articulated object region detection apparatus 100 according to Embodiment 1, an action detecting unit 2601 between the region detection unit 107 and the output unit 104. The action detecting unit 2601 accumulates, as data, the number of articulations between subclasses having an articulated motion, based on the result of articulated object region detection obtained by the articulated object region detection unit 103, and detects a change in the number of connections of a moving object based on the information. The following describes, with reference to FIG. 28, the operation performed by the action detecting unit 2601.

Figure 28:
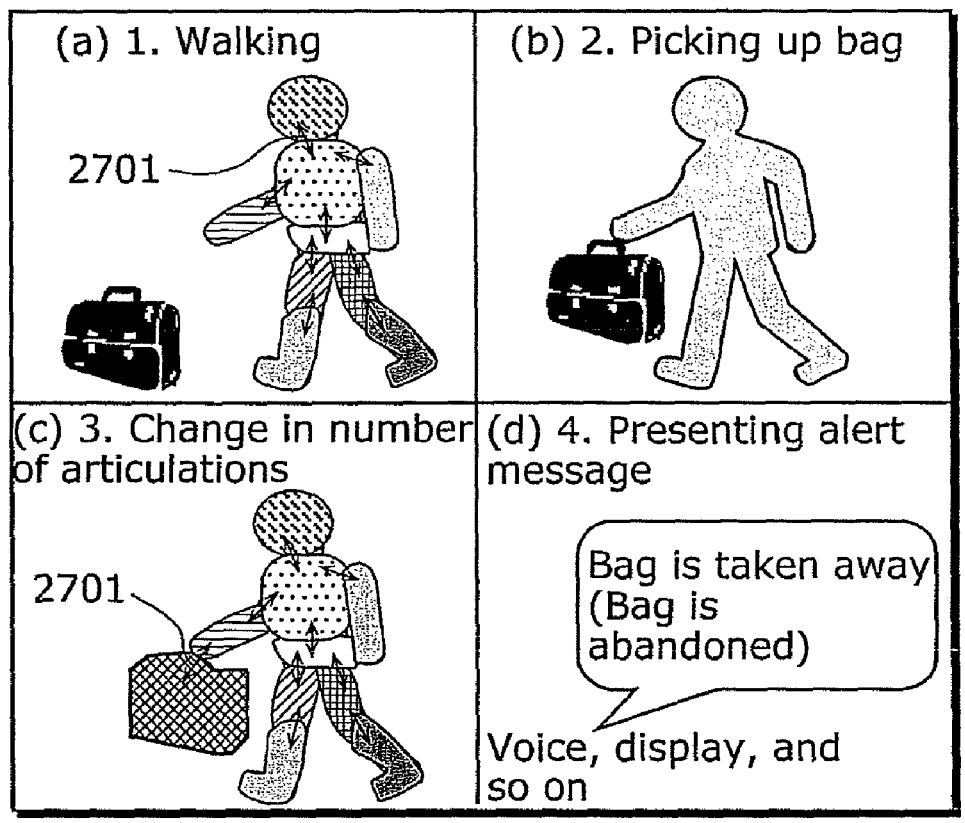
FIG. 28 is a diagram which explains detection of taking away performed by the articulated object region detection apparatus according to Embodiment 3 of the present invention.

When a moving object takes away a bag as passing by as shown in (a) and (b) in FIG. 28, the number of articulations in the articulated object region changes.

More specifically, the number of articulations 2701 indicated by double-headed arrows is eight at first ((a) in FIG. 28). When the moving object takes away an object as shown in (b) in FIG. 28, the number of articulations increases to nine as shown in (c) in FIG. 28.

The action detecting unit 2601 detects such an increase in the number of articulation, thereby enabling detection of taking away of an object. On the other hand, it is possible to be used for detecting abandonment by detecting a decrease in the number of articulations.

With the procedure described above, the action detecting unit 2601 outputs to the output unit 104 presence or absence of abandonment or taking away, and the output unit 104 displays an alarm on the display as shown in (d) in FIG. 28, thereby informing the observer. It should be understood that an alarm is not limited to an image and may be issued as voice.

With the present embodiment according to the present invention, the present invention can be applied to other similar areas of security or observation.

It is to be noted that the geodetic distance between two subclasses according to Embodiments 1 to 3 may be normalized based on the distance between trajectories in the two trajectories.

In addition, the Euclidean distance between two subclasses according to Embodiments 1 to 3 may be normalized based on the Euclidean distance between trajectories in the two trajectories.

It is to be noted that, in the present embodiment, a Euclidean distance is used as a point-to-point distance; however it is not limited to the Euclidean distance, as described above. The present invention also includes an embodiment in which an arbitrary distance index defined with the aforementioned point-to-point distance is used.

Embodiment 4

The following describes Embodiment 4 according to the present invention.

The configuration of the articulated object region detection apparatus and the method of detecting an articulated object region are not limited to the examples described in Embodiments 1 to 3, and may be implemented with the configuration and method described below, for example.

More specifically, an articulated object region detection apparatus according to the present embodiment obtains, from outside, and uses a result of classifying trajectories into subclasses, instead of classifying trajectories into subclasses by the subclass classification unit 105 provided in the articulated object region detection apparatus 100 as in the articulated object region detection apparatus 100 according to Embodiment 1.

Figure 29A:
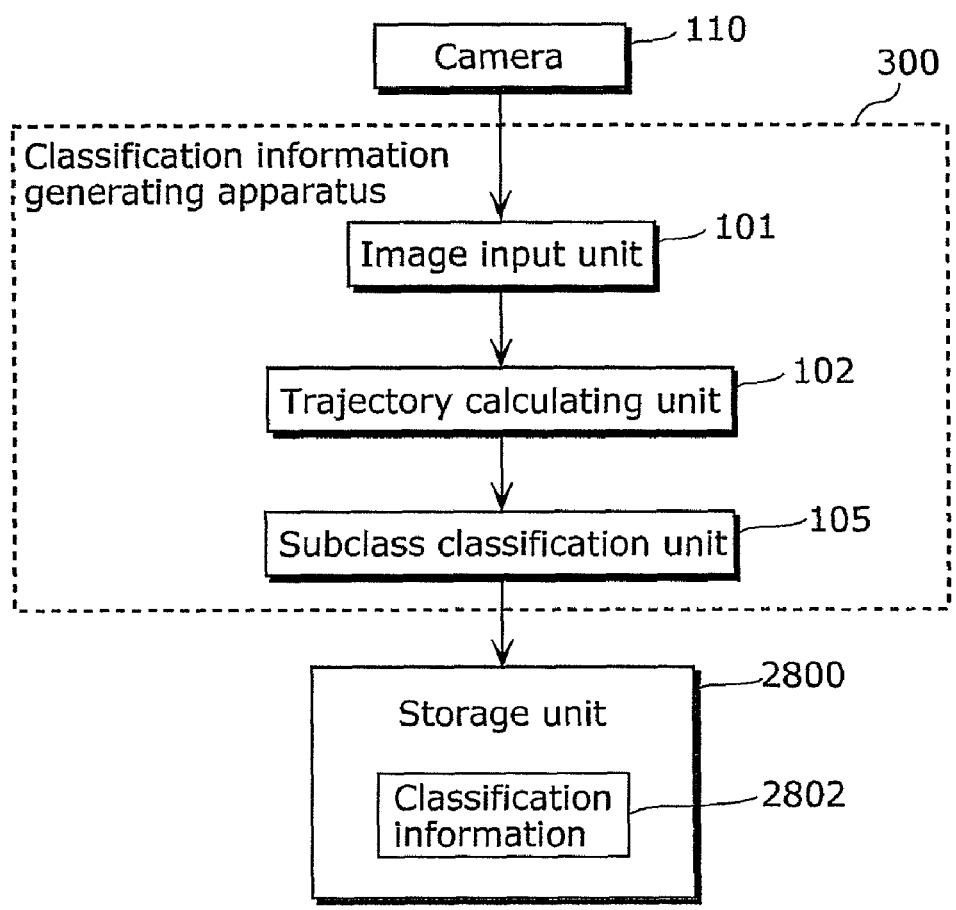
FIG. 29A is a block diagram which shows a configuration of a classification information generating apparatus that generates classification information indicating a result of classifying trajectories into subclasses according to Embodiment 4 of the present invention.

FIG. 29A is a block diagram which shows a configuration of a classification information generating apparatus that generates classification information indicating a result of classifying trajectories into subclasses.

The classification information generating apparatus 300 includes: the image input unit 101; the trajectory calculating unit 102; and the subclass classification unit 105. The processing performed by the image input unit 101, the trajectory calculating unit 102, and the subclass classification unit 105 is the same as the processing described in Embodiment 1. Therefore, the detailed description is not repeated here. However, the subclass classification unit 105 stores, on a storage unit 2800 provided outside the classification information generating apparatus 300, classification information 2802 that is a result of classifying trajectories into subclasses. The storage unit 2800 is a recoding medium such as a CD-ROM. The classification information 2802 indicates a result of classifying trajectories over pictures included in video, which are trajectories of motions of blocks each of which includes one or more pixels and constituting the pictures, into subclasses each of which is a group of similar movement trajectories.

Figure 29B:
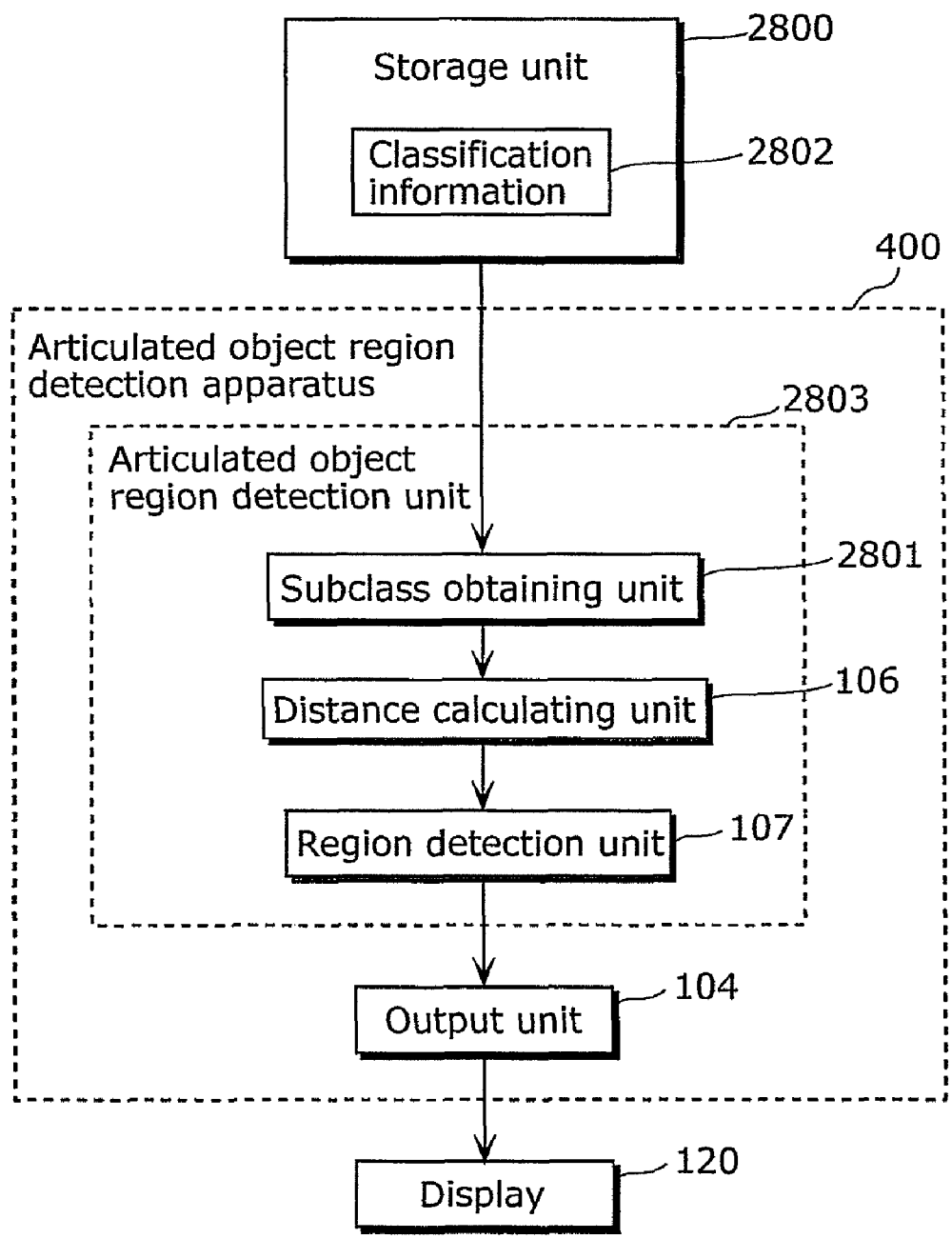
FIG. 29B is a block diagram which shows a configuration of an articulated object region detection apparatus according to Embodiment 4 of the present invention.

FIG. 29B is a block diagram which shows a configuration of an articulated object region detection apparatus according to the present embodiment.

The processing performed by the trajectory calculating unit 102, the articulated object region detection unit 103, and the output unit 104 in the articulated object region detection apparatus 100 according to Embodiment 1 shown in FIG. 1 need not be performed in the same articulated object region detection apparatus. More specifically, it is possible to obtain the advantageous effect equivalent to that of Embodiment 1 as long as the distance calculating unit 106 and the region detection unit 107 are included in the articulated object region detection apparatus.

An articulated object region detection apparatus 400 according to the present embodiment includes an articulated object region detection unit 2803 and the output unit 104.

The articulated object region detection unit 2803 is a processing unit which detects an articulated object region having an articulated motion based on a temporal change in trajectories between sub regions, by referring to the classification information 2802 stored in the storage unit 2800. The articulated object region detection unit 2803 includes: a subclass obtaining unit 2801; the distance calculating unit 106; and the region detection unit 107.

The subclass obtaining unit 2801 obtains the classification information 2802 stored in the storage unit 2800 by reading from the storage unit 2800.

The distance calculating unit 106 calculates, for each subclass, trajectories and geodetic distances from other subclasses, using the method same as described in Embodiment 1, based on the classification information 2802 obtained by the subclass obtaining unit 2801.

The region detection unit 107 detects a region having an articulated motion, using the method same as described in Embodiment 1.

Figure 30:
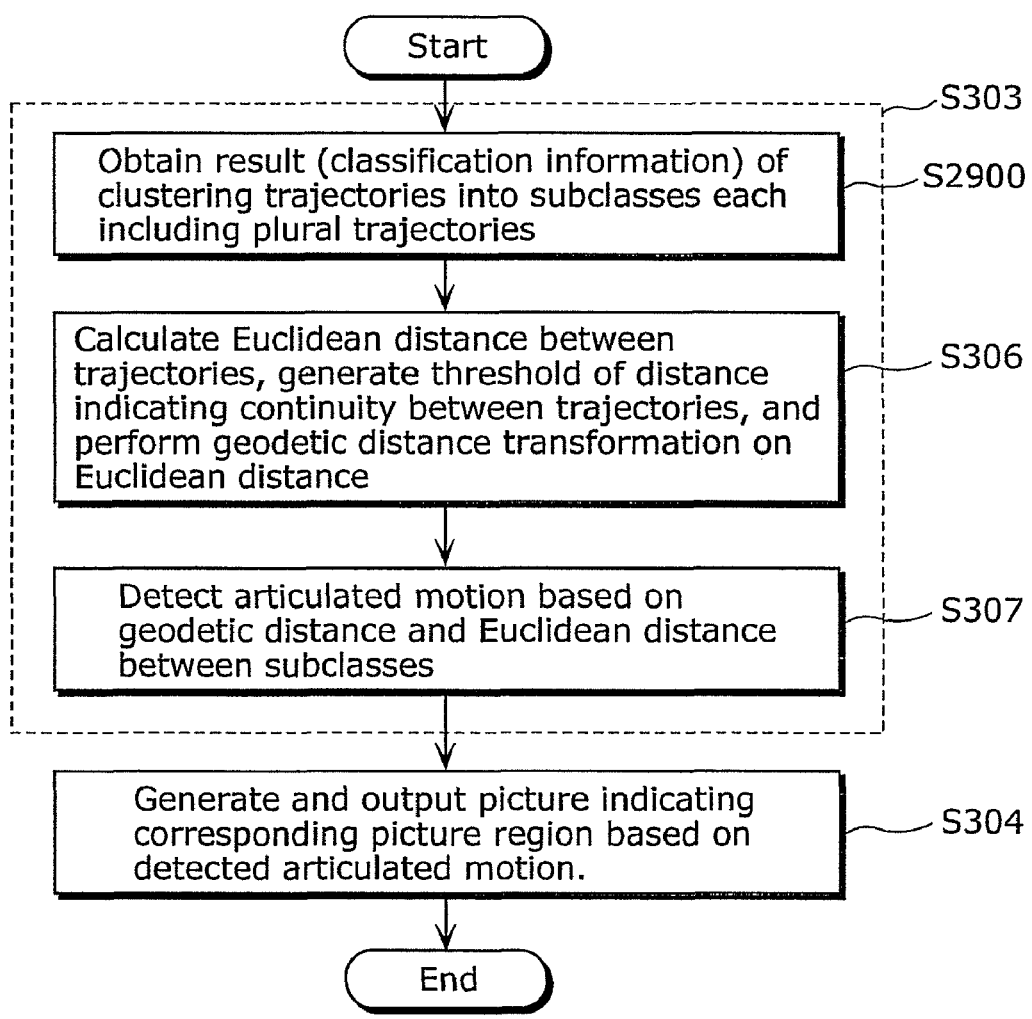
FIG. 30 is a flowchart which shows an operation performed by the articulated object region detection apparatus according to Embodiment 4 of the present invention.

FIG. 30 is a flowchart that shows an operation of the articulated object region detection apparatus 400 according to the present embodiment. In FIG. 30, Steps S303 and S04 correspond to the articulated object region detection unit 2803 and the output unit 104, respectively. To be more specific, the articulated object region detection unit 2803 performs the operation of the articulated object region detecting step S303 and the output unit 104 performs the operation of the image outputting step S304. In addition, Steps S2900, S306, and S307 correspond to the subclass obtaining unit 2801, the distance calculating unit 106, and the region detection unit 107, respectively, shown in FIG. 29B To be more specific, the subclass obtaining unit 2801 performs an operation of a classification information obtaining step S2900, the distance calculating unit 106 performs an operation of the distance calculating step S306, and the region detection unit 107 performs an operation of the region detecting step S307. Each of the operations of the distance calculating step S306, the region detecting step S307, and the image outputting step S304 is the same as that described in Embodiment 1.

The subclass classification unit 105 according to Embodiment 1 performs processing of classifying trajectories into subclasses. The subclass obtaining unit 2801 according to the present embodiment obtains the classification information 2802 that is information of a result of classifying trajectories into subclasses separately performed in advance, and outputs information (classification information 2802) indicating which subclass each of the trajectories belongs to, to the distance calculating unit 106.

The following describes an operation performed by the subclass obtaining unit 2801.

The subclass classification unit 105 according to Embodiment 1 which classifies trajectories into subclasses each of which includes at least one trajectory need not be included in the articulated object region detection apparatus according to the present invention.

The reason for the above is that, since the subclass is the result of clustering each trajectory using a predetermined index, when such clustering is performed in advance by an external apparatus or software, it is not necessary to perform clustering again in the articulated object region detection apparatus.

In the present embodiment, the subclass obtaining unit 2801 obtains the classification information 2802 that indicates the result of classification performed outside in advance on trajectories into subclasses, and the obtained classification information 2802 is used by the distance calculating unit 106 and the region detection unit 107.

First, the data obtained by the subclass obtaining unit 2801 will be explained using some examples, and then a method of obtaining the data will be explained.

An example of the classification information 2802 obtained by the subclass obtaining unit 2801 will be explained with reference to FIG. 31A to FIG. 31C.

Figure 31A:
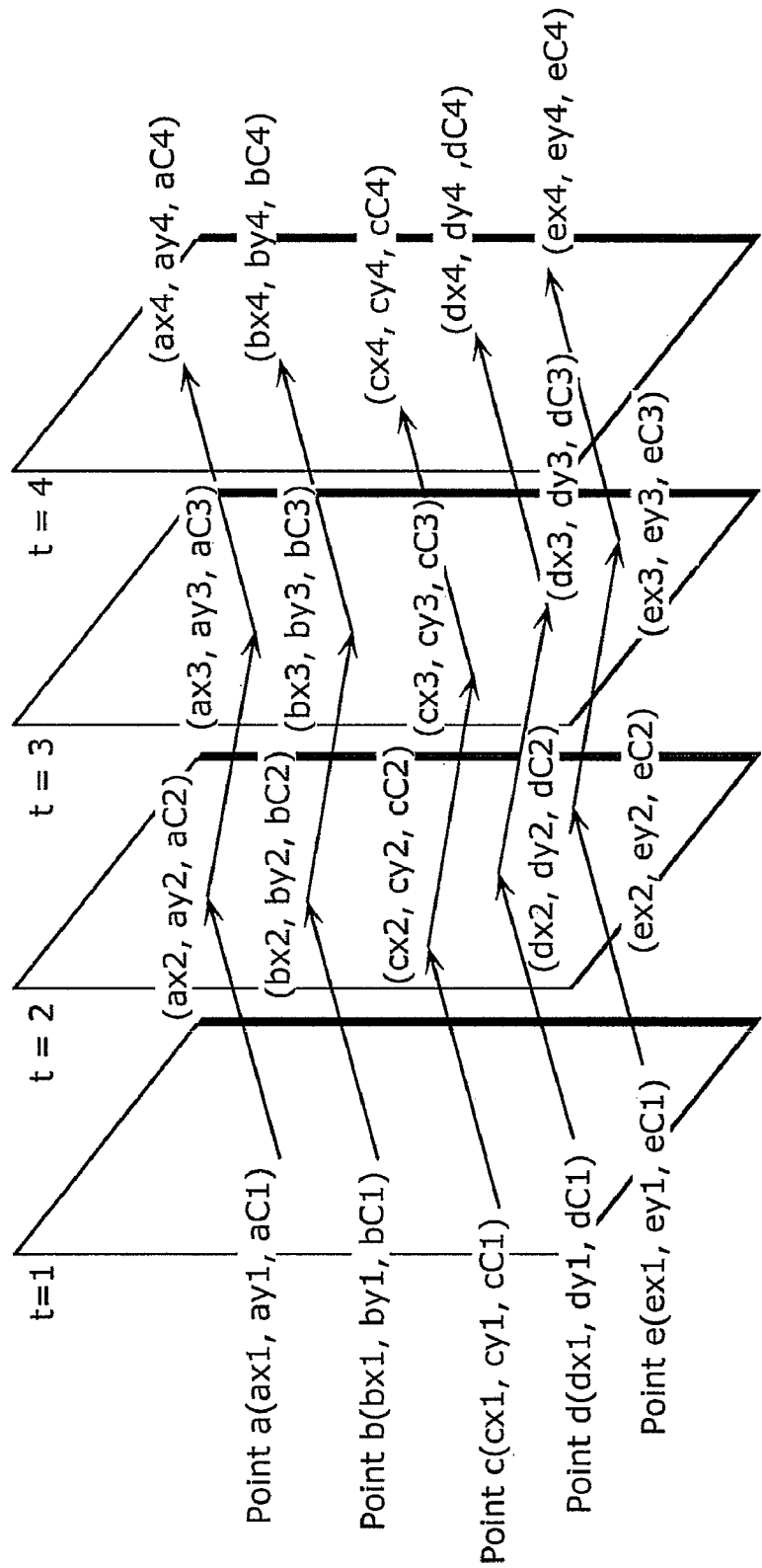
FIG. 31A is a diagram which shows trajectories which are calculated over frame 1 to frame 4 and are corresponding points between pictures.

FIG. 31A is a diagram which shows trajectories which are calculated over frame 1 to frame 4 and are corresponding points between pictures. More trajectories are usually calculated in an actual image; however, it is assumed here, for simplification, that five trajectories are calculated.

[The Case where One Subclass Includes One Trajectory]
First, the simplest case where one subclass corresponds to one trajectory will be described.

The subclass obtaining unit 2801 obtains information indicating to which subclass each of the trajectories belongs. Thus, when the classification information 2802 shown in FIG. 31B is stored in the storage unit 2800, it is possible to obtain and use the information.

More specifically, the classification information 2802 is only necessary to include at least: the length of trajectory (4, in this case) which corresponds to the number of frames; the number of trajectories (5, in this case) tracked over the length of trajectory (4, in this case); the total number of subclasses (5, in this case) used for classification; and data of each of the subclasses (a pixel coordinate and brightness information of each corresponding point are arranged). It is indicated, for example, that the coordinate on a picture of the first frame of the first trajectory is (ax1, ay1) and the brightness value of the coordinate is aC1.

It is to be noted that the brightness information is necessary here because the output unit 104 needs the brightness information for displaying an original image on the display 120, and detection of an articulated object region can be implemented when data of each of the subclasses includes at least the information on a pixel coordinate. Thus, it is also possible to further reduce the size of data by omitting the brightness information depending on the purpose and situation.

And particularly, since one subclass corresponds to one trajectory in this case, the number of subclasses and the number of trajectories are the same. Accordingly, it is only necessary for the classification information 2802 to include: the number of frames (the length of trajectory); the number of trajectories; and data of each of the trajectories (a pixel coordinate and brightness information of each corresponding point are arranged), as shown in FIG. 31C. To be more specific, since the classification information 2802 may included information indicating only trajectories, the articulated object region detection apparatus 400 can obtain the classification information 2802 including information as shown in FIG. 31C and detect an articulated object region, regardless of whether or not subclass classification is actually carried out outside.

After the subclass obtaining unit 2801 obtains the classification information 2802, the distance calculating unit 106 calculates a distance between trajectories, and the region detection unit 107 calculates a representative geodetic distance and a representative Euclidean distance between subclasses to detect a region having an articulated motion.

In the examples shown in FIG. 31A to FIG. 31C, it should be noted that each of the subclasses includes one trajectory. The procedure of calculating a distance between trajectories performed by the distance calculating unit 106 is not affected by the number of trajectories included in a subclass. The region detection unit 107 calculates a distance between the subclasses. More specifically, the region detection unit 107 calculates a representative geodetic distance and a representative Euclidean distance using Expression 14 and Expression 15. However, the expressions are satisfied also when one subclass includes one trajectory; that is, in the above case, and thus there is no problem in calculation of the example shown in FIG. 31A according to the present embodiment.

With the present invention, it is possible to perform articulated object region detection on a subclass including one trajectory; that is, a trajectory itself, as described above. However, the representative geodetic distance calculated using Expression 14 and the representative Euclidean distance calculated using Expression 15, which are calculated by the region detection unit 107 are an average, a median, or a mode value of a distance defined between the trajectories of different subclasses. Therefore, it can be said that when a subclass includes plural trajectories, compared to only one trajectory, more stable calculation and higher speed in calculation are achieved. Thus, it is desirable, in practice, to include plural trajectories in each of the subclasses. The following describes an example of the case where each subclass includes plural trajectories.

[The Case where One Subclass Includes Plural Trajectories]
Another example of the classification information 2802 obtained by the subclass obtaining unit 2801 will be explained with reference to FIG. 32A and FIG. 32B.

Figure 32A:
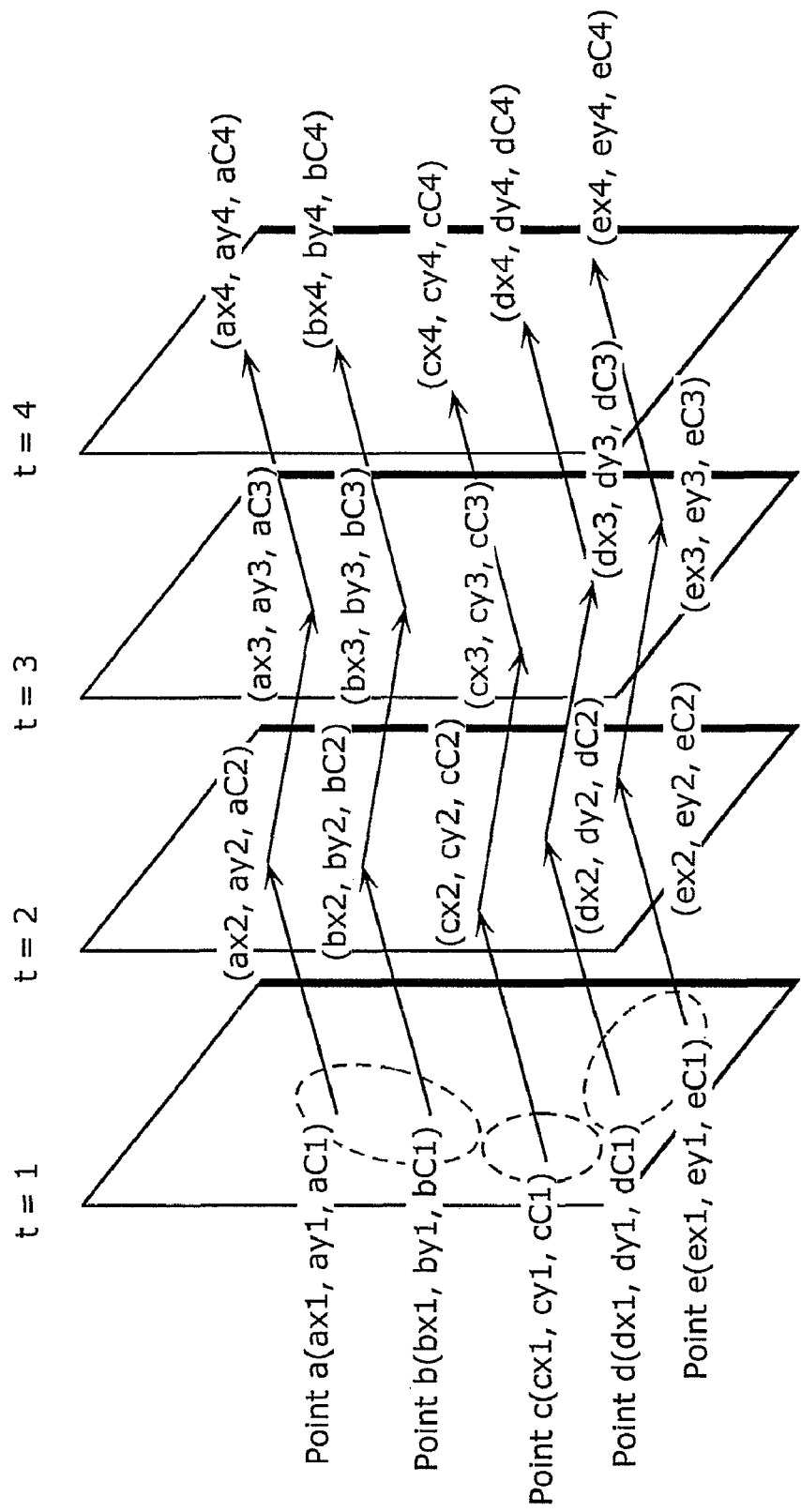
FIG. 32A is a diagram which shows trajectories which are calculated over frame 1 to frame 4 and are corresponding points between pictures.

FIG. 32A is, in the same manner as FIG. 31A, a diagram which shows the case where five movement trajectories which are calculated over frame 1 to frame 4 and are corresponding points between pictures.

FIG. 32A differs from FIG. 31A in that one subclass includes plural trajectories.

When each of the dotted ellipses shown on the frame t=1 in FIG. 32A represents a subclass that has been calculated, it can be seen that, as to the points a to e also referred to in FIG. 31A, the points a and b are classified into the same subclass (class 1) and the points d and e are classified into another same subclass (class 3).

An example of the classification information 2802 stored in the storage unit 2800 in this case is shown in FIG. 32B. More specifically, the classification information 2802 is only necessary to include at least: the length of trajectory (4, in this case) which corresponds to the number of frames; the number of trajectories (5, in this case) tracked over the length of trajectory (4, in this case); the total number of subclasses (3, in this case) used for classification; and data of each of the subclasses (a pixel coordinate and brightness information of each corresponding point are arranged). It is indicated, for example, that two trajectories belong to the first subclass (class 1) and the coordinate on a picture of the first frame of the first trajectory is (ax1, ay1) and the brightness value of the coordinate is aC1. Furthermore, the coordinate on a picture of the first frame of the second trajectory is (bx1, by1) and the brightness value of the coordinate is bC1.

In the same manner as in the case of FIG. 31B and FIG. 31C, the brightness information is necessary here because the output unit 104 needs the brightness information for displaying an original image on the display 120, and detection of an articulated object region can be implemented when data of each of the subclasses includes at least information on a pixel coordinate. Thus, it is also possible to further reduce the size of data by omitting the brightness information depending on the purpose and situation.

Especially in this case, one subclass corresponds to plural trajectories.

After the subclass obtaining unit 2801 obtains the classification information 2802, the distance calculating unit 106 calculates a distance between trajectories, and the region detection unit 107 calculates a representative geodetic distance and a representative Euclidean distance between subclasses to detect a region having an articulated motion. The representative geodetic distance calculated using Expression 14 and the representative Euclidean distance calculated using Expression 15, which are calculated by the region detection unit 107 are an average, a median, or a mode value of a distance defined between the trajectories of different subclasses. Therefore, in the examples shown in FIG. 32A and FIG. 32B of the present embodiment, in which a subclass includes plural trajectories, more stable calculation and higher speed in calculation are achieved, compared to only one trajectory.

The classification information 2802 described above may be stored in a variety of modes. For example, the classification information 2802 can be stored as the storage unit 2800, in an external memory or a memory of a server. Furthermore, the classification information 2802 can be stored as the storage unit 2800, in a recoding medium such as a SD (secure digital) card, CD or DVD-ROM, and so on. The classification information 2802 which has been stored can be read via wired or wireless communication. More specifically, the classification information 2802 is transmitted via a PC cable such as a USB cable or a card reader, or wired or wireless network, broadcasting, and the like, thereby allowing the subclass obtaining unit 2801 to obtain the classification information 2802.

According to the present embodiment as described above, the classification information generating apparatus 300 performs clustering on trajectories based on an index such as a color, motion, or the like. The articulated object region detection apparatus 400 obtains the trajectories on which clustering has been performed to perform region detection processing.

With the procedure described above, the articulated object region detection apparatus 400 obtains, from outside, information on the subclasses to which the respective trajectories belong, without performing calculation inside. With the configuration described above as well, an articulated object region of a moving object, such as a person, which has an articulated motion that involves a temporal change in the posture, position, size, and so on, in a video is detected, thereby enabling an accurate detection of the moving object in an image.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable as an articulated object region detection apparatus which detects a moving object in a picture by performing region extraction on the picture including the moving object such as a person that moves changing shape, based on motions included in plural pictures, and is applicable, for example, as articulated object region detection apparatus or the like to be incorporated in audio-video equipment such as a motion analyzer, a monitoring apparatus, a video camera, or a TV set.

What is claimed is:

1. An articulated object region detection apparatus which detects a region having an articulated motion, using trajectories which correspond, in one-to-one relationship, to regions included in a moving object in a video, said articulated object region detection apparatus comprising:
   a subclass classification unit configured to classify trajectories into subclasses each of which is a group of similar trajectories, each of the trajectories being a trajectory of a motion of a block and being over pictures included in the video, the block including one or more pixels each of which constitutes the pictures;
   a distance calculating unit configured to calculate, for each of the subclasses, a point-to-point distance and a geodetic distance, the point-to-point distance being a distance directly connecting a first trajectory that belongs to the subclass and a second trajectory that belongs to another one of the subclasses, the geodetic distance being a distance of a path that passes through, as a relay point, a trajectory other than the first trajectory and the second trajectory, to reach the second trajectory from the first trajectory; and
   a region detection unit configured to detect, as a region having the articulated motion, two subclasses that include trajectories corresponding to two regions connected via a same articulation and including the articulated motion, based on a temporal change in the point-to-point distance and a temporal change in the geodetic distance between two given subclasses among the subclasses.

2. The articulated object region detection apparatus according to claim 1,
   wherein said region detection unit is configured to detect, as the region having an articulated motion, a subclass that is one of two subclasses between which the temporal change in the point-to-point distance is larger than a predetermined threshold of the point-to-point distance and the temporal change in the geodetic distance is equal to or smaller than a predetermined threshold of the geodetic distance.

3. The articulated object region detection apparatus according to claim 2,
wherein said region detection unit is configured to detect, from the subclasses classified by said subclass classification unit, a subclass that is one of two subclasses between which the temporal change in the point-to-point distance is larger than the predetermined threshold of the point-to-point distance, and detect from the detected subclasses, as the region having an articulated motion, a subclass that is one of two subclasses between which the temporal change in the geodetic distance is equal to or smaller than the predetermined threshold of the geodetic distance.

4. The articulated object region detection apparatus according to claim 2,
wherein said region detection unit is configured to detect, from the subclasses classified by said subclass classification unit, a subclass that is one of two subclasses between which the temporal change in the geodetic distance is equal to or smaller than the predetermined threshold of the geodetic distance, and detect from the detected subclasses, as the region having an articulated motion, a subclass that is one of two subclasses between which the temporal change in the point-to-point distance is larger than the predetermined threshold of the point-to-point distance.

5. The articulated object region detection apparatus according to claim 2,
wherein said region detection unit is configured to perform a first detection and a second detection in parallel, and detect, as the region having an articulated motion, a subclass detected in both of the first detection and the second detection, the first detection being a detection in which a subclass that is one of two subclasses between which the temporal change in the point-to-point distance is larger than the predetermined threshold of the point-to-point distance is detected from the subclasses classified by said subclass classification unit, and the second detection being a detection in which a subclass that is one of two subclasses between which the temporal change in the geodetic distance is equal to or smaller than the predetermined threshold of the geodetic distance is detected from the subclasses classified by said subclass classification unit.

6. The articulated object region detection apparatus according to claim 2,
wherein said region detection unit is further configured to detect, as the region having an articulated motion, a subclass that is one of two subclasses between which the temporal change in the point-to-point distance is larger than the predetermined threshold of the point-to-point distance and the temporal change in the geodetic distance is equal to or smaller than the predetermined threshold of the geodetic distance, only when a minimum value of the point-to-point distance between the subclasses is equal to or smaller than a predetermined threshold of a minimum value.

7. The articulated object region detection apparatus according to claim 1,
wherein said region detection unit is configured to detect, as regions having the articulated motion, two subclasses that include trajectories corresponding to two regions connected via a same articulation and indicating the articulated motion, based on a temporal change in a representative value of the point-to-point distances and a temporal change in a representative value of the geodetic distances between two given subclasses.

8. The articulated object region detection apparatus according to claim 7,
wherein the representative value of the point-to-point distances between the two subclasses is an average of the point-to-point distances between the two subclasses, and
the representative value of the geodetic distances between the two subclasses is an average of the geodetic distances between the two subclasses.

9. The articulated object region detection apparatus according to claim 7,
wherein the representative value of the point-to-point distances between the two subclasses is a median of the point-to-point distances between the two subclasses, and
the representative value of the geodetic distances between the two subclasses is a median of the geodetic distances between the two subclasses.

10. The articulated object region detection apparatus according to claim 7,
wherein the representative value of the point-to-point distances between the two subclasses is a mode value of the point-to-point distances between the two subclasses, and
the representative value of the geodetic distances between the two subclasses is a mode value of the geodetic distances between the two subclasses.

11. The articulated object region detection apparatus according to claim 1,
wherein said subclass classification unit is configured to classify the trajectories into subclasses based on the point-to-point distance between the trajectories.

12. The articulated object region detection apparatus according to claim 1,
wherein said subclass classification unit is configured to classify the trajectories into subclasses based on a color similarity between pixels that belong to respective trajectories or blocks to which the pixels belong between the trajectories.

13. The articulated object region detection apparatus according to claim 1,
wherein said subclass classification unit is configured to perform dimensionality reduction on the geodetic distance between the trajectories, and classify the trajectories into the subclasses based on the geodetic distance between the trajectories on which dimensionality reduction is performed.

14. The articulated object region detection apparatus according to claim 1,
wherein said distance calculating unit is configured to select, for each of the trajectories, a point-to-point distance equal to or smaller than a predetermined threshold of a distance, from among point-to-point distances from the trajectory to other trajectories, and calculate the geodetic distance by obtaining a shortest path from the trajectory to the other trajectories after performing non-linearization to change unselected point-to-point distances into infinite.

15. The articulated object region detection apparatus according to claim 14,
wherein said distance calculating unit is configured to select, for each of the trajectories, the point-to-point distance equal to or smaller than the predetermined threshold of a distance, from among the point-to-point distances from the trajectory to the other trajectories, calculate the geodetic distance by obtaining the shortest path from the trajectory to the other trajectories after performing non-linearization to change the unselected point-to-point distances into infinite, and classify the trajectories into the subclasses by classifying, into a same subclass, a group of trajectories between which the geodetic distances indicate finite values.

16. The articulated object region detection apparatus according to claim 1, further comprising an output unit configured to perform image processing on at least one of the pictures so as to be displayed in a different mode per region detected by said region detection unit, and output the picture including the region on which the image processing is performed.

17. The articulated object region detection apparatus according to claim 1,
wherein the video is captured to image a person as an object, and
said articulated object region detection apparatus further comprising an output unit configured to perform image processing on at least one of the pictures so as to be displayed in a display mode in which a region of the person can be visually recognized, per region detected by said region detection unit, and output the picture including the region on which the image processing is performed.

18. The articulated object region detection apparatus according to claim 1,
wherein the video is captured to image a person as an object, and
said articulated object region detection apparatus further comprising an action recognition unit configured to calculate an angle between subclasses which are included in the region detected by said region detection unit and which indicate an articulated motion, and recognize an action of the object by comparing the calculated angle with an angle which is determined in advance for each action pattern of the person.

19. The articulated object region detection apparatus according to claim 18, further comprising an output unit configured to perform image processing on at least one of the pictures, based on the action of the object recognized by said action recognition unit, so as to be displayed in a display mode in which the action pattern of the person can be visually recognized, and output the picture including the region on which the image processing is performed.

20. The articulated object region detection apparatus according to claim 1, further comprising an action detecting unit configured to detect a change in the number of connections of a moving object included in the video, based on the number of articulations between the subclasses which are included in the region detected by said region detection unit and which indicate the articulated motion.

21. The articulated object region detection apparatus according to claim 20,
wherein said action detecting unit is configured to determine that an item is abandoned by the moving object when detecting a decrease in the number of connections and determine that an item is taken away by the moving object when detecting an increase in the number of connections.

22. The articulated object region detection apparatus according to claim 21, further comprising an output unit configured to perform image processing on at least one of the pictures, based on a result of the determination performed by said action detecting unit, so as to be displayed in a display mode in which abandonment or taking away of the item can be visually recognized, and output the picture including the region on which the image processing is performed.

23. The articulated object region detection apparatus according to claim 1, further comprising:
an image input unit configured to capture pictures included in the video; and
a trajectory calculating unit configured to detect, per block including one or more pixels and constituting the captured pictures, a motion of the block between two temporally neighboring pictures included in the video, and calculate the trajectories by concatenating the detected motion for the pictures.

24. The articulated object region detection apparatus according to claim 23,
wherein said movement trajectory calculating unit is configured to change the number of pictures used for calculating trajectories, according to the number of the trajectories to be calculated, and calculate the trajectories.

25. The articulated object region detection apparatus according to claim 24,
wherein said trajectory calculating unit is configured to increase the number of the pictures used for calculating the trajectories, when the number of the trajectories to be calculated exceeds a predetermined upper limit, and calculate the trajectories.

26. The articulated object region detection apparatus according to claim 24,
wherein said trajectory calculating unit is configured to decrease the number of the pictures used for calculating the trajectories, when the number of the trajectories to be calculated falls below a predetermined lower limit, and calculate the trajectories.

27. The articulated object region detection apparatus according to claim 1,
wherein the articulated motion is a motion of an object connected via an articulation.

28. The articulated object region detection apparatus according to claim 1,
wherein the articulated motion is a motion of a string-shape object.

29. An articulated object region detection method of detecting a region having an articulated motion, using trajectories which correspond, in one-to-one relationship, to regions included in a moving object in a video, said articulated object region detection method comprising:
classifying trajectories into subclasses each of which is a group of similar trajectories, each of the trajectories being a trajectory of a motion of a block and being over pictures included in the video, the block including one or more pixels each of which constitutes the pictures;
calculating, for each of the subclasses, a point-to-point distance and a geodetic distance, the point-to-point distance being a distance directly connecting a first trajectory that belongs to the subclass and a second trajectory that belongs to another one of the subclasses, the geodetic distance being a distance of a path that passes through, as a relay point, a trajectory other than the first trajectory and the second trajectory, to reach the second trajectory from the first trajectory; and
detecting, as a region having the articulated motion, two subclasses that include trajectories corresponding to two regions connected via a same articulation and including the articulated motion, based on a temporal change in the point-to-point distance and a temporal change in the geodetic distance between two given subclasses among the subclasses.

30. A non-transitory computer-readable recording medium on which a program is recorded, the program being for detecting a region having an articulated motion, using trajectories which correspond, in one-to-one relationship, to regions included in a moving object in a video, and the program causing a computer to execute the articulated object region detection method according to claim 29.

31. An articulated object region detection apparatus which detects a region having an articulated motion, using trajectories which correspond, in one-to-one relationship, to regions included in a moving object in a video, said articulated object region detection apparatus comprising:

a subclass obtaining unit configured to obtain classification information that indicates a result of classifying trajectories into subclasses each of which is a group of similar trajectories, each of the trajectories being a trajectory of a motion of a block and being over pictures included in the video, the block including one or more pixels each of which constitutes the pictures;

a distance calculating unit configured to calculate, for each of the subclasses, a point-to-point distance and a geodetic distance, based on the obtained classification information, the point-to-point distance being a distance directly connecting a first trajectory that belongs to the subclass and a second trajectory that belongs to another one of the subclasses, the geodetic distance being a distance of a path that passes through, as a relay point, a trajectory other than the first trajectory and the second trajectory, to reach the second trajectory from the first trajectory; and a region detection unit configured to detect, as a region having the articulated motion, two subclasses that include trajectories corresponding to two regions connected via a same articulation and including the articulated motion, based on a temporal change in the point-to-point distance and a temporal change in the geodetic distance between two given subclasses among the subclasses.

\* \* \* \* \*